United States Patent
Koibuchi et al.

(10) Patent No.: US 7,162,333 B2
(45) Date of Patent: Jan. 9, 2007

(54) INTEGRATED VEHICLE MOTION CONTROL SYSTEM

(75) Inventors: Ken Koibuchi, Susono (JP); Shouichi Miyago, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 317 days.

(21) Appl. No.: 10/499,025

(22) PCT Filed: Dec. 22, 2002

(86) PCT No.: PCT/IB02/05569

§ 371 (c)(1),
(2), (4) Date: Jun. 17, 2004

(87) PCT Pub. No.: WO03/059680

PCT Pub. Date: Jul. 21, 2003

(65) Prior Publication Data

US 2005/0027402 A1     Feb. 3, 2005

(30) Foreign Application Priority Data

Dec. 27, 2001   (JP) .............................. 2001-395871

(51) Int. Cl.
*B60R 16/02*   (2006.01)
*B60K 41/28*   (2006.01)
*G06F 17/00*   (2006.01)

(52) U.S. Cl. ................ 701/1; 701/32; 701/33
(58) Field of Classification Search ............ 701/1, 701/32, 33, 36, 37, 41, 93

See application file for complete search history.

(56) References Cited

U.S. PATENT DOCUMENTS

| | | | |
|---|---|---|---|
| 5,351,776 A * | 10/1994 | Keller et al. | ............ 701/70 |
| 5,369,584 A | 11/1994 | Kajiwara | |
| 5,408,411 A | 4/1995 | Nakamura et al. | |
| 5,991,669 A | 11/1999 | Dominke et al. | |
| 6,092,006 A | 7/2000 | Dominke et al. | |
| 6,122,572 A * | 9/2000 | Yavnai | ............ 701/23 |
| 6,154,688 A | 11/2000 | Dominke et al. | |
| 6,263,262 B1 | 7/2001 | Bitzer et al. | |

(Continued)

FOREIGN PATENT DOCUMENTS

DE     198 29 150 A1     1/2000

(Continued)

OTHER PUBLICATIONS

Harata et al., "A Simplified Serial Communication Network Within a Vehicle," Toyota Central Research and Development, Labs., Inc., 39th IEEE Vehicular Technology Conference, vol. I, May 1-3, 1989.

*Primary Examiner*—Tan Q. Nguyen
(74) *Attorney, Agent, or Firm*—Oliff & Berridge, PLC

(57) ABSTRACT

An integrated vehicle motion control system is provided in which the software configuration is formed in a hierarchical structure, and includes (a) a command section adapted to determine target vehicle state quantities based on driving related information, and (b) an executing section adapted to receive the target vehicle state quantities as commands from the command section, and execute the commands by means of a plurality of actuators. The command section includes an upper-level command section adapted to determine first target vehicle state quantities based on the driving related information, without taking account of the dynamic behavior of the vehicle, and a lower-level command section adapted to determine second target vehicle state quantities in view of the dynamic behavior of the vehicle.

17 Claims, 26 Drawing Sheets

U.S. PATENT DOCUMENTS

| | | |
|---|---|---|
| 6,292,741 B1 | 9/2001 | Bitzer et al. |
| 6,301,528 B1 | 10/2001 | Bertram et al. |
| 6,339,739 B1 | 1/2002 | Folke et al. |
| 6,679,344 B1 | 1/2004 | Bertram et al. |
| 2003/0171865 A1 | 9/2003 | Moser et al. |

FOREIGN PATENT DOCUMENTS

| | | |
|---|---|---|
| DE | 198 38 336 A1 | 3/2000 |
| DE | 100 25 493 A1 | 12/2001 |
| JP | 3-28055 U | 3/1991 |
| JP | A 3-178844 | 8/1991 |
| JP | A 5-85228 | 4/1993 |
| JP | A 10-250416 | 9/1998 |
| JP | A 10-250417 | 9/1998 |
| JP | A 10-315883 | 12/1998 |
| JP | A 2000-71819 | 3/2000 |

* cited by examiner

F I G. 11
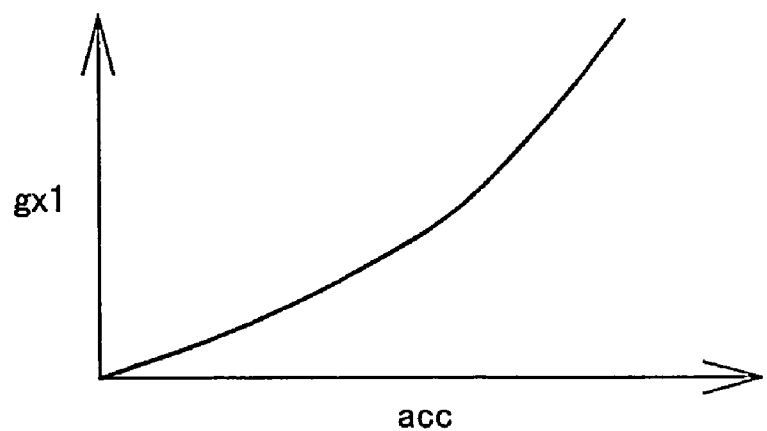
F I G. 12
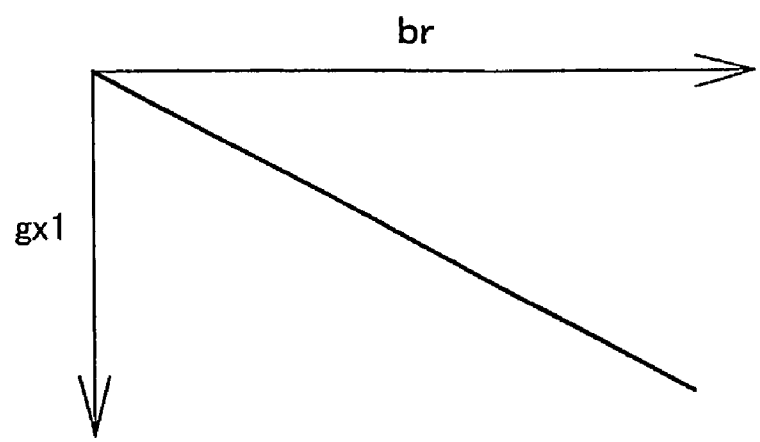

FIG. 29

| SPEED RATIO | ESTIMATED TORQUE RATIO |
|---|---|
| 0.000 | 1.846 |
| 0.100 | 1.767 |
| 0.200 | 1.690 |
| 0.300 | 1.608 |
| ⋮ | ⋮ |
| 0.941 | 0.997 |
| 0.950 | 0.997 |

INTEGRATED VEHICLE MOTION CONTROL SYSTEM

BACKGROUND OF THE INVENTION

1. Field of the Invention

The invention relates to a technology for controlling a plurality of actuators in an integrated manner so as to perform a plurality of kinds of vehicle motion controls on a motor vehicle.

2. Description of Related Art

In recent years, there is an increasing tendency to install many kinds of motion control devices for controlling movements of the vehicle on the same vehicle. However, the effects achieved by the motion control devices of different kinds do not necessarily appear in the vehicle independently of each other, but may interfere with one another. When the development of the vehicle involves installation of the plural kinds of motion control devices on the vehicle, therefore, it is important to ensure sufficient cooperation (or coaction) and coordination of these motion control devices.

For example, when a plurality of kinds of motion control devices need to be mounted in the same vehicle at a certain development stage of the vehicle, the motion control devices may be correlated or coordinated with each other in a supplemental or additional way after the individual control devices were developed independently of each other.

However, the development of the vehicle with the different kinds of the motion control devices as described above requires a lot of efforts and a long period of time for achieving correlation and coordination among the motion control devices.

As an example, a plurality of different kinds of motion control devices are installed on the vehicle such that these motion control devices share the same actuator or actuators. With this arrangement, if the motion control devices need to operate the same actuator(s) at the same time, a problem of conflict arises between controls by the different motion control devices.

It is difficult to ideally solve the above problem if the correlation/coordination of the motion control devices is established in a supplemental or additional way after the individual motion control devices were developed independently of each other, as described above. In some actual cases, the problem is solved by selecting one or more of the motion control devices to be given priority over the other control devices, and permitting the selected motion control device(s) to exclusively control the corresponding actuator (s).

In the meantime, U.S. Pat. No. 5,351,776 discloses a known example of a technology for controlling the vehicle movements in an integrated manner, for the purpose of shortening the development time of the vehicle as a whole, and improving the reliability and availability of the vehicle as well as making maintenance of the vehicle easier.

In the known example, an overall system consisting of the driver and the vehicle is constructed by a plurality of elements that are arranged in the form of a hierarchy having a plurality of hierarchical levels between the driver and actuators. When a request or intention of the driver is translated into a corresponding operating performance of the vehicle, the performance required from an upper-level element for a lower-level element is transmitted from the upper-level element to the lower-level element.

In the known example, while the above-described system is constructed in the hierarchical form in accordance with the relationship of components on the hardware configuration, the software configuration adapted for carrying out the plurality of kinds of motion controls does not necessarily have an appropriate hierarchical arrangement. This situation will be described below in greater detail.

As is understood from U.S. Pat. No. 5,351,776, control functions, in particular, control functions of the coordinating elements 12, 18 and 24, are realized in the form of program structures of the master controller 100. Namely, the control functions of these elements are implemented by executing programs in the master controller 100. The coordinating element 12 serves to translate a request of the driver into a target value, and the coordinating element 18 converts the target value received from the coordinating element 12 into vehicle wheel torque. Thus, the coordinating elements 12, 18 form a hierarchical structure.

On the other hand, the coordinating element 24 transmits a signal for realizing the engine torque received from the next higher element 22 to the actuator element 28 for controlling the intake air quantity of the engine, actuator element 30 for controlling the fuel injection quantity of the engine, and the actuator element 32 for controlling the ignition timing of the engine. Since the coordinating element 24 is subordinated only to the next higher-level element 22, but not to the above-described coordinating elements 12 and 18, the coordinating element 24 and the coordinating elements 12 and 18 do not form a hierarchical structure.

To make the software configuration form a hierarchical structure in a true sense, a plurality of processing units in the software configuration need to be independent of each other. "Independent" in this context means that a program of each processing unit can be executed by a computer without depending upon a program of another processing unit. Namely, the program to be executed by the computer in each processing unit needs to be a self-complete program that is completed by itself, namely, a module.

The above-identified U.S. Patent does not disclose the hierarchical structure of the software structure, independent processing units and modularization as described above.

Referring to FIG. 1 of U.S. Pat. No. 5,351,776, it may be proposed in this patent to classify and arrange a plurality of elements of the system in a hierarchical form merely in accordance with the relationship as to which of the elements belongs to or is subordinate to which of the elements, without telling whether the elements are hardware elements or software elements. However, the above U.S. Patent does not mention a technology for adequately arranging the software configuration of the system in hierarchical form.

To adequately arrange the software configuration in hierarchical form, it is necessary to fractionize necessary processing contents, thereby to improve the execution efficiency of the software configuration as a whole.

In sum, in the known example as described above, there is still room for improvement in the software configuration for executing a plurality of kinds of motion controls in the same vehicle in an integrated manner. With such an improvement in the software configuration, the technology for controlling a plurality of actuators in an integrated manner for controlling the movements of the vehicle will be established for use in actual applications.

It is therefore an object of the invention to adequately establish a hierarchical structure of the software configuration of a system that controls a plurality of actuators for executing a plurality of kinds of motion controls in a vehicle in an integrated manner, and to optimize the hierarchical structure in terms of applicability.

SUMMARY OF THE INVENTION

To accomplish the above object, there is provided according to one aspect of the invention an integrated vehicle motion control system which controls a plurality of actuators in an integrated manner by using a computer, based on driving related information relating to driving of a vehicle by a driver, so as to carry out a plurality of kinds of vehicle motion controls in a vehicle, wherein (1) at least a software configuration, out of hardware configuration and software configuration of the integrated vehicle motion control system, comprises a plurality of sections that are arranged in the form of a hierarchy having a plurality of hierarchical levels in a direction from the driver toward the plurality of actuators, (2) the plurality of sections include (a) a command section being at a first level as one of the hierarchical levels, the command section being adapted to determine a target vehicle state quantity based on the driving related information, (b) an executing section being at a second level lower than the first level, the executing section being adapted to receive the target vehicle state quantity as a command from the command section, and execute the received command by means of at least one of the plurality of actuators, (3) the command section includes a upper-level command section and a lower-level command section each of which is adapted to generate commands for controlling the plurality of actuators in an integrated manner, the upper-level command section determining a first target vehicle state quantity based on the driving related information, without taking account of dynamic behavior of the vehicle, and supplying the lower-level command section with the determined first target vehicle state quantity, the lower-level command section determining a second target vehicle state quantity in view of the dynamic behavior of the vehicle, based on the first target vehicle state quantity received from the upper-level command section, and supplying the executing section with the determined second target vehicle state quantity, and (4) the upper-level command section, the lower-level command section and the executing section perform particular functions assigned to the respective sections, by causing the computer to execute a plurality of modules that are independent of each other on the software configuration.

In the system as described above, at least the software configuration, out of the hardware and software configurations, is arranged in the form of a hierarchical structure, which includes (a) the command section being at a higher level as viewed in the direction from the driver toward the plurality of actuators, the command section being adapted to determine a target vehicle state quantity based on the driving related information, (b) the executing section being at a lower level than the command section and adapted to receive the determined target vehicle state quantity as a command from the command section, and execute the received command by means of at least one of the plurality of actuators.

Namely, in the system as described above, at least the software configuration thereof is divided into the command section and the executing section that are independent of each other, to provide a hierarchical structure.

Since the command section and the executing section are provided independently of each other on the software configuration, development, designing, change of design, debugging, and other operations performed on each of these section can be carried out without affecting the other section, thus permitting these operations to be performed on both of the sections in parallel with each other. This arrangement makes it possible to easily reduce the time required for working on the whole software configuration.

Furthermore, in the system as described above, the command section includes the upper-level command section and the lower-level command section each of which generates commands for controlling the plurality of actuators in an integrated manner.

The upper-level command section is adapted to determine the first target vehicle state quantity based on the driving related information, without taking account of dynamic behavior of the vehicle, and supply the lower-level command section with the determined first target vehicle state quantity.

On the other hand, the lower-level command section is adapted to determine the second target vehicle state quantity in view of the dynamic behavior, based on the first target vehicle state quantity received from the upper-level command section, and supply the executing section with the determined second target vehicle state quantity.

Thus, in the system according to the above aspect of the invention, the command section is divided into the upper-level command section that simply determine a target vehicle state quantity without taking account of the dynamic behavior of the vehicle, and the lower-level command section that accurately determine a target vehicle state quantity while taking account of the dynamic behavior of the vehicle, with the upper-level command section and the lower-level command section being arranged in series in this order.

Since the upper-level command section and the lower-level command section are provided independently of each other on the software configuration, development, designing, change of design, debugging, and other operations performed on each of these sections can be carried out without affecting the other section, thus permitting these operations to be performed on both of the sections in parallel with each other. This arrangement makes it possible to easily reduce the time required for working on the software configuration of the command section of the system.

Here, the relationship between the "first target vehicle state quantity" and the "second target vehicle state quantity" will be described in greater detail. As described above, the first target vehicle state quantity is determined without taking account of the dynamic behavior of the vehicle, whereas the second target vehicle state quantity is determined in view of the dynamic behavior of the vehicle, on the basis of the determined first target vehicle state quantity.

The "dynamic behavior of the vehicle" as mentioned above means, for example, transient or non-linear vehicle movements which require relatively complicated calculations for obtaining specific values representing the movements. This concept is opposite to a concept of constant or linear vehicle movements which only require relatively simple calculations for obtaining specific values representing the movements.

Accordingly, when it is not appropriate in view of the dynamic behavior of the vehicle to control the plurality of actuators so as to achieve the first target vehicle state quantity as it is (i.e., without changing it), the first target vehicle state quantity is corrected, and thus the second target vehicle state quantity is determined.

Judging the relationship between the upper-level command section and the lower-level command section from the relationship between the first target vehicle state quantity and the second target vehicle state quantity, the upper-level command section and the lower-level command section are not in a subordinate relationship in which the lower-level command section is completely depending upon or subordinate to the upper-level command section. Rather, the upper-level and low-level command sections are in an incomplete but independent relationship in which the lower-level command section is authorized to correct a command generated by the upper-level command section as needed.

The "subordinate relationship" as indicated above may be interpreted as, for example, a completely hierarchical relationship or intimate relationship, while the "incomplete but independent relationship" as indicated above may be interpreted as, for example, a partially parallel relationship, or a distant relationship.

Furthermore, in the system according to the above aspect of the invention, the target vehicle state quantity is determined via a plurality of stages or steps. More specifically, the target vehicle state quantity is determined in the first stage without depending upon the dynamic behavior of the vehicle, and is then determined in the next stage, depending upon the dynamic behavior of the vehicle. Namely, the target vehicle state quantities thus determined in the plurality of stages are not in a parallel relationship but in a series relationship, with respect to the executing section to be supplied with the final target vehicle state quantity.

Accordingly, in the system as described above, the executing section is not required to select one of the target vehicle state quantities determined in the plurality of stages as in the case where the determined target quantities are in a parallel relationship with each other.

In addition, since the first target vehicle state quantity determined by the upper-level command section is not dependent upon the dynamic behavior of the vehicle, the upper-level command section, which has been developed or designed with respect to a certain type of vehicle, may be installed on another type of vehicle having different dynamic operating characteristics without requiring significant changes of design. Thus, the system as described above ensures increased applicability of the upper-level command section, thus making it easy to widely use the upper-level command sections in different types of vehicles.

In the system according to the above aspect of the invention, the upper-level command section, the lower-level command section and the executing section perform particular functions assigned to the respective sections, by causing the computer to execute a plurality of modules that are independent of each other on the software configuration.

Namely, in the system as described above, the upper-level command section, lower-level command section and the executing section cause the computer to execute the module of each section independently of the other modules.

In addition, the system according to the above aspect of the invention may be constructed such that the hardware configuration as well as the software configuration is designed in the form of a hierarchical structure with respective units or devices being independent of each other.

In this case, in one embodiment of the system of the above aspect of the invention, a dedicated processing unit (which may be constructed to have at least one CPU) is installed for each unit of the hardware configuration, and each module is executed by each processing unit. In this embodiment, if the number of the processing units is counted as the number of computers, for example, the number of computers installed on the whole system is plural since the number of the units for which the dedicated processing units are installed is plural.

The above expression that "the hardware configuration is designed in the form of a hierarchical structure with respective units being independent of each other" does not make it essential that the respective units are independent of each other in appearance (namely, the units are separated from each other), but it suffices if a processing unit assigned to the processing in each unit is independent of processing units of the other units.

The "driving related information" as mentioned above may be defined as including at least one of (a) driving information relating to driving operations performed by the driver, and (b) vehicle information relating to state quantities of the vehicle (or quantities representing various conditions of the vehicle), and (c) environmental information relating to an environment around the vehicle, which influences the motion of the vehicle.

Here, the "driving information" may be defined as including at least one piece of information relating to a driving operation (such as an accelerating operation or a decelerating operation) to drive the vehicle, a braking operation to apply a brake to the vehicle, a steering operation to turn the vehicle, switching devices of various electrical components, and so forth.

The "vehicle information" as mentioned above may be defined as including at least one piece of information relating to, for example, the vehicle speed, steering angle, vehicle body yaw rate, longitudinal acceleration, lateral acceleration and vertical acceleration of the vehicle, quantities, such as a tire inflation pressure, representing the state of a tire, quantities representing the state of suspensions, quantities, such as engine speed and engine load, representing the state of the engine, quantities, such as transmission ratio (gear ratio), representing the state of the transmission, quantities representing the state of a motor during driving or regenerative braking in an electric vehicle including a hybrid vehicle, quantities representing the state of a vehicle power supply, such as a battery, and so forth.

The "environmental information" as mentioned above may be defined as including at least one of, for example, information relating to conditions (such as surface conditions, geometric characteristics, and geographical characteristics) of the road on which the vehicle is running, information relating to navigation of the vehicle, information relating to an obstacle that exists in front of the vehicle, information received wirelessly (i.e., via radio waves) from the outside and relating to the motion of the vehicle, and other types of information.

When an actuator is activated in a vehicle, electric power is consumed irrespective of whether its activation aims at control of the vehicle motion or control of the degree of comfort of the driver (such as air conditioning control within a passenger compartment, illumination control, or audio control). Since electric power is not limitless in the vehicle, it is desirable to suppress wasteful consumption as far as possible and manage the balance between supply and demand of the energy in the whole vehicle in an integrated manner.

On the basis of the above finding, the upper-level command section of the system according to the above aspect of the invention may be adapted to determine the first target vehicle state quantity so as to reduce consumption of an energy resource (such as an electric power or a fuel) consumed by the vehicle as a whole, to the minimum.

As described above, in the system according to the above aspect of the invention, both the upper-level command section and the lower-level command section determine the target vehicle state quantities. Since the modules of the upper-level command section and the lower-level command section are independent of each other, a failure in the module that occurs in one of the upper-level command section and lower-level command section does not induce or result in a failure in the other module.

On the basis of the above finding, the lower-level command section of the system according to the above aspect of the invention may be adapted to determine the second target vehicle state quantity, based on the driving related information transmitted to the lower-level command section while bypassing the upper-level command section when the upper-level command section fails.

In addition, the upper-level command section, low-level command section and the executing section according to the above aspect of the invention may be constructed such that only one module of each of the sections is executed by the computer, or such that two or more modules of each of the sections are executed by the computer.

In a first embodiment of the integrated vehicle motion control system according to the above aspect of the invention, the driving related information includes (a) driving information relating to driving operations performed by the driver, and (b) at least one of vehicle information relating to state quantities of the vehicle and environmental information relating to an environment around the vehicle, which influences motion of the vehicle.

In the system as described above, the driving related information includes not only the driving information relating to the driving operations of the driver, but also other types of information. It is therefore possible for the system to execute vehicle motion control so as to make up for an insufficient driving skill of the driver, match the vehicle motion with changes in the vehicle conditions or circumstances around the vehicle, which changes the driver cannot easily recognize or fails to recognize. Thus, the use of the system makes it easy to improve the safety of the vehicle.

In a second embodiment of the above aspect of the invention, the vehicle includes (a) a driving information acquisition system adapted to acquire driving information relating to driving operations performed by the driver, and (b) at least one of a vehicle information acquisition system adapted to acquire vehicle information relating to state quantities of the vehicle and an environmental information acquisition system adapted to acquire environmental information relating to an environment around the vehicle, which influences motion of the vehicle. Furthermore, the upper-level command section determines the first target vehicle state quantity, based on (c) the acquired driving information, and (d) at least one of the acquired vehicle information and the acquired environmental information.

In the system as described just above, the upper-level command section determines the first target vehicle state quantity, in view of not only the driving information but also other types of information. Thus, the use of the system makes it easy to improve the safety of the vehicle, for substantially the same reasons as in the case of the system of the first embodiment.

In a third embodiment of the above aspect of the invention, the upper-level command section determines a plurality of candidate values associated with the first target vehicle state quantity to be determined, based on (a) the acquired driving information and (b) at least one of the acquired vehicle information and the acquired environmental information, and determines the first target vehicle state quantity based on the determined plurality of candidate values, according to a predetermined set of rules.

In the system as described above, the first target vehicle state quantity is determined according to the predetermined set of rules, based on the plurality of candidate values associated with the first target vehicle state quantity to be determined, which candidate values have been determined in view of the driving information and other types of information.

Thus, the relationship between the driving information and other information and the first target state quantity to be determined based on these pieces of information is uniquely determined by the above-described set of rules, which leads to improved clarity and transparency of the content of the relationship.

With the system as described above, therefore, the software configuration of the upper-level command section can be easily designed, thus permitting a reduction of the time required for designing the software configuration.

In addition, the relationship between the driving and other information and the first target vehicle state quantity as described above can be changed only by changing the set of rules, which makes it easy to tune the software configuration of the upper-level command section. This also makes it easy to reduce changes of design required for installing the upper-level command section developed for a certain type of vehicle, in another type of vehicle.

In one exemplary form of the system as described above, the upper-level command section selects one of the determined candidate values according to a predetermined set of selection rules, thereby to determine the first target vehicle state quantity.

In a fourth embodiment of the above aspect of the invention, the first target vehicle state quantity is associated with a longitudinal acceleration of the vehicle, and the plurality of candidate values include (a) a first target longitudinal acceleration determined based on the acquired driving information, and (b) a second target longitudinal acceleration determined based on at least one of the acquired vehicle information and the acquired environmental information.

In general, the basic movements of the vehicle are running, stopping and turning. When driving the vehicle, therefore, the driver performs driving operations so as to realize or accomplish the basic movements of the vehicle.

The running and stopping motions of the vehicle may be described by a physical quantity called longitudinal acceleration of the vehicle.

On the basis of the above finding, in the system according to the fourth embodiment, the first target vehicle state quantity is associated with the longitudinal acceleration of the vehicle, and the plurality of candidate values include (a) a first target longitudinal acceleration determined based on the driving information, and (b) a second target longitudinal acceleration determined based on at least one of the vehicle information and the environmental information.

Thus, the system as described just above makes it easy to appropriately control driving and braking of the vehicle, without making the driver uncomfortable.

It is to be understood that "acceleration" used in this specification refers to both a positive acceleration (i.e., acceleration in a narrow sense) and a negative acceleration (i.e., deceleration in a narrow sense) if no indication otherwise is provided.

In a fifth embodiment of the above aspect of the invention, the first target vehicle state quantity is associated with a steering angle of the vehicle, and the plurality of candidate values include (a) a first target steering angle determined based on the acquired driving information, and (b) a second target steering angle determined based on at least one of the acquired vehicle information and the acquired environmental information.

As described above, the basic movements of the vehicle include turning as well as running and stopping. The turning motion of the vehicle may be described by a physical quantity called steering angle of the vehicle.

On the basis of the above finding, in the system according to the fifth embodiment, the first target vehicle state quantity is associated with a steering angle of the vehicle, and the plurality of candidate values include a first target steering angle determined based on the acquired driving information, and a second target steering angle determined based on at least one of the acquired vehicle information and the acquired environmental information.

Thus, the system as described just above makes it easy to appropriately control turning of the vehicle without making the driver uncomfortable.

The "steering angle" is generally expressed as an orientation or direction of the front wheels (i.e., front-wheel steering angle). It is, however, to be understood that the steering angle may be expressed by using an angle of turn of the steering wheel (hereinafter referred to as "steering wheel angle"), since the steering angle is a physical quantity corresponding to the angle of turn of the steering wheel that is manipulated by the driver.

In a sixth embodiment of the above aspect of the invention, the first target vehicle state quantity comprises a target vehicle state quantity associated with a longitudinal acceleration of the vehicle and a target vehicle state quantity associated with a steering angle of the vehicle.

As described above, the basic movements of the vehicle are running, stopping and turning. The running motion and stopping motion of the vehicle may be described by a physical quantity called longitudinal acceleration of the vehicle, and the turning motion may be described by a physical quantity called steering angle of the vehicle.

In general, the driver predicts a running track on which the vehicle currently driven by the driver is running from the current point in the near future, and drives the vehicle while assuming the vehicle position-speed relationship (between the vehicle speed and the vehicle position) which changes along the expected running track.

Namely, in general, the driver drives the vehicle so as to realize, as desired, the expected vehicle position-speed relationship between the vehicle position and the vehicle speed on the track on which the vehicle is supposed to travel. To this end, the driver performs driving operations so as to realize the vehicle position-speed relationship as accurately as possible.

The vehicle position-speed relationship is discussed in a region that does not depend upon the dynamic behavior of the vehicle, and may be considered as a running parameter that is established in common to a plurality of types of vehicle having different dynamic operating characteristics.

The least required physical quantities that describe the vehicle position-speed relationship may be, for example, the longitudinal acceleration and the steering angle of the vehicle.

On the basis of the above finding, in the system according to the sixth embodiment, the first target vehicle state quantity comprises a target vehicle state quantity associated with the longitudinal acceleration and a target vehicle state quantity associated with the steering angle.

Thus, the system as described above makes it easy to optimize the vehicle position—speed relationship without sacrificing wide applicability of the upper-level command section.

The "vehicle position-speed relationship" used in this specification may be grasped, for example, as a vehicle position-time relationship with which the position of the vehicle running along the track on which the vehicle is supposed to travel changes with time. If the vehicle position and the speed are known, the relationship therebetween may be equivalently converted to the relationship between the vehicle position and the time (passage time).

In a seventh embodiment of the above aspect of the invention, the upper-level command section determines, as the first target vehicle state quantity, a target vehicle state quantity that gives a priority to optimization of a vehicle position-speed relationship between a position of the vehicle and a speed thereof on a track on which the vehicle runs, over stabilization of behavior of the vehicle. Furthermore, the lower-level command section determines, as the second target vehicle state quantity, a target vehicle condition that gives a priority to stabilization of behavior of the vehicle, over optimization of the vehicle position-speed relationship, based on the determined first target vehicle state quantity.

The target vehicle state quantity to be established when controlling the motion of the vehicle is determined based on one of different concepts, which include a first concept that gives a priority to the optimization of the vehicle position-speed relationship as described above, and a second concept that gives a priority to the stabilization of the behavior of the vehicle. Basically, the dynamic behavior of the vehicle need not be considered if the first concept is employed, and the dynamic behavior need be considered when the second concept is employed.

Accordingly, the target vehicle state quantity determined based on the first concept is widely used in different types of vehicle, whereas the target vehicle state quantity determined based on the second concept is highly likely to be used in only one type of vehicle.

On the basis of the above finding, in the system according to the seventh embodiment, the upper-level command section determines, as the first target vehicle state quantity, a target vehicle state quantity that gives a priority to optimization of the vehicle position-speed relationship between the position of the vehicle and the vehicle speed on the track on which the vehicle runs, over stabilization of the behavior of the vehicle. Furthermore, the lower-level command section determines, as the second target vehicle state quantity, a target vehicle state quantity that gives a priority to stabilization of the behavior of the vehicle, over optimization of the vehicle position-speed relationship, based on the determined first target vehicle state quantity.

In an eighth embodiment of the above aspect of the invention, the upper-level command section determines the first target vehicle state quantity as a target vehicle state quantity that is variable within a permissible range, and the lower-level command section determines the second target vehicle state quantity as a target vehicle state quantity selected from the permissible range of the first target vehicle state quantity.

In the system as described above, the upper-level command section determines the first target vehicle state quantity while giving a priority to the optimization of the vehicle position-speed relationship between the position and speed of the vehicle on the running track, over the stabilization of the behavior of the vehicle. Therefore, if it is important in view of the safety of the vehicle to stabilize the vehicle behavior, for example when the vehicle is highly unstable, the lower-level command section operates to determine the second target vehicle state quantity so as to stabilize the vehicle behavior.

Judging from the above situation, it will be understood that the upper-level command section and the lower-level command section are not in a subordinate relationship in which the lower-level command section is completely depending upon or subordinate to the upper-level command section. Rather, the upper-level and low-level command sections are in an incomplete but mutually independent relationship in which the lower-level command section is authorized to correct a command generated by the upper-level command section as needed.

However, if the upper-level command section determines the first target vehicle state quantity as a single fixed value but not as a range, and supplies it to the lower-level command section, the degree of dependence of the lower-level command section upon the higher-level command section is greater than that in the case where the upper-level command section determines the first target vehicle state quantity as a range rather than a fixed value, and supplies it to the lower-level command section.

On the other hand, if the stability of the behavior of the vehicle is significantly lowered because of, for example, an insufficiency of the driving skill of the driver or the ability to judge the vehicle environment, the lower-level command section, rather than the upper-level command section, is strongly demanded to take the initiative in determining the target vehicle state quantity, in the sense of correcting the driving operations of the driver, to thereby control the plurality of actuators via the executing section in an integrated manner.

On the basis of the above finding, in the system according to the eighth embodiment, the upper-level command section determines the first target vehicle state quantity as a target vehicle state quantity that is variable within a permissible range, and the lower-level command section determines the second target vehicle state quantity as a target vehicle state quantity selected from the permissible range.

With this arrangement, the degree of the authority given to the lower-level command section in determining the target vehicle state quantity can be easily increased relative to the authority given to the upper-level command section.

Consequently, the use of the system makes it possible to improve the stability of the behavior of the vehicle, and eventually the safety of the vehicle, in spite of an insufficiency of the driving skill of the driver or the ability to determine the vehicle environment.

In a ninth embodiment of the above aspect of the invention, the first target vehicle state quantity comprises a target vehicle state quantity associated with a longitudinal acceleration of the vehicle and a target vehicle state quantity associated with a steering angle of the vehicle, and the upper-level command section determines the target vehicle state quantity associated with the longitudinal acceleration of the vehicle as a target vehicle state quantity that is variable within a permissible range, and determines the target vehicle state quantity associated with the steering angle of the vehicle as a target vehicle state quantity that does not have a permissible range.

As described above, in the system according to the eighth embodiment, the degree of the authority given to the lower-level command section in determining the target vehicle state quantity can be easily increased relative to the authority given to the upper-level command section.

In the system according to the eighth embodiment, the first target vehicle state quantity includes a target vehicle state quantity associated with the longitudinal acceleration of the vehicle, and a target vehicle state quantity associated with the steering angle of the vehicle. Furthermore, in the eighth embodiment, it is possible to supply the lower-level command section with the target vehicle state quantity associated with the longitudinal acceleration of the vehicle and the target vehicle state quantity associated with the steering angle of the vehicle, both of which are variable within respective permissible ranges.

However, providing the lower-level command section with a target vehicle state quantity which is variable within a certain permissible range means that the actual motion of the vehicle is more likely to deviate from the driving operation of the driver (i.e., the driver's intention or request). In some cases, this tendency is desirable in the sense of improved safety of the vehicle. In other cases, however, the driver may feel uncomfortable or embarrassed in response to the actual motion of the vehicle.

The possibility of occurrence of the latter situation is higher in the case where the target vehicle state quantity associated with the steering angle of the vehicle is given a certain range or latitude, as compared with the case where the target vehicle state quantity associated with the longitudinal acceleration of the vehicle is given a certain range or latitude.

On the basis of the above finding, in the system according to the ninth embodiment, the first target vehicle state quantity comprises a target vehicle state quantity associated with the longitudinal acceleration of the vehicle and a target vehicle state quantity associated with the steering angle of the vehicle, and the upper-level command section determines the target vehicle state quantity associated with the longitudinal acceleration of the vehicle as a target vehicle state quantity that is variable within a permissible range, and determines the target vehicle state quantity associated with the steering angle of the vehicle as a target vehicle state quantity that does not have a permissible range.

With this arrangement, the degree of the authority given to the lower-level command section in determining the target vehicle state quantity can be easily increased relative to the authority given to the upper-level command section, while at the same time making the driver less uncomfortable.

In one exemplary form of the above embodiment, the upper-level command section determines the target vehicle state quantity associated with the longitudinal acceleration to be variable within an allowable range if the target vehicle state quantity indicates an acceleration of the vehicle, but determines the target vehicle state quantity as a single value having no allowable range if the target vehicle state quantity indicates a deceleration of the vehicle.

With the above arrangement, when the vehicle needs to be decelerated, the magnitude of the target longitudinal acceleration is more likely to be exactly or truthfully realized by the lower-level command section and the executing section, as compared with the case where the target acceleration is variable within an allowable range, thus making it easy to improve the safety of the vehicle.

In a tenth embodiment of the above aspect of the invention, the upper-level command section varies a width of the permissible range, based on at least one of an intention of the driver and an environment around the vehicle, which influences motion of the vehicle.

With the system as described above, the width of the allowable range of the first target vehicle state quantity determined by the upper-level command section can be changed based on at least one of an intention or request of the driver (which may reflect preference of the driver), and an environment around the vehicle (such as surface conditions or curving conditions, e.g., the degree or frequency of curves, of the road on which the vehicle is running), which influences the motion of the vehicle.

In the above system in which the width of the allowable range varies with changes in at least one of the intention or request of the vehicle and the environment around the vehicle, the optimization of the first target vehicle state quantity in relation to at least one of the intention of the driver and the environment around the vehicle can be easily accomplished, unlike the case where the width of the allowable range is fixed.

In an eleventh embodiment of the invention, the upper-level command section determines the first target vehicle state quantity based on input information, by using a simple vehicle model that simply describes motion of the vehicle with no regard to dynamic behavior of the vehicle, and the lower-level command section determines the second target vehicle state quantity based on input information, by using a more precise vehicle model that describes motion of the vehicle more precisely than the simple vehicle model so as to reflect the dynamic behavior of the vehicle.

In the system as described above, the final target vehicle state quantity is ultimately determined by using two types of vehicle models that describe the motion of the vehicle.

Accordingly, in the system as described above, the construction of each type of the vehicle model can be easily simplified as compared with the case where only one type of vehicle model is used to determine the target vehicle state quantity from the start to the end.

Furthermore, in the system as described above, the simple vehicle model is defined without depending upon the dynamic behavior of the vehicle for which the model is used. Accordingly, the applicability of the simple vehicle model for a plurality of types of vehicle can be easily improved.

In addition, the "model" used in this specification meets its requirement if it expresses the motion of the vehicle (including, for example, the motion of wheels) by any method on a computer. Accordingly, the "model" is not necessarily of the type that the motion of the vehicle is simulated by geometrically simplifying and reproducing (reconstructing) the structure of the vehicle, but may be of the type that the motion of the vehicle is described by using a simple mathematical expression(s) or a table(s), or of the type that the motion of the vehicle is described by at least one condition established according to the situation in which the vehicle is placed.

In a twelfth embodiment of the invention, the executing section determines controlled variables by which the plurality of actuators are to be controlled so as to realize the second target vehicle state quantity, based on input information, by using a vehicle model that describes motion of a wheel of the vehicle in relation to at least a longitudinal force and a lateral force, out of the longitudinal force, lateral force and a vertical force that act on the wheel.

In the upper-level command section and the lower-level command section, determination of the target vehicle state quantity only requires observation of the motion of the vehicle as a whole. On the other hand, the executing section directly controls a plurality of actuators and indirectly controls the force applied to each wheel of the vehicle, thereby to control the motion of the vehicle. It is therefore considered that the executing section uses the vehicle wheel model describing the motion of a wheel when it determines controlled variables by which the plurality of actuators are to be controlled so as to achieve the second target vehicle state quantity supplied from the lower-level command section.

In general, the force applied to a vehicle wheel is dissolved, for the sake of observation, into the longitudinal force, lateral force and the vertical force. While it appears essential that the vehicle wheel model describes the motion of the wheel with respect to the longitudinal force, lateral force and the vertical force of the wheel, it is technically difficult to significantly change the vertical force of the wheel by an actuator or actuators, regardless of the operating state in which the vehicle is placed, in view of the actual control performance of the actuators.

On the basis of the above finding, in the system according to the twelfth embodiment, the executing section determines controlled variables by which the plurality of actuators are to be controlled so as to realize the second target vehicle state quantity, based on input information, by using a vehicle model that describes motion of a wheel of the vehicle in relation to at least a longitudinal force and a lateral force, out of the longitudinal force, lateral force and a vertical force that act on the wheel.

With the above arrangement, the controlled variables of the plurality of actuators can be determined by defining a vehicle wheel model with high efficiency (or reduced waste) in connection with the control performance of the actuators.

In a thirteenth embodiment of the above aspect of the invention, each of at least one of the upper-level command section, lower-level command section and the executing section determines information to be transmitted to a section located at a lower level than said each section, based on information received from a section located at a higher level than said each section, by using a model that describes at least one of the motion of the vehicle and the motion of a wheel of the vehicle, and corrects the model based on an error in the information transmitted to the section located at a lower level than said each section.

In each of the upper-level command section, lower-level command section and the executing section, a particular model used for determining necessarily information may be defined as a fixed or invariable model. In some cases, however, changes may occur in an object described by the model, namely, the motion of the vehicle or the motion of the wheel, or in a medium between information determined by using the model and the motion of the vehicle or the motion of the wheel. If the model is defined as a fixed model in spite of such changes, the model cannot exactly reproduce the object described by the model and the actual state of the medium.

Here, "changes in the medium" include, for example, changes in the performance of an actuator as a medium, and changes in the performance of the object to be actuated by the actuator, as a medium. One example of the object to be actuated is a brake, and, in this example, the friction coefficient of a friction material of the brake may undergo changes. Another example of the object to be actuated is an engine, and, in this example, the output characteristics of the engine may change depending upon environmental parameters, such as the ambient temperature and atmospheric pressure.

In the light of the situation as described above, in the system according to the thirteenth embodiment, each of at least one of the upper-level command section, lower-level command section and the executing section determines information to be transmitted to a section located at a lower level than said each section, based on information received from a section located at a higher level than said each section, by using a model that describes at least one of the motion of the vehicle and the motion of a wheel of the vehicle, and corrects the model based on an error in the information transmitted to the section located at a lower level than said each section.

With this arrangement, it is possible to always truthfully reproduce the object described by the model or the medium in accordance with the model, irrespective of chronological changes in the object or medium.

If the system is additionally provided with the function to correct a model, it becomes easy to improve the accuracy of information produced by using the model, and eventually improve the accuracy of control of the motion of the vehicle.

In a fourteenth embodiment of the above aspect of the invention, the executing section includes a plurality of units that are arranged in the form of a hierarchy having a plurality of hierarchical levels in a direction from the lower-level command section toward the plurality of actuators, and the plurality of units include (a) a distribution unit being at a first level as one of the hierarchical levels, the distribution unit being adapted to distribute controlled variables by which the plurality of actuators are to be controlled so as to realize the second target vehicle state quantity supplied from the lower-level command section, to the plurality of actuators, and (b) a control unit being at a second level lower than the first level, the control unit being adapted to control the plurality of actuators so as to realize the controlled variables supplied from the distribution unit. Furthermore, the distribution unit includes (c) an upper-level distribution unit provided with respect to all of the plurality of actuators, for distributing controlled variables by which the plurality of actuators are to be controlled so as to realize the second target vehicle state quantity supplied from the lower-level command section, to all of the plurality of actuators in an integrated manner, (d) a lower-level distribution unit provided with respect to a part of the plurality of actuators, for distributing the controlled variables supplied from the upper-level distribution unit, to the part of the plurality of actuators. In this system, the control unit includes a plurality of individual control units, a first group of which is provided at a hierarchical level subordinate to the lower-level distribution unit with regard to the part of the plurality of actuators, and a second group of which is provided at a hierarchical level subordinate to the upper-level distribution unit with regard to the remaining actuators, and the upper-level distribution unit, the lower-level distribution unit and the control unit perform particular functions assigned to the respective units, by causing the computer to execute a plurality of modules that are independent of each other on the software configuration.

A plurality of types of actuators may need to be controlled so as to achieve a kind of target vehicle state quantity. In this case, controlled variables (hereinafter referred to as "overall controlled variables") to be established by all of the plurality of actuators so as to achieve the target vehicle state quantity need to be distributed among the plurality of actuators.

In the light of the situation as described above, in the system according to the fourteenth embodiment, the executing section includes a plurality of units that are arranged in the form of a hierarchy having a plurality of hierarchical levels in a direction from the lower-level command section toward the plurality of actuators.

Furthermore, the plurality of units include (a) a distribution unit being at a first level as one of the hierarchical levels, the distribution unit being adapted to distribute controlled variables by which the plurality of actuators are to be controlled so as to realize the second target vehicle state quantity supplied from the lower-level command section, to the plurality of actuators, and (b) a control unit being at a second level lower than the first level, the control unit being adapted to control the plurality of actuators so as to realize the controlled variables supplied from the distribution unit.

With the system as described above, the software configuration of the executing section is formed in a hierarchical structure such that its distribution unit and control unit are separated from each other. Since the distributing unit and the control unit are provided independently of each other on the software configuration, development, designing, change of design, debugging, and other operations performed on each of these units can be carried out without affecting the other unit, thus permitting the operations to be performed on both of the units in parallel with each other.

In general, some of the above-indicated overall controlled variables may be distributed to the plurality of actuators located at the terminal end of the control system in one step, but others may be distributed to the actuators in a plurality of steps (or via a plurality of stages). In the latter case, the overall controlled variable is not divided from the beginning into final individual controlled variables (which respectively correspond to the plural types of actuators). Rather, in the initial stage, the overall controlled variable is divided into intermediate controlled variables, which are then divided into the final individual controlled variables.

In the light of the above situation, in the system according to the fourteenth embodiment, the distribution unit includes (c) an upper-level distribution unit provided with respect to all of the plurality of actuators, for distributing controlled variables by which the plurality of actuators are to be controlled so as to realize the second target vehicle state quantity supplied from the lower-level command section, to all of the plurality of actuators in an integrated manner, (d) a lower-level distribution unit provided with respect to a part of the plurality of actuators, for distributing the controlled variables supplied from the upper-level distribution unit, to the part of the plurality of actuators.

With the system as described above, the software configuration of the distribution unit is formed in a hierarchical structure such that its higher-level distribution unit and lower-level distribution unit are separated from each other. Since the upper-level distributing unit and the lower-level distribution unit are provided independently of each other on the software configuration, development, designing, change of design, debugging, and other operations performed on each of these units can be carried out without affecting the other unit, thus permitting the operations to be performed on both of the units in parallel with each other.

Moreover, in the system according to the fourteenth embodiment, the control unit includes a plurality of individual control units, a first group of which is provided at a hierarchical level subordinate to the lower-level distribution unit with regard to the part of the plurality of actuators, and a second group of which is provided at a hierarchical level subordinate to the upper-level distribution unit with regard to the remaining actuators.

As is apparent from the above description, the integrated vehicle motion control system is arranged in the form of a hierarchy having hierarchical levels in terms of at least the software configuration thereof, in the direction from the driver to the plurality of actuators, such that the upper-level command section, the lower-level command section, the upper-level distribution unit, the lower-level distribution unit and the control unit are arranged in series independently of each other on the software configuration.

Accordingly, in the system as described above, at least the software configuration of the whole system is formed in a more advanced hierarchical arrangement, and therefore processing contents can be implemented separately from each other, and independency of each processing unit can be strengthened.

Here, the "upper-level distribution unit", "lower-level distribution unit" and "control unit" may be constructed such that only one module of each unit is executed by the computer, or such that a plurality of modules of each unit are executed by the computer.

In a fifteenth embodiment of the above aspect of the invention, the plurality of actuators are classified into a plurality of groups depending upon a type of a physical quantity that acts on each element of the vehicle by each of the actuators, and the lower-level distribution unit is provided with respect to at least one of the plurality of groups each of which contains two or more actuators.

In a sixteenth embodiment of the above aspect of the invention, the plurality of actuators include a plurality of wheel-related actuators that control at least longitudinal force and lateral force, out of longitudinal force, lateral force and vertical force of a wheel of the vehicle, and the upper-level distribution unit distributes the controlled variables to the plurality of wheel-related actuators such that the controlled variables include at least a longitudinal force component associated with the longitudinal force and a lateral force component associated with the lateral force, out of the longitudinal force component, the lateral force component, and a vertical force component associated with the vertical force.

In the system as described just above, according to the mechanics applied to a wheel of a motor vehicle, the above-indicated controlled variables distributed to the plurality of wheel-associated actuators include at least a longitudinal force component associated with the longitudinal force and a lateral force component associated with the lateral force, out of the longitudinal force component, lateral force component, and a vertical force component associated with the vertical force.

Thus, in the system as described above, distribution of the controlled variables to among the plurality of wheel-related actuators is accomplished according to the mechanics applied to a vehicle wheel, which leads to improved accuracy of the individual controlled variable to be achieved by each of the wheel-related actuators, and improved accuracy with which the vehicle motion is controlled.

BRIEF DESCRIPTION OF THE DRAWINGS

The foregoing and/or further objects, features and advantages of the invention will become more apparent from the following description of an exemplary embodiment with reference to the accompanying drawings, in which like numerals are used to represent like elements and wherein:

FIG. 11 is a graph showing a relationship between an acceleration stroke and a target longitudinal acceleration gx1, which relationship is used by a gx1 computing unit 260 shown in FIG. 8;

FIG. 12 is another graph showing a relationship between a braking effort and a target longitudinal acceleration gx1, which relationship is used by the gx1 computing unit 260 shown in FIG. 8;

FIG. 29 is a table indicating the relationship between the speed ratio and the estimated torque ratio used in step S131 of the flowchart of FIG. 28;

DETAILED DESCRIPTION OF EXEMPLARY EMBODIMENT

An exemplary embodiment of the invention will be described in detail with reference to the accompanying drawings.

Figure 1:
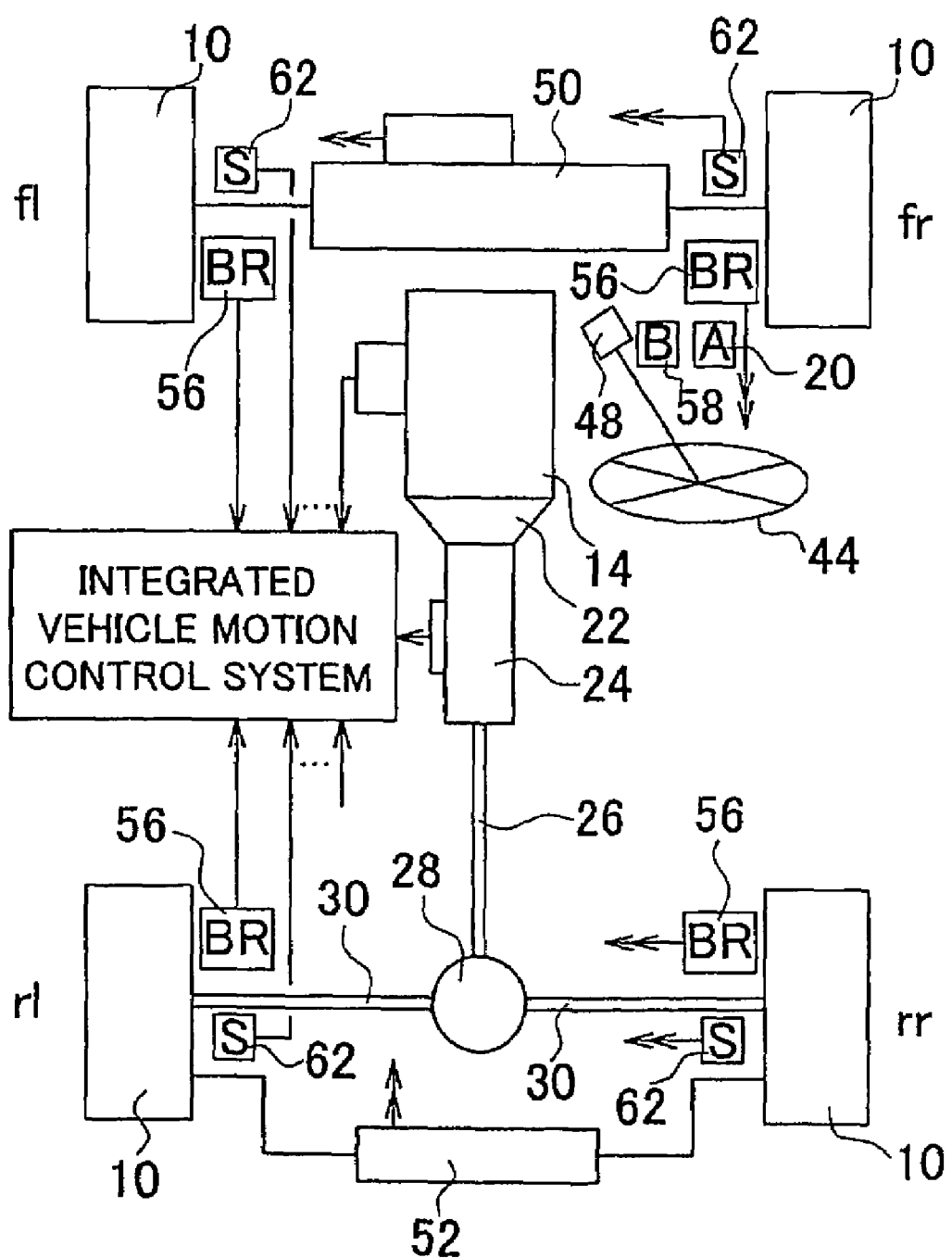
FIG. 1 is a plan view showing a motor vehicle on which an integrated vehicle motion control system according to one exemplary embodiment of the invention is installed.

FIG. 1 is a plan view schematically showing a motor vehicle on which an integrated vehicle motion control system according to one exemplary embodiment of the invention is installed. The integrated vehicle motion control system will be hereinafter simply referred to as "motion control system".

The vehicle of FIG. 1 includes front-left, front-fight, rear-left and rear-fight wheels 10. In FIG. 1, "fl" denotes a front-left wheel, "fr" denotes a front-fight wheel, "rl" denotes a rear-left wheel, and "rr" denotes a rear-fight wheel. The vehicle also includes an engine (internal combustion engine) 14 as a driving power source. The operating state of the engine 14 is electrically controlled depending upon an amount or degree by which an accelerator pedal 20 (as one example of an acceleration operating member) is operated by a driver of the vehicle. The operating state of the engine 14 is also automatically controlled as needed irrespective of the operation (hereinafter referred to as "driving operation" or "accelerating operation") performed on the accelerator pedal 20 by the driver.

The electric control of the engine 14 may be implemented by, for example, electrically controlling an opening angle (i.e., a throttle opening) of a throttle valve mounted in an intake manifold of the engine 14, or by electrically controlling an amount of fuel injected into a combustion chamber of the engine 14.

In the case where the vehicle is an electric vehicle, the driving power source principally consists of an electric motor. In the case where the vehicle is a hybrid vehicle, the driving power source principally consists of a combination of an engine and an electric motor.

The vehicle of FIG. 1 is a rear-wheel-drive vehicle in which the right and left front wheels are driven wheels, and the right and left rear wheels are driving wheels. The engine 14 is connected to each of the rear wheels via a torque converter 22, a transmission 24, a propeller shaft 26, a differential gear unit 28 and a drive shaft 30 that rotates with each of the rear wheels, which are arranged in the order of description. The torque converter 22, transmission 24, propeller shaft 26 and the differential gear unit 28 are power transmitting elements that are common to or shared by the right and left rear wheels.

The transmission 24 includes an automatic transmission that is not illustrated. The automatic transmission is adapted to electrically control the gear ratio or speed ratio at which the revolution speed of the engine 14 is changed to the speed of rotation of an output shaft of the transmission 24.

The vehicle of FIG. 1 further includes a steering wheel 44 adapted to be turned by the driver. A steering reaction force applying device 48 is adapted to electrically apply a steering reaction force to the steering wheel 44. The steering reaction force is a reaction force corresponding to a turning operation (hereinafter called "steering") conducted by the driver.

The direction of the right and left front wheels, which is called "front-wheel steering angle", is electrically changed by a front steering unit 50. The front steering unit 50 is adapted to control the front-wheel steering angle based on an angle, or a steering wheel angle, by which the steering wheel 44 is turned by the driver, and is also adapted to automatically control the front-wheel steering angle as needed irrespective of the turning operation by the driver. It is to be noted that in the present embodiment, the steering wheel 44 and the right and left front wheels are not mechanically linked with each other. Similarly to the front-wheel steering angle, the direction of the right and left rear wheels, which is called "rear-wheel steering angle", is electrically changed by a rear steering unit 52.

Each of the wheels 10 is provided with a brake assembly 56 that is operated so as to restrict its rotation. The brake assemblies 56 are electrically controlled according to an operated amount of a brake pedal 58 (as one example of brake operating member) by the driver. The brake assembly 56 for each wheel 10 may also be automatically controlled as needed.

In the vehicle of FIG. 1, a vehicle body (not shown) is suspended or supported by suspensions 62 each provided with respect to each of the wheels 10. The suspending characteristics of the respective suspensions 62 can be electrically controlled independently of one another.

Figure 23:
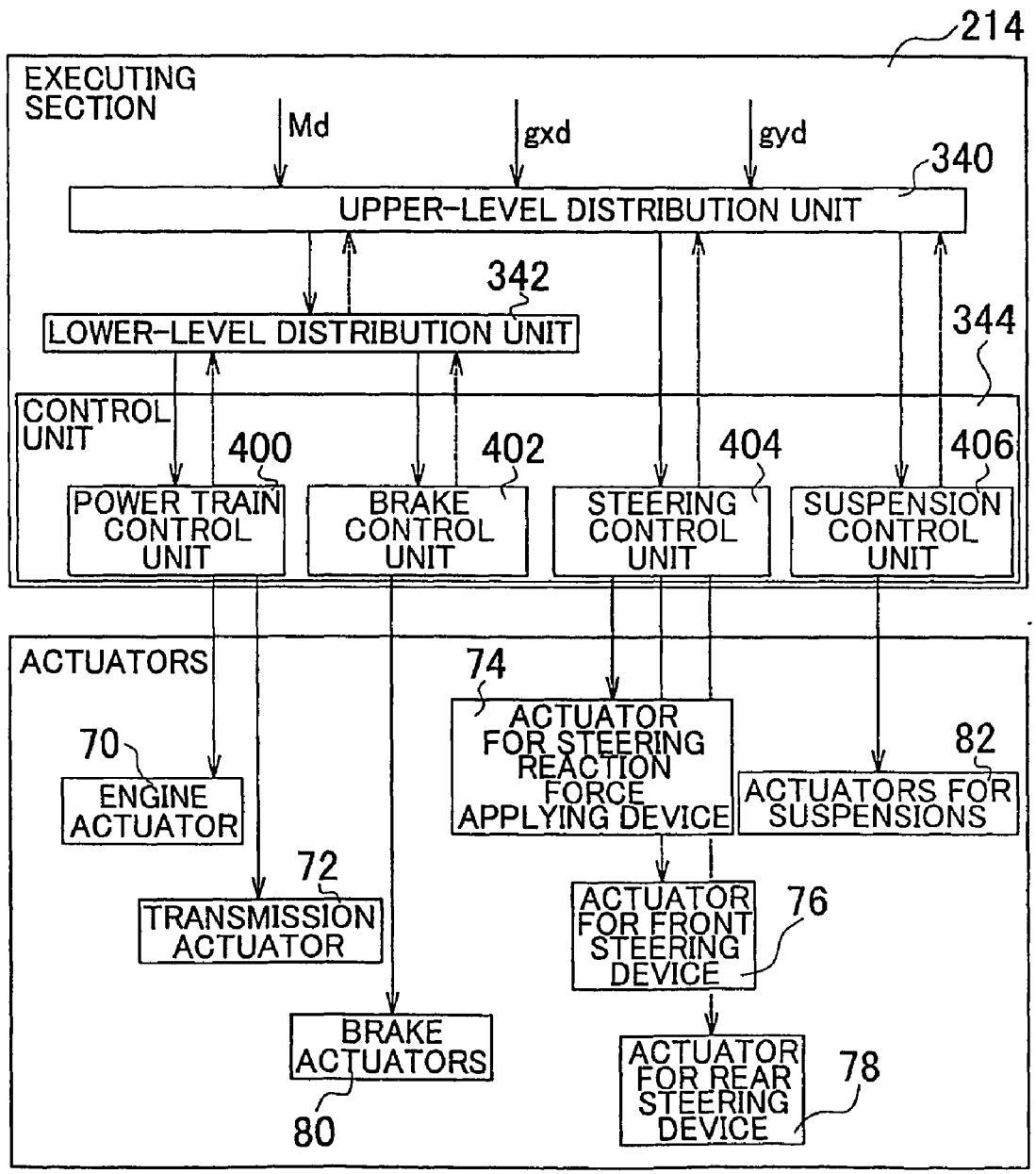
FIG. 23 is a block diagram showing in detail an executing unit 214 and actuators shown in FIG. 4.

The constituent elements of the vehicle as described above are provided with actuators adapted to be operated so as to electrically operate the corresponding elements. FIG. 23 shows some examples of the actuators as follows:

(1) Actuator 70 for electrically controlling the engine 14

(2) Actuator 72 for electrically controlling the transmission 24

(3) Actuator 74 for electrically controlling the steering reaction force applying device 48

(4) Actuator 76 for electrically controlling the front steering unit 50

(5) Actuator 78 for electrically controlling the rear steering unit 52

(6) A plurality of actuators 80 (only one of which is typically shown in FIG. 23) each of which is provided in conjunction with each of the brake assemblies 56, for electrically controlling the braking torque applied by the brake assembly 56 to a corresponding one of the wheels 10

(7) A plurality of actuators 82 (only one of which is typically shown in FIG. 23) each of which is provided in conjunction with each of the suspensions 62, for electrically controlling the suspending characteristic of the corresponding suspension 62

As shown in FIG. 1, the motion control system, which is connected to the plurality of actuators 70 through 82 as described above, is installed on the vehicle. The motion control system is actuated by using electric power supplied from a battery (as one example of vehicle power supply) that is not illustrated.

Figure 2:
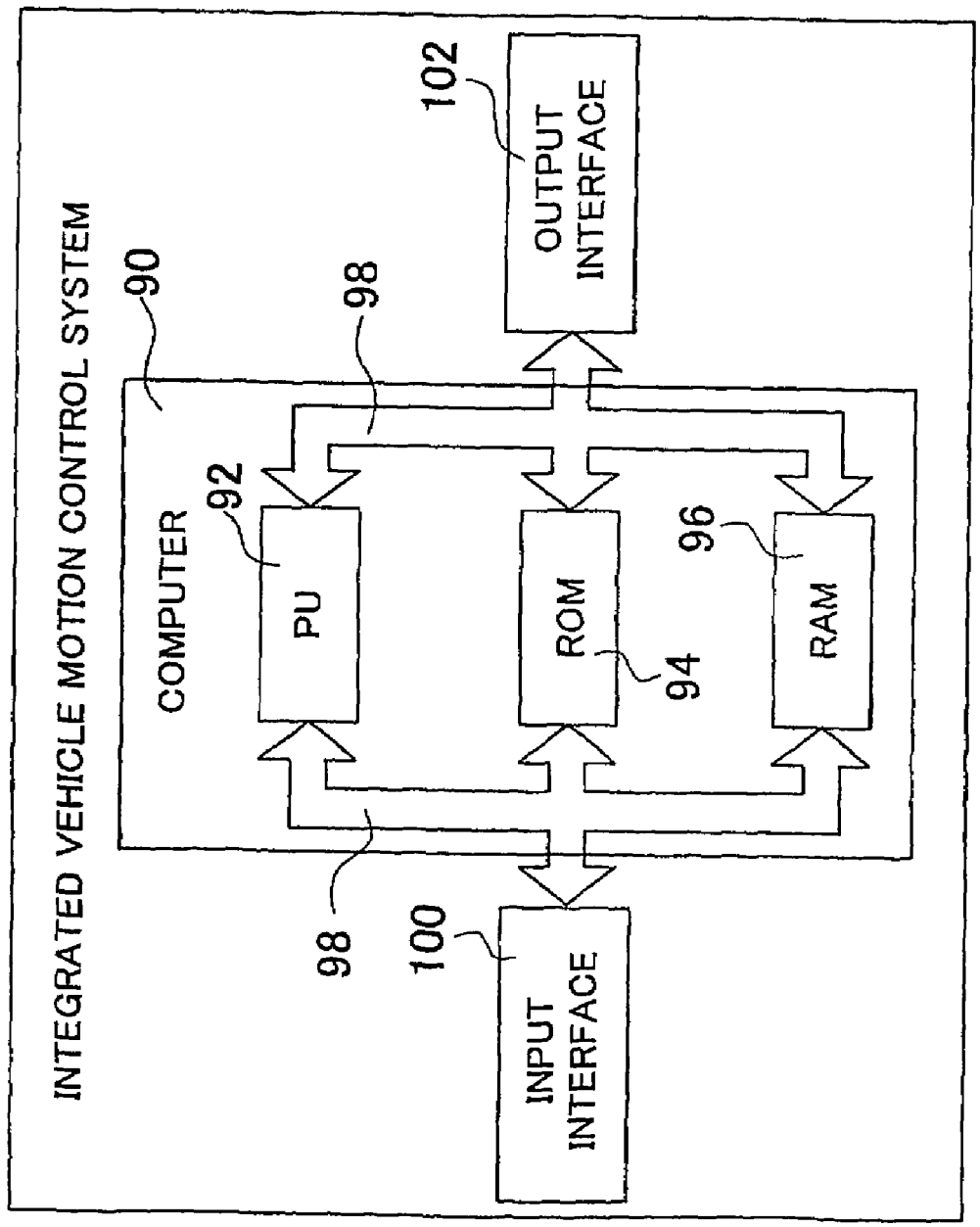
FIG. 2 is a block diagram schematically showing the hardware configuration of the integrated vehicle motion control system of FIG. 1.

FIG. 2 is a block diagram schematically showing the hardware configuration of the integrated vehicle motion control system of the present embodiment. The motion control system includes a computer 90 as a main component thereof. As well known in the art, the computer 90 includes a processing unit (hereinafter referred to as "PU") 92, ROM (as one example of memory) 94, and RAM (as another example of memory) 96, which are connected to each other by buses 98.

Figure 4:
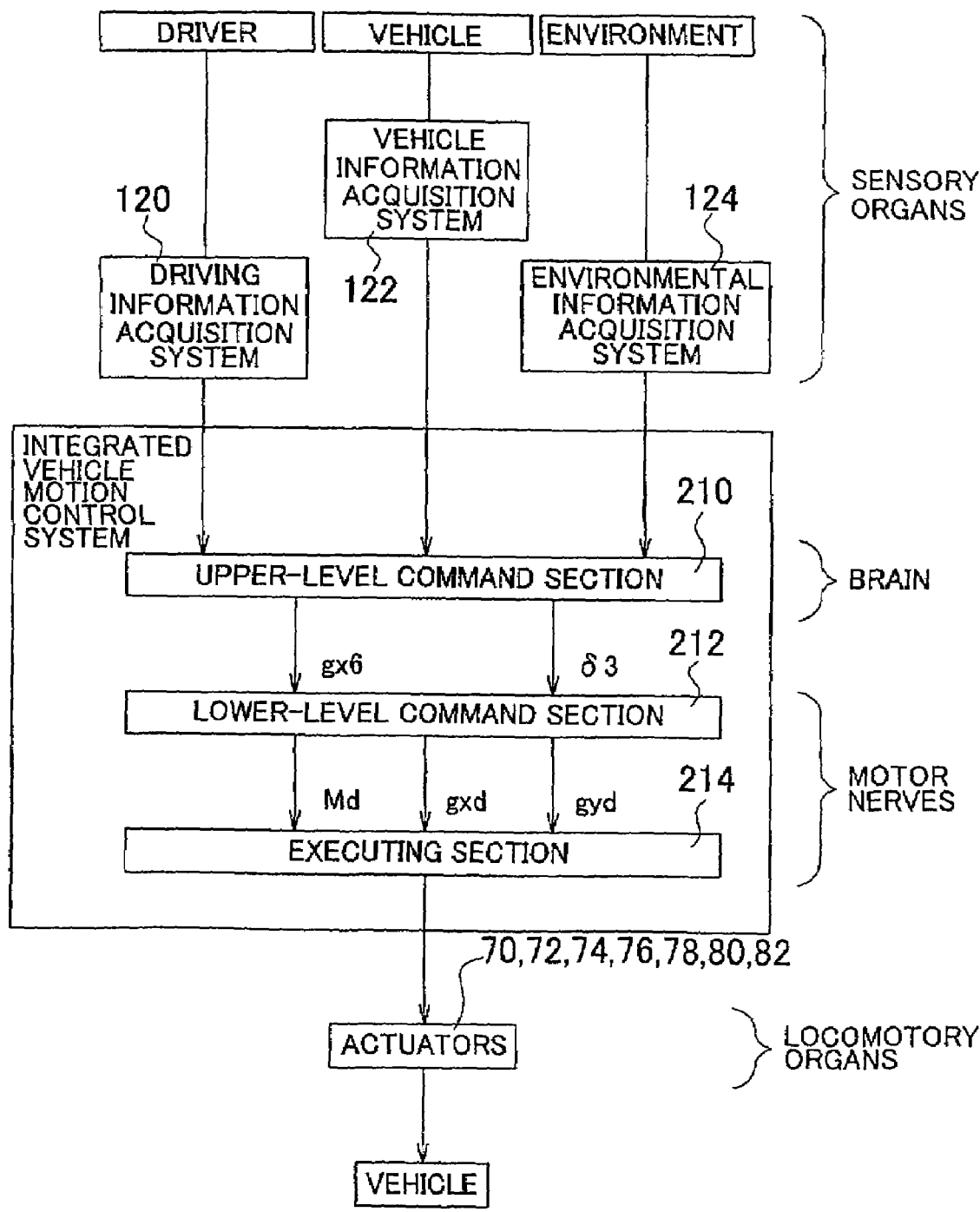
FIG. 4 is a block diagram useful for explaining the functions realized by the integrated vehicle motion control system of FIG. 1 and the software configuration of the system.

The PU 92 includes a total of three CPUs (not shown) that are respectively assigned to an upper-level command section 210, a lower-level command section 212, and an executing section 214 which are shown in FIG. 4. The three CPUs share the single ROM 94 and the single RAM 96. Thus, in the present embodiment, the upper-level command section 210, lower-level command section 212 and the executing section 214 are constructed independently of each other with respect to the PU 92.

In another embodiment, each of the CPUs is provided with dedicated ROM 94 and RAM 96. In this case, the upper-level command section 210, lower-level command section 212 and the executing section 214 are constructed independently of each other with respect to the ROM 94 and RAM 96 as well as the PU 92.

In a further embodiment, the PU 92 consists of one CPU, and the single CPU is commonly used by the upper-level command section 210, the lower-level command section 212 and the executing section 214.

It is also possible to assign a plurality of CPUs to each of at least one of the upper-level command section 210, lower-level command section 212 and the executing section 214, so that the CPUs of each section can perform parallel processing in the strict sense.

The motion control system further includes an input interface 100 and an output interface 102 that are respectively connected to the buses 98. The motion control system is connected to various sensors and other external devices as described later, via the input interface 100, and is also connected to various actuators as indicated above, via the output interface 102.

Figure 3:
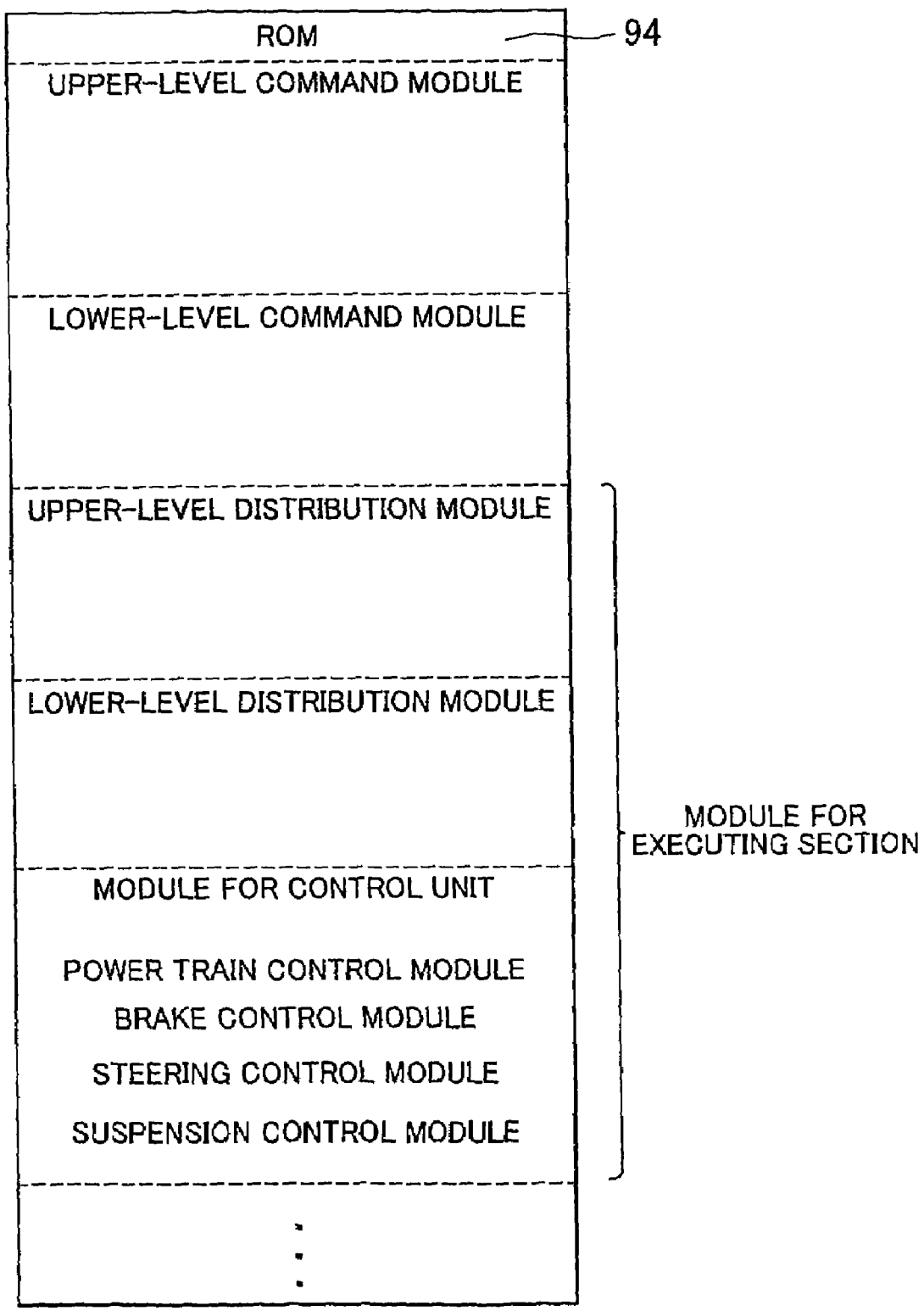
FIG. 3 is a block diagram schematically showing the configuration of ROM of the system of FIG. 1.

FIG. 3 schematically shows the configuration of the ROM 94, which will be described later.

FIG. 4 is a block diagram schematically showing the software configuration of the integrated vehicle motion control system of the present embodiment. FIG. 4 also shows various systems, units or devices connected to the motion control system.

As shown in FIG. 4, the motion control system is associated at its input side, or the upstream side of the main flow of information, with the driver, the vehicle operated by the driver, and the environment of the vehicle.

A driving information acquisition system 120 serves to acquire information on operations performed by the driver, and send the information to the motion control system. A vehicle information acquisition system 122 serves to acquire vehicle information on vehicle state quantities as described later, and send the vehicle information to the motion control system. An environmental information acquisition system 124 serves to acquire environmental information on the environment of the vehicle, and send the environmental information to the motion control system.

The motion control system is able to retrieve necessary information from the driving information acquisition system 120, the vehicle information acquisition system 122, and the environmental information acquisition system 124 as needed at any time. In addition, the motion control system is able to cause one of a plurality of processing sections (i.e., the upper-level command section 210, the lower-level command section 212 and the executing section 214) to use information retrieved by another one of the processing sections.

Figure 5:
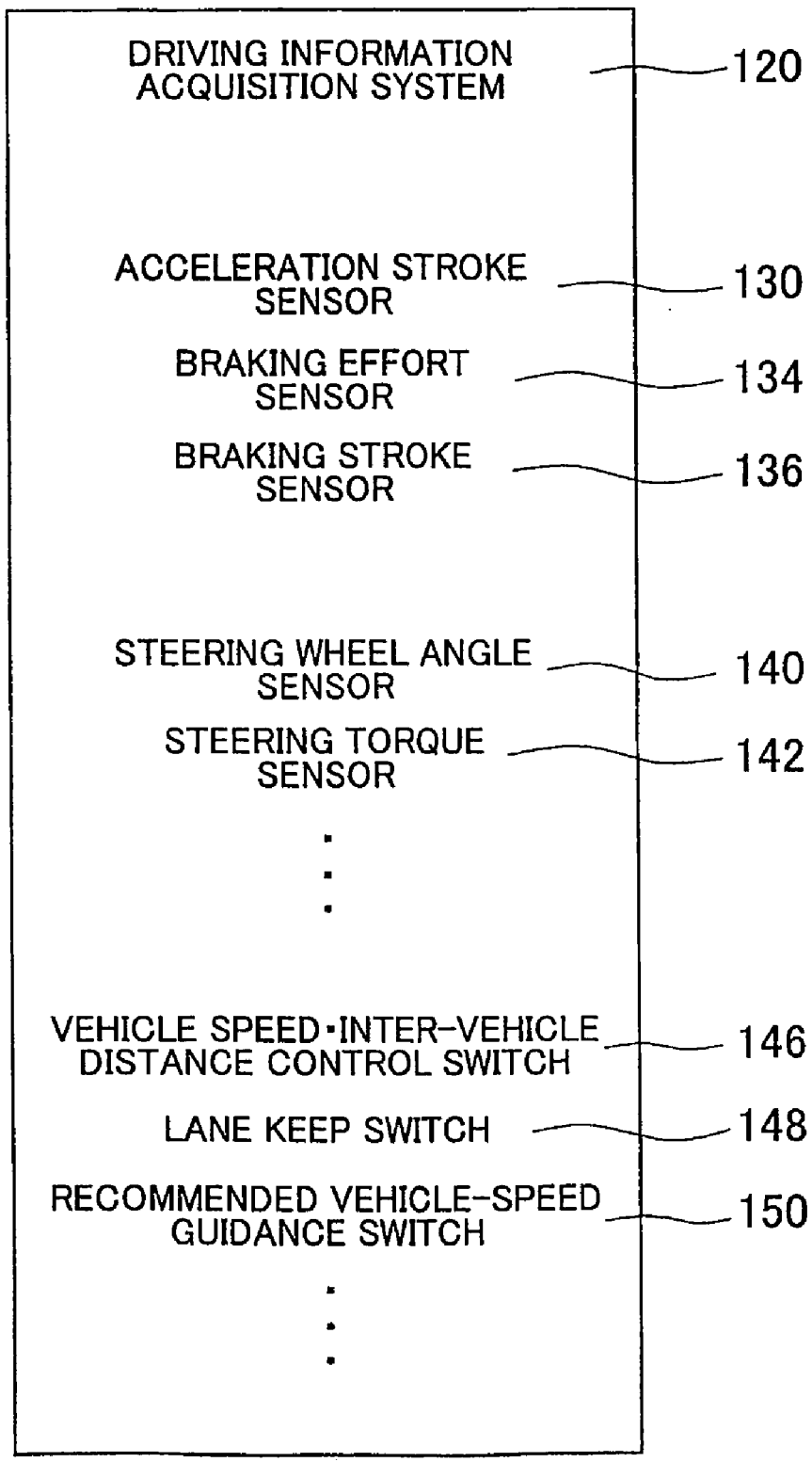
FIG. 5 is a block diagram schematically showing a driving information acquisition system shown in FIG. 4.

FIG. 5 indicates various sensors and various switches that constitute the driving information acquisition system 120. The sensors and switches are listed below.

(1) Sensor(s) Relating to Driving Operations

Acceleration stroke sensor 130: sensor for measuring a stroke (which may be expressed by a rotation angle or an accelerator position) of the accelerator pedal 20 operated (e.g., pressed down) by the driver (2) Sensors Relating to Braking Operations Braking effort sensor 134: sensor for measuring a force applied to the brake pedal 58 by the driver Braking stroke sensor 136: sensor for measuring a stroke of the brake pedal 58 operated by the driver (3) Sensors Relating to Steering Operations Steering wheel angle sensor 140: sensor for measuring an angle of rotation (i.e., steering wheel angle) of the steering wheel 44 manipulated by the driver Steering torque sensor 142: sensor for measuring a steering torque applied by the driver to the steering wheel 44

(4) Various Switches

Figure 6:
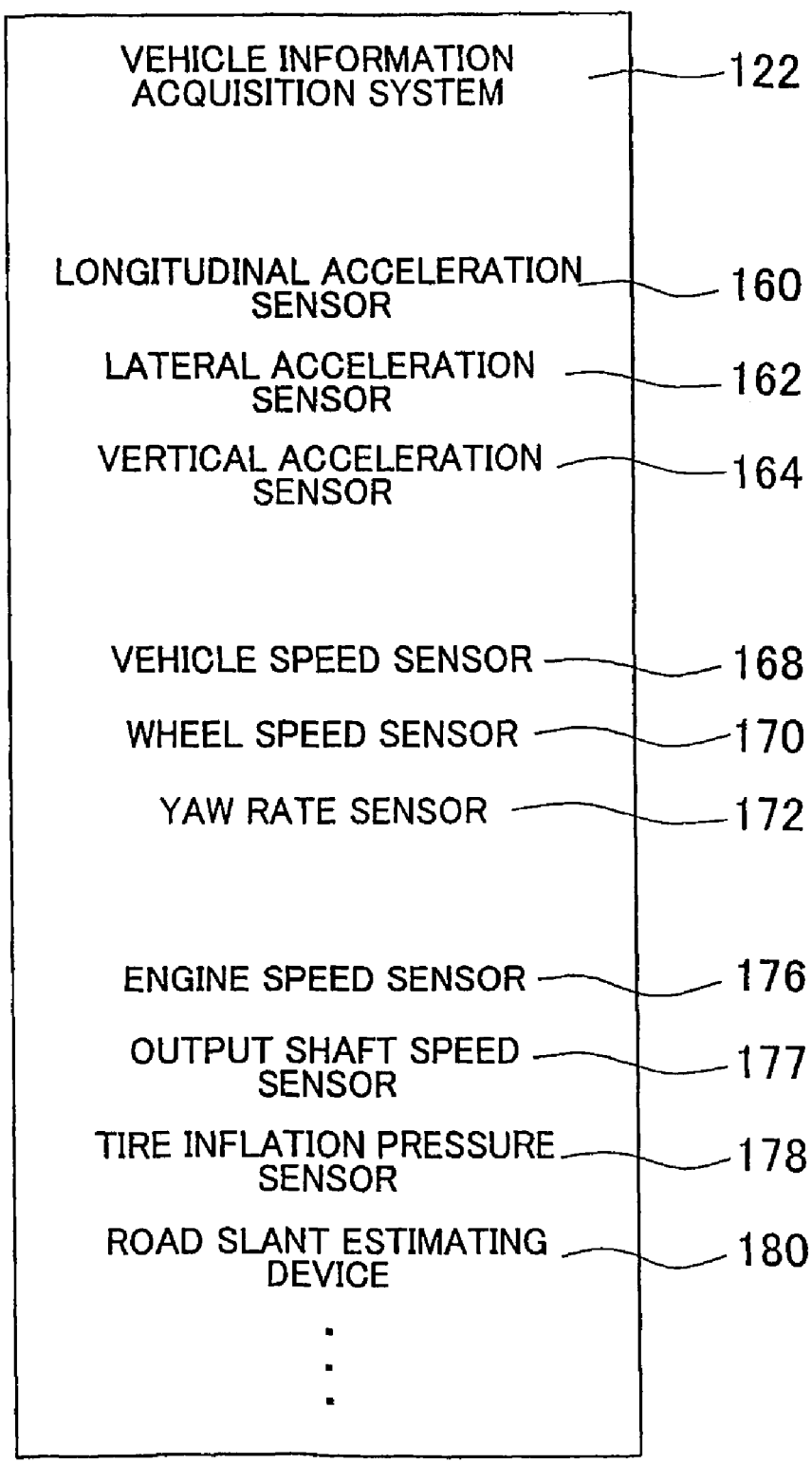
FIG. 6 is a block diagram schematically showing a vehicle information acquisition system shown in FIG. 4.

Vehicle-speed·inter-vehicle-distance control switch 146: switch to be operated by the driver for permitting vehicle-speed·inter-vehicle-distance control as described later Lane keep switch 148: switch to be operated by the driver for permitting lane keep control as described later Recommended vehicle-speed guidance switch 150: switch to be operated by the driver for permitting recommended vehicle-speed guidance control as described later FIG. 6 shows various devices as listed below, which constitute the vehicle information acquisition system 122.

(1) Sensors Relating to Accelerations

Longitudinal acceleration sensor 160: sensor for measuring the longitudinal acceleration of the vehicle Lateral acceleration sensor 162: sensor for measuring the lateral acceleration of the vehicle, which is basically the lateral acceleration acting on the center of gravity of the vehicle Vertical acceleration sensor 164: sensor for measuring the relative vertical acceleration between each wheel 10 and the vehicle body (2) Sensors Relating to Speeds Vehicle speed sensor 168: sensor for measuring the vehicle speed, which is the running speed of the vehicle Wheel speed sensor 170: sensor for measuring the wheel speed, which is the speed of rotation of each wheel 10

Yaw rate sensor 172: sensor for measuring the yaw rate of the vehicle body about the center of gravity of the vehicle (3) Sensors Relating to the Power Train Engine speed sensor 176: sensor for measuring the speed of revolution of the engine 14

Output shaft speed sensor 177: sensor for measuring the speed of rotation of an output shaft of the torque converter 22

(4) Other Sensing Devices:

Tire inflation pressure sensor 178: sensor for measuring the tire inflation pressure of each wheel 10

Road slant estimating device 180: device for estimating the slant angle (in particular, the slant angle in the lateral direction of the vehicle) of the road on which the vehicle is running The road slant estimating device 180 may be able to estimate the slant angle based on signals from, for example, part of the sensors, such as the lateral acceleration sensor 162, wheel speed sensor 170, and the yaw rate sensor 172, which are included in the vehicle information acquisition system 122.

Figure 7:
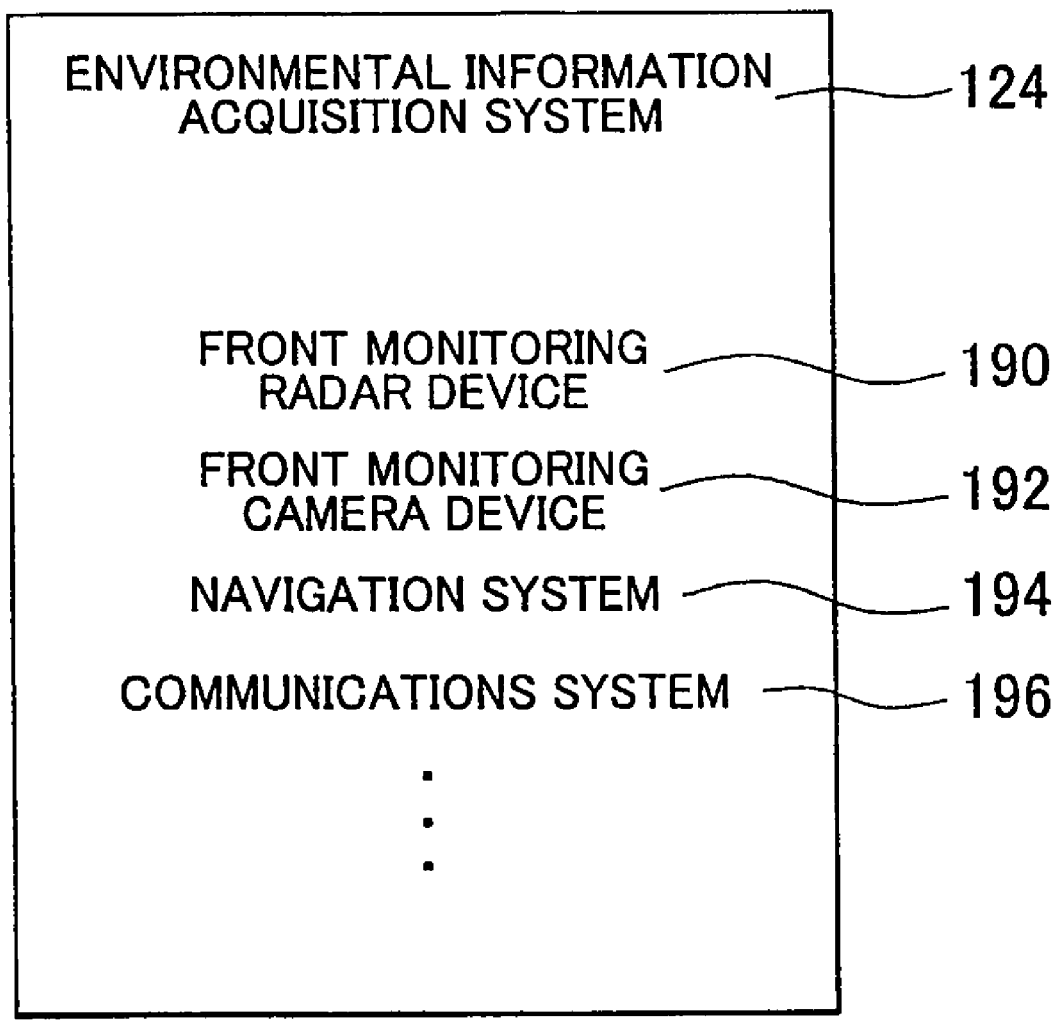
FIG. 7 is a block diagram schematically showing an environmental information acquisition system shown in FIG. 4.

FIG. 7 shows various devices as listed below, which constitute the environmental information acquisition system 124.

(1) Front Monitoring Radar Device 190

This device is adapted to monitor by radar the distance, position, or the like of an object (such as a forward vehicle or an obstacle) that exists in front of the vehicle, relative to the vehicle in question.

(2) Front Monitoring Camera Device 192

This device is adapted to capture, by a camera, an image (including, for example, a road, a forward vehicle, an obstacle, or the like) in front of the vehicle in question.

(3) Navigation System 194

This system is used for confirming or determining the current position of the vehicle on the globe or on a map, and guiding the vehicle along a selected road on the map.

(4) Communications System 196

This system is adapted to receive by wireless environmental information relating to surface conditions (such as a road μ) or geometric features (such as a road shape) of the road on which the vehicle is currently running or is going to run, and environmental information, such as a speed limit and a stop position(s), which are determined according to the Road Traffic Act or other regulations with respect to the road.

The communications system 196 may also be designed to have a function of transmitting various sorts of information estimated by the subject vehicle to the outside, such as another vehicle, or an information management center. The various information estimated by the subject vehicle may be defined to include information relating to the coefficient of friction p of the road on which the subject vehicle has traveled or is currently running, and information relating to the running track or path on which the subject vehicle is advised to travel.

As shown in FIG. 4, the software configuration of the integrated vehicle motion control system is constructed in the form of a hierarchy having a plurality of hierarchical levels, such that the upper-level command section 210, lower-level command section 212 and the executing section 214 are arranged in series in this order in a direction from the driving information acquisition system 120, vehicle information acquisition system 122 and the environmental information acquisition system 124 toward the actuators 70 through 82.

As shown in FIG. 3, the ROM 94 stores a upper-level command module associated with the upper-level command section 210. Furthermore, the ROM 94 stores a lower-level command module associated with the lower-level command section 214, and an execution module associated with the executing section 215, which will be described later.

In the meantime, one module may be constructed to include only one program unit that defines one control flow, or may be constructed to include a plurality of program units. For example, the upper-level command module may be constructed to include a plurality of program units respectively provided for carrying out calculation of a target longitudinal acceleration, calculation of a target steer angle, and selection of final target values, as described later.

In the present embodiment, the respective modules are executed by the PU 92 independently of each other with respect to the upper-level command section 210, the lower-level command section 212 and the executing section 214.

Here, the functions of the motion control system and the associated acquisition systems 120, 122, 124 and actuators 70 through 82 may be schematically explained in contrast with the functions of human beings. As shown in FIG. 4, the acquisition systems 120, 122, 124 perform functions similar to those of sensory organs of the human beings, and the upper-level command section 210 performs functions similar to those of the human brain, while the lower-level command section 212 and the executing section 214 perform functions similar to those of motor nerves of the human beings. The actuators 70 through 82 perform functions similar to those of organs of locomotion of the human beings.

Figure 8:
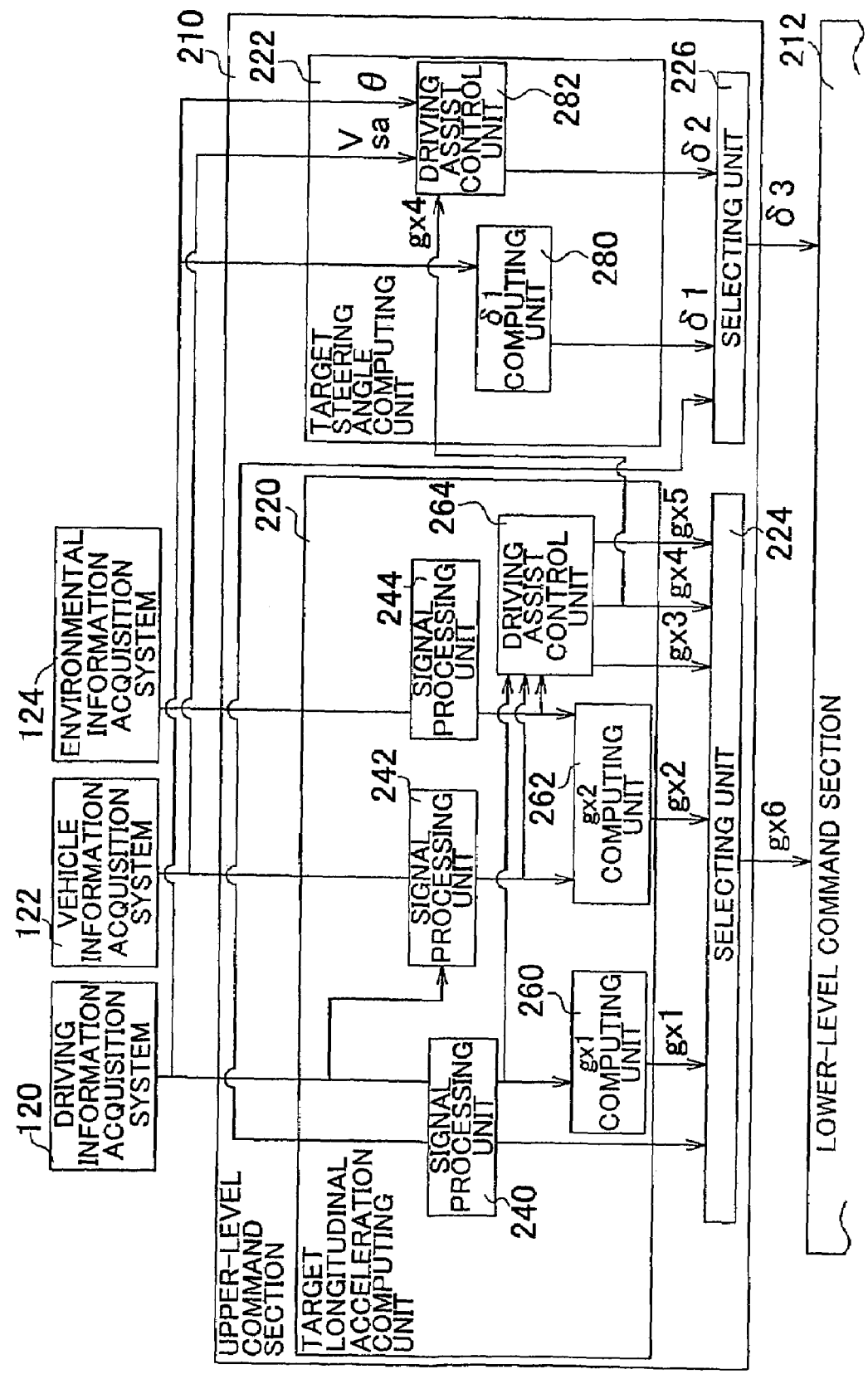
FIG. 8 is a block diagram showing in detail an upper-level command section 210 shown in FIG. 4.

FIG. 8 is a block diagram showing the software configuration of the upper-level command section 210, which is organized in terms of the functions.

The upper-level command section 210 may include the following units:

(1) Target longitudinal acceleration computing unit 220: unit corresponding to a target longitudinal acceleration computing module (as the upper-level command module as shown in FIG. 3), and adapted for computing a plurality of target longitudinal accelerations gx1 through gx5, from which one target longitudinal acceleration is to be selected for the vehicle (2) Target steering angle computing unit 222: unit corresponding to a target steering angle computing module (as the upper-level command module as shown in FIG. 3), and adapted for computing a plurality of target steering angles δ1 and δ2 from which one steering angle is selected for the vehicle (3) Selecting unit 224: unit corresponding to one of two selection modules (as the upper-level command module as shown in FIG. 3), and adapted for selecting one of the above-indicated plurality of target longitudinal accelerations as a target longitudinal acceleration gx6

(4) Selecting unit 226: unit corresponding to the other of the two selecting modules (FIG. 3), and adapted for selecting one of the above-indicated plurality of target steering angles as a target steering angle δ3

The target longitudinal acceleration computing unit 220 includes three signal processing units 240, 242 and 244.

(1) Signal Processing Unit 240

This unit 240 serves to convert signals from the driving information acquisition system 120, into corresponding signals that can be processed by the computer 90.

(2) Signal Processing Unit 242

This unit 242 serves to convert signals from the vehicle information acquisition system 122, into corresponding signals that can be processed by the computer 90.

Figure 9:
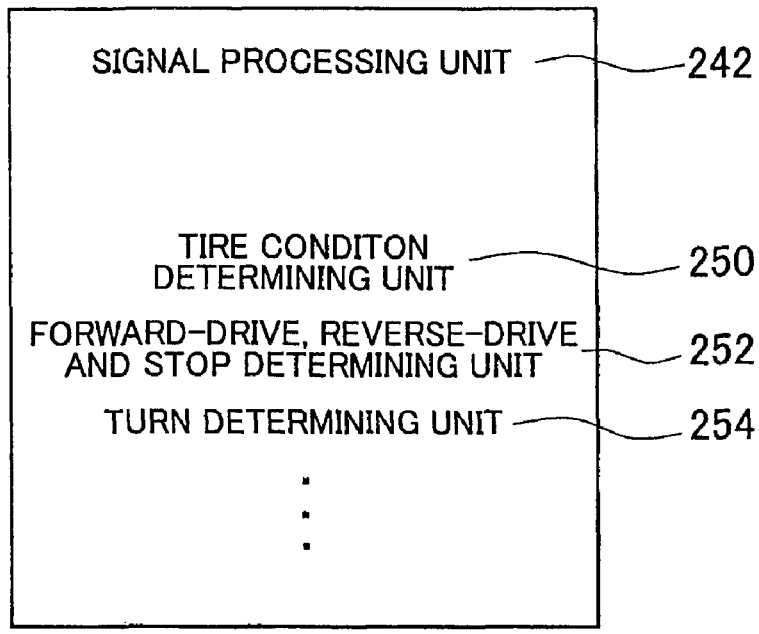
FIG. 9 is a block diagram schematically showing a signal processing unit 242 shown in FIG. 8.

As shown in FIG. 9, the signal processing unit 242 includes a tire condition determining unit 250. This unit 250 is adapted to determine whether the conditions (including, for example, an inflation pressure, surface characteristics and so forth) of the tire of each wheel 10 are abnormal, based on signals from the tire inflation pressure sensor 178, the wheel speed sensor 170 and so forth.

The signal processing unit 242 further includes a forward-drive, reverse-drive and stop determining unit 252, as shown in FIG. 9. This unit 252 is adapted to determine whether the vehicle is currently running in the forward direction or in the reverse direction, or is at a stop, based on signals from the wheel speed sensors 170.

For example, the forward-drive, reverse-drive and stop determining unit 252 determines that the vehicle is at a stop when the wheel speeds of all of the four wheels are equal to zero, and determines that the vehicle is running in the forward direction when the wheel speed of at least one of the four wheels is a positive value. The determining unit 252 also determines that the vehicle is running in the reverse direction when the wheel speed of at least one of the four wheels is a negative value.

The signal processing unit 242 further includes a turn determining unit 254, as shown in FIG. 9. This unit 254 is adapted to determine whether the vehicle is currently turning, based on signals from the steering wheel angle sensor 140, yaw rate sensor 172 and so forth.

For example, the turn determining unit 254 determines that the vehicle is currently turning when the absolute value of the steering wheel angle is larger than a set value (for example, 30 degrees) which is not equal to zero, or when the absolute value of the yaw rate is larger than a set value which is not equal to zero. The determining unit 254 determines that the vehicle is not turning in the other cases.

(3) Signal Processing Unit 244

This unit 244 serves to convert signals from the environmental information acquisition system 124 into signals that can be processed by the computer 90, as shown in FIG. 8.

Figure 10:
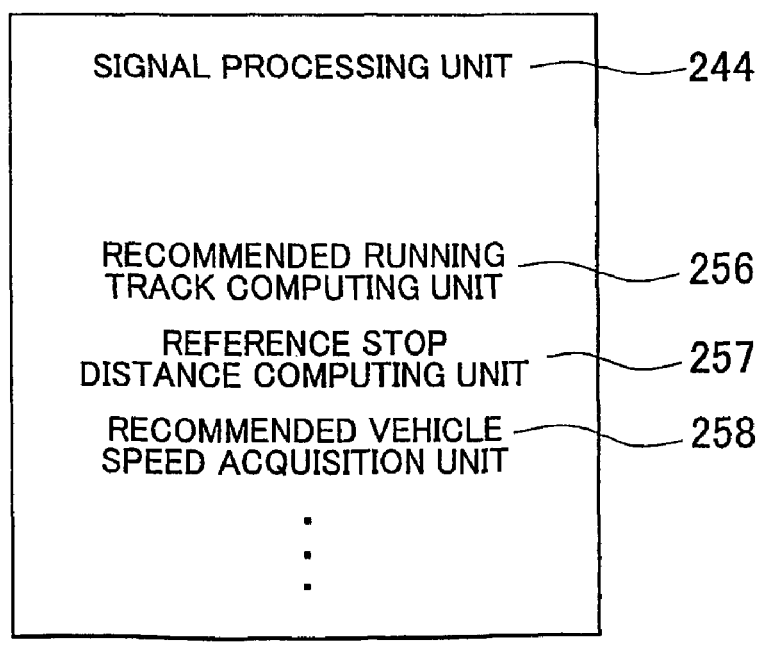
FIG. 10 is a block diagram schematically showing a signal processing unit 244 shown in FIG. 8.

As shown in FIG. 10, the signal processing unit 244 unit includes a recommended running track computing unit 256. This unit is adapted to compute a recommended running track along which the vehicle is advised to travel from each local point during running until a set time T0 sec. passes.

For example, the set time T0 may be calculated as time it takes the vehicle to stop when the running speed of the vehicle is reduced (i.e., the vehicle is decelerated) from the current vehicle speed, at a predetermined deceleration (for example, $-2.0$ m/s$^2$). It is also possible to compute the set time T0 as time it takes the vehicle to stop when the vehicle is decelerated at a target deceleration that changes with time, by a computing method as described later.

In the recommended running track computing unit 256, the recommended running track may be computed based on, for example, a vehicle front image taken by the front monitoring camera device 192, the current position acquired by the navigation system 194, and the geometrical shape (for example, a straight road or a curved road) of a portion of the road on which the vehicle is currently running, which portion the vehicle is supposed to pass when traveling from each local point by the time when the set time T0 elapses. The recommended running track is defined as a center line of a lane on the road on which the vehicle is currently running.

The signal processing unit 244 further includes a reference stop distance computing unit 257, shown in FIG. 10. This unit 257 is adapted to compute, as a reference stop distance, a distance required for the vehicle to stop when it is decelerated as far as the deceleration of the vehicle does not exceed a set value (for example, $-3.0$ m/s$^2$). It is also possible to compute a reference stop distance from a distance required for the vehicle to stop when the vehicle is decelerated at a target deceleration that changes with time, by a computing method as described later.

The reference stop distance computing unit 257 retrieves road $\mu$ information of the road on which the vehicle is currently running or is about to run, from, for example, the communications system 195, a vehicle state quantity estimating unit (which will be described later), and the like. The road $\mu$ information may include a coefficient of friction, and information as to whether the road in question is any of a dry asphalt road, a wet asphalt road, a snow road, a pressed snow road, a crust (or frozen road), and a gravel road.

The reference stop distance computing unit 257 further retrieves information relating to the radius of curvature (as one example of the road shape) at each point of the road on which the vehicle is currently running or is about to run, from, for example, the communications system 196, navigation system 194, front monitoring camera device 192, and the like.

The reference stop distance computing unit 257 computes the distance required for the vehicle to stop when it is decelerated from the current vehicle speed, as a reference stop distance, according to the following computing method, based on, for example, the road $\mu$ information and the radius of curvature information retrieved as described above. The computing method is the same as that mentioned twice in the above description.

(1) Calculation of Current Vehicle State

The current lateral acceleration GY and target longitudinal acceleration GX of the vehicle are computed based on the road $\mu$ (represented by the above-described road $\mu$ information) for the road on which the vehicle is currently running, and the current vehicle speed V.

The current lateral acceleration GY may be obtained by dividing the square of the current vehicle speed V by the current turning radius R of the vehicle (which may be obtained from the radius of curvature information or the steering wheel angle), or may be obtained as a detection value of the lateral acceleration sensor 162.

If the lateral acceleration GY thus calculated exceeds a half of the road $\mu$ (one example of a set value that is set lower than the road $\mu$ in view of errors in the road $\mu$ information) or a limit value (for example, 3.0 m/s$^2$), the current target longitudinal acceleration GX is set to min ($\sqrt{((0.8 \cdot \mu \cdot 9.8)^2 - GY^2)}$, 3.0). If not, the current target longitudinal acceleration GX is set to zero.

If the value in the square root is negative, which makes the calculation impossible, the current target longitudinal acceleration GX is made equal to a set deceleration (for example, $-1.0$ m/s$^2$).

(2) Calculation of Vehicle State to be Established 5 ms Later (as an Example of Computing Interval)

The vehicle speed V5 to be established 5 ms after the current point of time is estimated according to the following equation.

$V5 = V + GX \cdot 0.005$

The distance L5 of the vehicle from the current position to a position reached 5 ms after the current time in the running direction is calculated according to the following equation.

$L5 = V \cdot 0.005$

The lateral acceleration GY5 to be established 5 ms later is estimated according to the following equation, in which R5 represents the radius of curvature of the road at a point separated from the current position of the vehicle by distance L5 in the running direction.

$GX5 = V5^2 / R5$

The target longitudinal acceleration GY5 to be established 5 ms later is determined based on the estimated lateral acceleration GY5, as in the case of (1) above.

(3) Calculation of Vehicle State to be Established 10 ms Later

The vehicle speed V10 to be established 10 ms after the current time is estimated according to the following equation.

$V10 = V5 + GX5 \cdot 0.005$

The distance L10 of the vehicle from the current position to a position to be reached 10 ms later in the running direction is calculated according to the following equation.

$L10 = L5 + V5 \cdot 0.005$

The lateral acceleration GY10 to be established 10 ms later is estimated according to the following equation, in which R10 represents the radius of curvature of the road at a point separated from the current position of the vehicle by distance L10 in the running direction.

$GX10 = V10^2 / R10$

The target longitudinal acceleration GY10 to be established 10 ms later is determined based on the estimated lateral acceleration GY10, as in the case of (1) above.

(4) Calculation of Vehicle State to be Established 5·n[ms] Later (where n: Computing Cycle≧3)

The vehicle speed V(5·n) to be established 5·n[ms] after the current time is estimated according to the following equation.

$$V(5 \cdot n) = V(5 \cdot (n-1)) + GX(5 \cdot (n-1)) \cdot 0.005$$

The distance L(5·n) of the vehicle from the current position to a position to be reached 5·n[ms] later in the running direction is calculated according to the following equation.

$$L(5 \cdot n) = L(5 \cdot (n-1)) + V(5 \cdot (n-1)) \cdot 0.005$$

The lateral acceleration GY(5·n) to be established 5·n[ms] later is estimated according to the following equation, in which R(5·n) represents the radius of curvature of the road at a point separated from the current position of the vehicle by distance L(5·n) in the running direction.

$$GX(5 \cdot n) = V(5 \cdot n)^2 / R(5 \cdot n)$$

The target longitudinal acceleration GY(5·n) to be established 5·n[ms] later is determined based on the estimated lateral acceleration GY(5·n), as in the case of (1) above.

(5) The above computing cycles are repeated until the vehicle speed V(5·n) becomes equal to zero, namely, until the Vehicle is stopped. The distance V(5·n) at this time is determined as the reference stop distance.

To add to the above, the road μ used in each computing cycle may be obtained from the outside for each computing cycle, but may also be obtained from the outside, for example, at intervals of a set time (for example, 1 sec. or several minutes) longer than the period of the computing cycle, taking account of the fact that the road μ does not change so frequently.

According to the computing method as described above, the vehicle speed, the distance as measured in the running direction, the longitudinal acceleration and the lateral acceleration at each point up to a point at which the vehicle is stopped are estimated in advance. The thus estimated vehicle conditions may be used not only for calculating the reference stop distance, but also for other purposes. For example, the estimated vehicle state quantities may be easily used for accurately predicting in advance control operations to be currently performed on the vehicle so that the vehicle will satisfy a certain requirement at a certain point in the future, and controlling the vehicle speed in accordance with the predicted controls, without exceeding vehicle limits physically determined by, e.g., the road μ, The signal processing unit 244 further includes a recommended vehicle speed acquisition unit 258, as shown in FIG. 10. This unit 258 serves to acquire traffic information, such as a speed limit and a stop position(s), determined by regulations with respect to the road on which the vehicle is current running or is about to run, based on signals which the communications system 196 receive by wireless from the outside of the vehicle, and compute a recommended vehicle speed which the actual vehicle speed is recommended not to exceed so that the driver conforms to the traffic regulations, based on the traffic information thus acquired.

As shown in FIG. 8, the target longitudinal acceleration computing unit 220 includes a gx1 computing unit 260, a gx2 computing unit 262 and a driving assist control unit 264, which operate to compute the above-indicated plurality of target longitudinal accelerations.

The gx1 computing unit 260 computes a target longitudinal acceleration gx1 by selectively using the acceleration stroke and the braking effort (i.e., force applied to the brake pedal) acquired by the driving information acquisition system 120.

More specifically, the gx1 computing unit 260 computes the target longitudinal acceleration gx1 based on the acceleration stroke ace, according to the relationship as shown in the graph of FIG. 11, for example, when the acceleration stroke is larger than zero and the braking effort is equal to zero (i.e., when a driving action by the driver is detected). When the braking effort is larger than zero (i.e., when a brake is applied), on the other hand, the gx1 computing unit 260 computes the target longitudinal acceleration gx1 based on the braking effort br, according to the relationship as shown in the graph of FIG. 12.

The gx2 computing unit 262 computes a target longitudinal acceleration gx2 based on the recommended running track and the road μ information. More specifically, the gx2 computing unit 262 determines, as the longitudinal acceleration gx2, a longitudinal acceleration at which the vehicle is supposed to run at each point, with respect to a portion of the recommended running track that corresponds to the reference stop distance, by the same method as the above-described method of computing the longitudinal acceleration for obtaining the reference stop distance.

The driving assist control unit 264 selects an appropriate one or ones of the above-described actuators 70 through 82 and automatically controls the selected actuator(s), for the purpose of improving the safety of the vehicle by executing, in lieu of the driver, driving operations that should be originally performed by the driver or by making up for insufficiencies of the driving skill, judgments and attentions of the driver.

Figure 13:
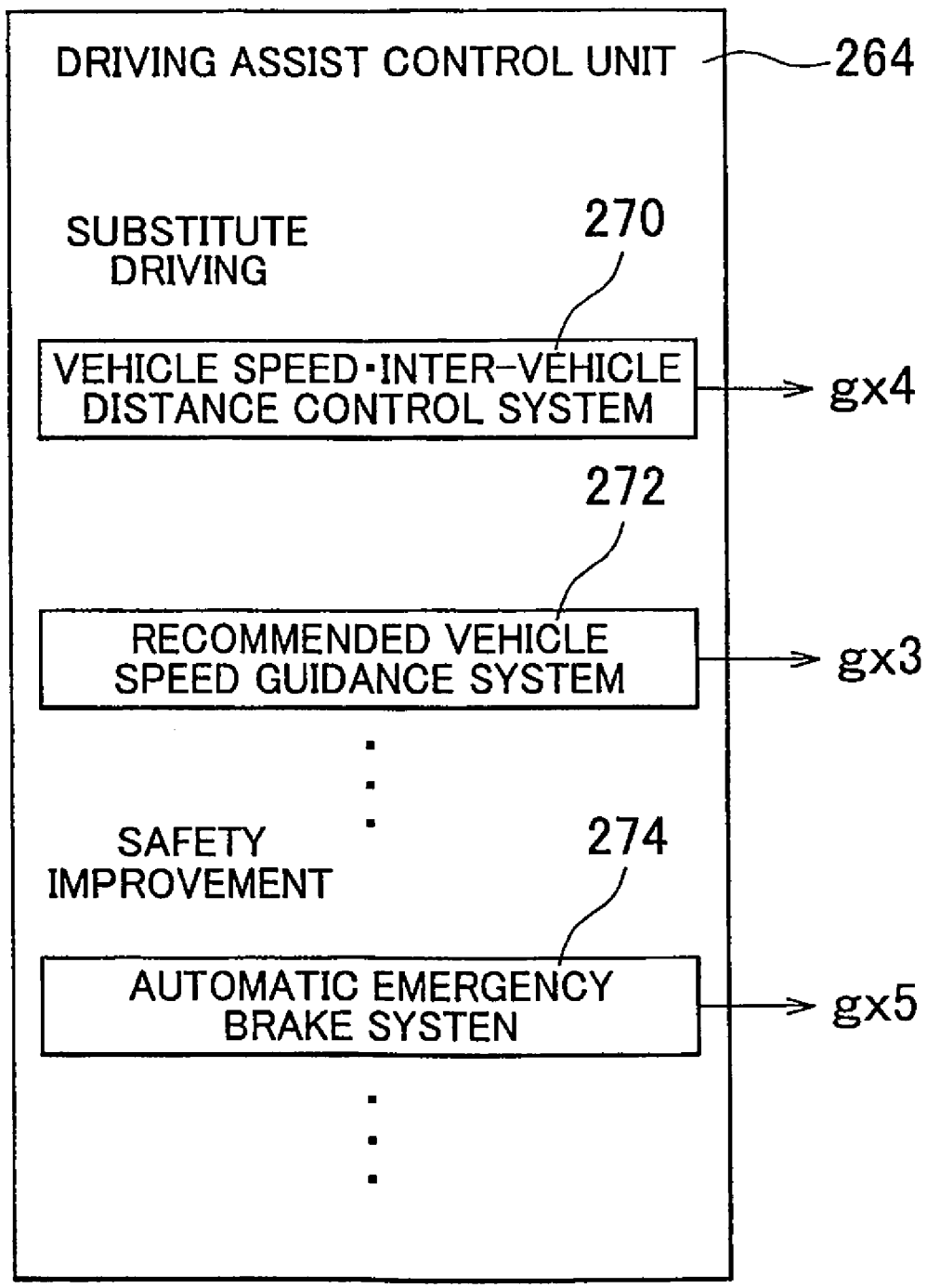
FIG. 13 is a block diagram schematically showing a driving assist control unit 264 shown in FIG. 8.

FIG. 13 is a block diagram showing the functions realized by the driving assist control unit 264. The functions will be listed below.

(a) Vehicle-speed·Inter-vehicle Distance Control System 270

This system 270 is adapted to control the actual vehicle speed to be equal to a set vehicle speed selected by the driver, and computes a longitudinal acceleration required for the control of the vehicle speed, as a target longitudinal acceleration gx4.

The vehicle-speed·inter-vehicle distance control system 270 also performs inter-vehicle distance control (i.e., following running control). More specifically, the system 270 controls the inter-vehicle distance, based on a signal from the front monitoring radar device 190, by reducing the speed of the subject vehicle in accordance with the speed of the forward vehicle, or starting the vehicle to follow the forward vehicle or increasing the speed of the subject vehicle in accordance with the speed of the forward vehicle as far as it does not exceed a predetermined vehicle speed, or stopping the vehicle upon a stop of the forward vehicle.

One example of the principle with which the vehicle speed·inter-vehicle distance control system 270 computes the target longitudinal acceleration gx4 will be explained.

The vehicle speed·inter-vehicle distance control system 270 determines whether a forward vehicle or an obstacle exists on a portion of the recommended running track that corresponds to the reference stop distance. If the forward vehicle or obstacle exists, the system 270 assumes that the speed of the subject vehicle is reduced from the current vehicle speed so that the actual vehicle speed of the subject vehicle will coincide with the speed of the forward vehicle or obstacle at the time when the subject vehicle is supposed to reach the current position of the forward vehicle or obstacle. If the obstacle is fixed to the ground or the like, for example, the actual vehicle speed of the subject vehicle is reduced to zero.

During the assumed deceleration of the subject vehicle, the vehicle speed·inter-vehicle distance control system 270 determines, as the target longitudinal deceleration gx4, a longitudinal acceleration of the vehicle at each local point at set time intervals (of, for example, 5 ms) between the current point of time to the time at which the vehicle is supposed to reach the current position of the forward vehicle or obstacle, by using-the same method as the method of computing the longitudinal acceleration for obtaining the reference stop distance. In other words, the target longitudinal acceleration gx4 is determined as a longitudinal acceleration required for avoiding a collision of the subject vehicle with the forward vehicle or obstacle.

(b) Recommended Vehicle Speed Guidance System 272

This system 272 is adapted to control the actuators so that the actual vehicle speed does not deviate largely from the recommended vehicle speed. Thus, the system 272 computes a longitudinal acceleration required for achieving this function, as a target longitudinal acceleration gx3.

If the current vehicle speed is higher than the recommended vehicle speed, for example, the recommended vehicle speed guidance system 272 determines a deceleration-side set value (e.g., −2.0 m/s$^2$) as the target longitudinal acceleration gx3. If the current vehicle speed is substantially equal to the recommended vehicle speed, the target longitudinal acceleration gx3 is set to 0 m/s$^2$. If the current vehicle speed is lower than the recommended vehicle speed, the target longitudinal acceleration gx3 is set to an acceleration-side set value (e.g., 2.0 m/s$^2$).

(c) Automatic Emergency Brake System 274

This system 274 is adapted to determine whether the vehicle needs to be urgently stopped, based on signals from the front monitoring radar device 190, front monitoring camera device 192, communications system 196 and so forth. If the vehicle needs to be urgently stopped, the system 274 controls the actuators so as to stop the vehicle. Thus, the automatic emergency brake system 274 computes a longitudinal acceleration required for realizing this function (i.e., rapidly stopping the vehicle), as a target longitudinal acceleration gx5.

For example, if the automatic emergency brake system 274 determines that the vehicle needs to be urgently stopped, the target longitudinal acceleration gx5 is set to a deceleration-side set value (e.g., −12.0 m/s$^2$). If there is no need to urgently stop the vehicle, on the other hand, the target longitudinal acceleration gx5 is set to a predetermined value (e.g., 2.0 m/s$^2$) that is equal to or greater than zero.

As shown in FIG. 8, the target steering angle computing unit 222 includes a δ1 computing unit 280 and a driving assist control unit 282.

(1) δ1 Computing Unit 280

This unit 280 is adapted to compute a target steering angle (i.e., a target value of a front-wheel steering angle) δ1 based on the steering wheel angle θ. The target steering angle δ1 may be computed by dividing the steering wheel angle θ by a steering gear ratio as a fixed value, or by dividing the steering wheel angle θ by a steering gear ratio as a variable that is sensitive to vehicle state quantities, such as a vehicle speed.

It is to be understood that in the present embodiment, there is no steering gear for mechanically linking the right and left front wheels with the steering wheel 44, but the relationship (ratio) between the front-wheel steering angle δ and the steering wheel angle θ is described on the assumption that a steering gear actually exists.

(2) Driving Assist Control Unit 282

This unit 282 is adapted to control the above-described plurality of actuators so as to execute, in lieu of the driver, driving operations that should be originally performed by the driver.

Figure 14:
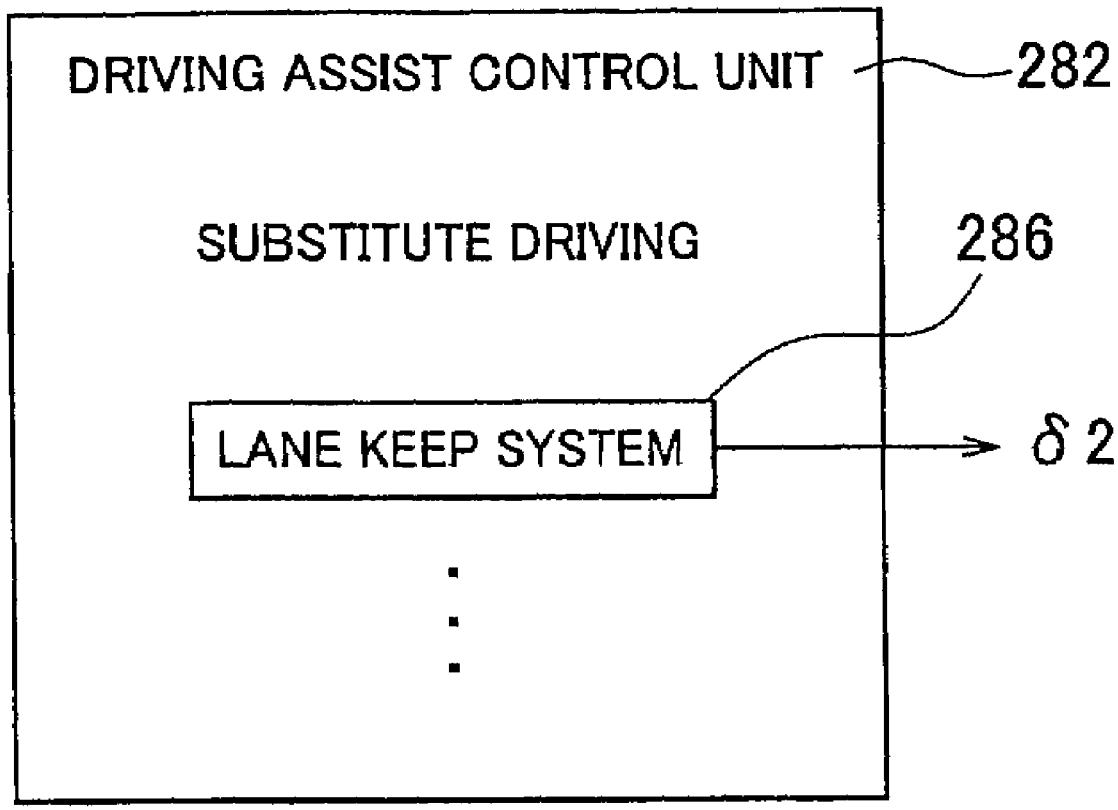
FIG. 14 is a block diagram schematically showing a driving assist control unit 282 shown in FIG. 8.

As shown in FIG. 14, the driving assist control unit 282 includes a lane keep system 286. The lane keep system 286 is adapted to compute a target steering angle δ2 required for the vehicle to trace or follow the recommended running track at the target longitudinal acceleration gx4, over the length of the reference stop distance.

One example of the principle with which the lane keep system 286 computes the target steering angle δ2 will be explained.

The target vehicle speed Vd at each point of time during a period in which the vehicle traces the recommended running track is expressed by the following equation, where Vd is computed at intervals of t0 and V0 represents the current vehicle speed.

$$Vd(n)=V(n-1)+gx4\cdot t0$$

In the above expression, "(n)" indicates the number of times of computing, and "n" is incremented by 1 each time the vehicle travels over the length of the reference stop distance.

The position X, Y of the vehicle at each point of time t is expressed by the following expressions, on a rectangular coordinate system on which the origin is at (X0, Y0).

$$X(t)=X0+V\cdot\int \cos(\beta+ya)dt$$

$$Y(t)=Y0+V\cdot\int \sin(\beta+ya)dt$$

where,

X: coordinate value on the X-axis parallel to the lateral direction of the vehicle Y: coordinate value on the Y-axis parallel to the longitudinal direction of the vehicle β: vehicle body slip angle ya: yaw angle of the vehicle (that can be obtained by integrating the yaw rate with respect to time)

Assuming that the vehicle body slip angle β is almost equal to zero, the position X(n), Y(n) of the vehicle at each time n is expressed by the following expressions.

$$X(n)=X(n-1)+V(n)\cdot \sin(ya)\cdot t0$$

$$Y(n)=Y(n-1)+V(n)\cdot \cos(ya)\cdot t0$$

These expressions represent one example of the relationship between the vehicle position and the speed as described above.

The yaw angle ya(n) of the vehicle at each time n is expressed by the following expression.

$$ya(n)=ya(n-1)+t0\cdot V(n)\cdot \delta(n)/L\cdot(1+Kh\cdot V(n)^2)$$

where

δ: vehicle steering angle or front-wheel steering angle

Kh: stability factor (known)

L: wheel base (known)

Accordingly, the target steering angle δ2 at each time n while the vehicle is running over the length of the reference stop distance is expressed by the following expression, in view of the road slant angle sa estimated by the road slant estimating device 180.

$$\delta 2(n)=(ya(n)-ya(n-1))\cdot(1+Kh\cdot V(n)^2)\cdot L/(t0\cdot V(n))-L\cdot Kh\cdot sa$$

This expression represents a bicycle model which steadily and linearly describes the behavior of the vehicle. Namely, the bicycle model describes static behavior, not dynamic behavior, of the vehicle.

If the steering angle δ required for keeping the lane on which the vehicle runs on the recommended running track is as large as, for example, 90 degrees, it is more appropriate to cause the driver to maneuver or operate the vehicle to keep the lane, rather than depending upon the lane keep system 286.

However, the driver may feel uncomfortable if the lane keep control by the lane keep system 286 is suddenly cancelled when the steering angle δ required for lane keeping at the next moment is found to be considerably larger than normal during running of the vehicle.

In view of the above situation, the future running track of the vehicle is predicted over a somewhat long range, and the driver is warned of the possibility of canceling of the lane keep control in the future, at a point of time when it is found that a large steering angle δ will be required for lane keeping at a certain point in the future, namely, well before the time when the large steering angle δ is actually required. If the driver is warned in this way, the driver will drive the vehicle while being aware of the possibility, so that the driver will not feel uncomfortable or embarrassed when the lane keep control is actually cancelled.

The five target longitudinal accelerations gx1 through gx5 computed as described above are supplied to the selecting unit 224, as shown in FIG. 8. The selecting unit 224 selects an appropriate one of the five target longitudinal accelerations gx1 through gx5 as a target longitudinal acceleration gx6, according to predetermined selection rules.

The basic concepts employed for setting the selection rules are as follows:

(1) In the case where the vehicle speed·inter-vehicle distance control switch 146 is operated by the driver, so that the driver permits execution of the vehicle-speed·inter-vehicle distance control, the target longitudinal acceleration is selected with priority given to the operation of the driver no matter whether it is a driving operation to drive the vehicle or a braking operation to brake the vehicle.

(2) In the case where the recommended vehicle-speed guidance switch 150 is operated by the driver, whereby the driver permits execution of the recommended vehicle-speed guidance control, the basis of selection differs depending upon whether the operation of the driver is a driving operation to drive the vehicle or a braking operation to brake the vehicle.

a. During Driving Operation

If the actual vehicle speed is equal to or lower than the recommended vehicle speed, the target longitudinal acceleration is selected with priority given to the operation of the driver. If the actual vehicle speed is higher than the recommended vehicle speed, the target longitudinal acceleration is selected so as to achieve the recommended vehicle speed.

b. During Braking Operation

The target longitudinal acceleration is selected with priority given to the operation of the driver, irrespective of whether the actual vehicle speed is equal to or lower than the recommended vehicle speed.

(3) In the case where the automatic emergency brake system 274 determines that the vehicle needs to be urgently stopped, the target longitudinal acceleration is selected so as to realize an emergency stop of the vehicle even if the driver is performing a driving operation. If the driver is performing a braking operation, one having the larger absolute value is selected from the deceleration reflecting the braking operation of the driver and the target longitudinal acceleration gx5 (which means a deceleration in the narrow sense) computed by the automatic emergency brake system 274, as the target longitudinal acceleration gx6.

The selection rules have been generally explained above, but will be now specifically explained.

(1) Case where the vehicle-speed inter-vehicle distance control switch 146 is operated, and the recommended vehicle-speed guidance switch 150 is also operated a. When the braking effort (i.e., the force applied to the brake pedal) is larger than zero, the target longitudinal acceleration gx6 is selected as follows.

$$gx6 = \min(gx1, gx2, gx3, gx4, gx5)$$

b. When the braking effort is equal to zero, and the acceleration stroke is larger than zero, the target longitudinal acceleration gx6 is selected as follows.

$$gx6 = \min(\max(gx1, gx2, gx4), gx3, gx5)$$

c. When both the braking effort and the acceleration stroke are equal to zero, the target longitudinal acceleration gx6 is selected as follows.

$$gx6 = \min(gx2, gx3, gx4, gx5)$$

(2) Case where the vehicle speed·inter-vehicle distance control switch 146 is operated, but the recommended vehicle-speed guidance switch 150 is not operated a. When the braking effort is larger than zero, the target longitudinal acceleration gx6 is selected as follows.

$$gx6 = \min(gx1, gx2, gx4, gx5)$$

b. When the braking effort is equal to zero, and the acceleration stroke is larger than zero, the target longitudinal acceleration gx6 is selected as follows.

$$gx6 = \min(\max(gx1, gx2, gx4), gx5)$$

c. When both the braking effort and the acceleration stroke are equal to zero, the target longitudinal acceleration gx6 is selected as follows.

$$gx6 = \min(gx2, gx4, gx5)$$

where, min (,): the minimum value selected from a plurality of numerical values within the parentheses max (,): the maximum value selected from a plurality of numerical values within the parentheses (3) Case where the vehicle speed inter-vehicle distance control switch 146 is not operated, but the recommended vehicle-speed guidance switch 150 is operated a. When the braking effort is larger than zero, the target longitudinal acceleration gx6 is selected as follows.

$$gx6 = \min(gx1, gx3, gx5)$$

b. When the braking effort is equal to zero, and the acceleration stroke is larger than zero, the target longitudinal acceleration gx6 is selected as follows.

$$gx6 = \min(gx1, gx3, gx5)$$

c. When both of the braking effort and the acceleration stroke are equal to zero, the target longitudinal acceleration gx6 is selected as follows.

$$gx6 = \min(gx3, gx5)$$

(4) Case where neither the vehicle speed inter-vehicle distance control switch 146 nor the recommended vehicle-speed guidance switch 150 is operated $$gx6 = \min(gx1, gx5)$$

The two target steering angles δ1 and δ2 computed as described above are supplied to the selecting unit 226, as shown in FIG. 8. The selecting unit 226 selects an appropriate one of the target steering angles δ1 and δ2 as a target steering angle δ3, as described above, according to predetermined selection rules.

The contents of the selection rules are as follows.

(1) When the lane keep switch 148 is operated by the driver, and the driver indicates no intention to conduct steering control by himself/herself, the target steering angle δ2 computed by the lane keep system 286 is selected as the target steering angle δ3.

(2) When the lane keep switch 148 is not operated by the driver, or the driver indicates an intention to conduct steering control by himself/herself even though the lane keep switch 148 is operated, the target steering angle δ1 that directly reflects a steering action by the driver is selected as the target steering angle δ3.

The selecting unit 226 determines whether the driver indicates an intention to conduct steering control by himself/herself, based on information from the turn determining unit 254 as described above.

Figure 15:
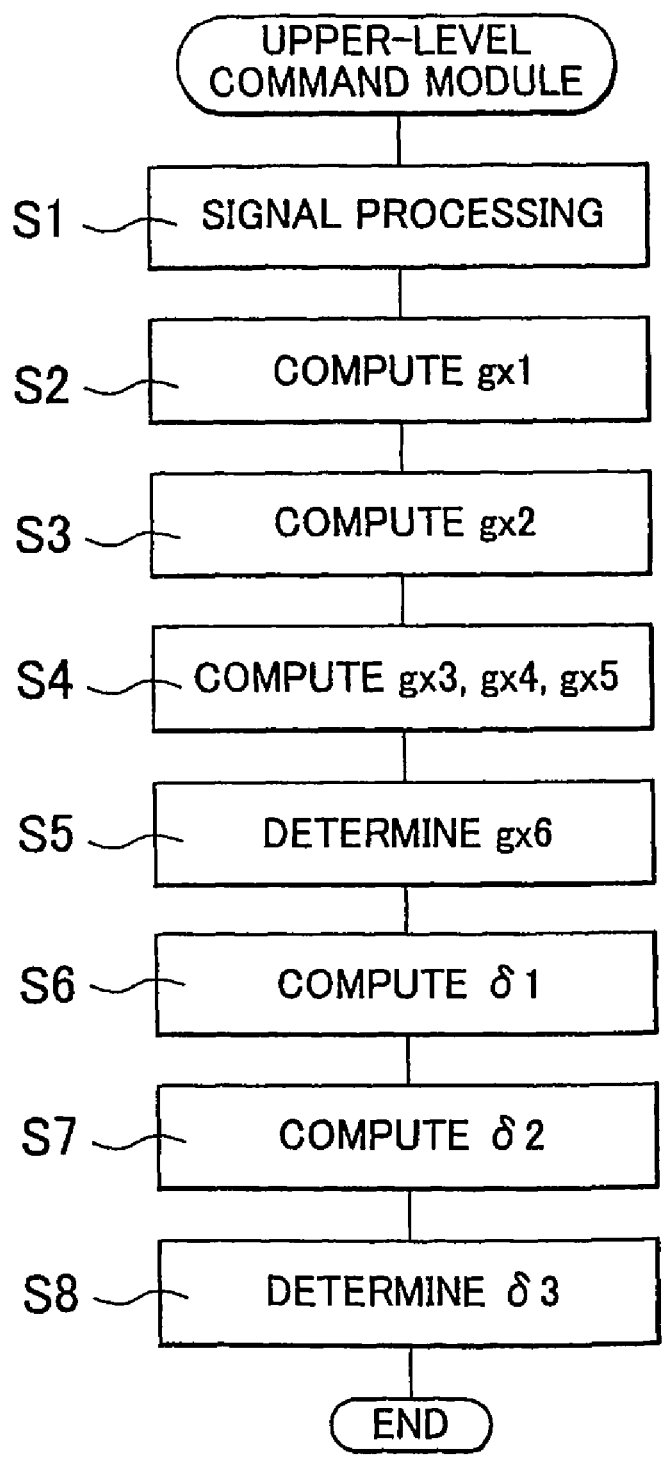
FIG. 15 is a flowchart schematically showing the content of an upper-level command module shown in FIG. 3.

The functions of the upper-level command section 210 have been explained above. FIG. 15 is a flowchart schematically showing the content of the upper-level command module of FIG. 3.

In the upper-level command module, step S1 is first executed to process signals from the acquisition systems 120, 122 and 124. This step S1 constitutes the three signal processing units 240, 242 and 244.

In step S2, the above-described target longitudinal acceleration gx1 is computed. This step S2 constitutes the gx1 computing unit 260. Next, the above-described target longitudinal acceleration gx2 is computed in step S3. This step S3 constitutes the gx2 computing unit 262. In the next step S4, the above-described target longitudinal accelerations gx3, gx4 and gx5 are computed. This step S4 constitutes the driving assist control unit 264. In step S5, one of the five target longitudinal accelerations gx1 through gx5 is selected as the target longitudinal acceleration gx6. This step S5 constitutes the selecting unit 224.

Subsequently, the above-described target steering angle δ1 is computed in step S6. This step S6 constitutes the δ1 computing unit 280. In the next step S7, the target steering angle δ2 is computed. This step S7 constitutes the driving assist control unit 282. In the following step 88, one of the two target steering angles δ1 and δ2 is selected as the target steering angle δ3. This step S8 constitutes the selecting unit 226.

In this manner, one cycle of the upper-level command module is executed.

Figure 16:
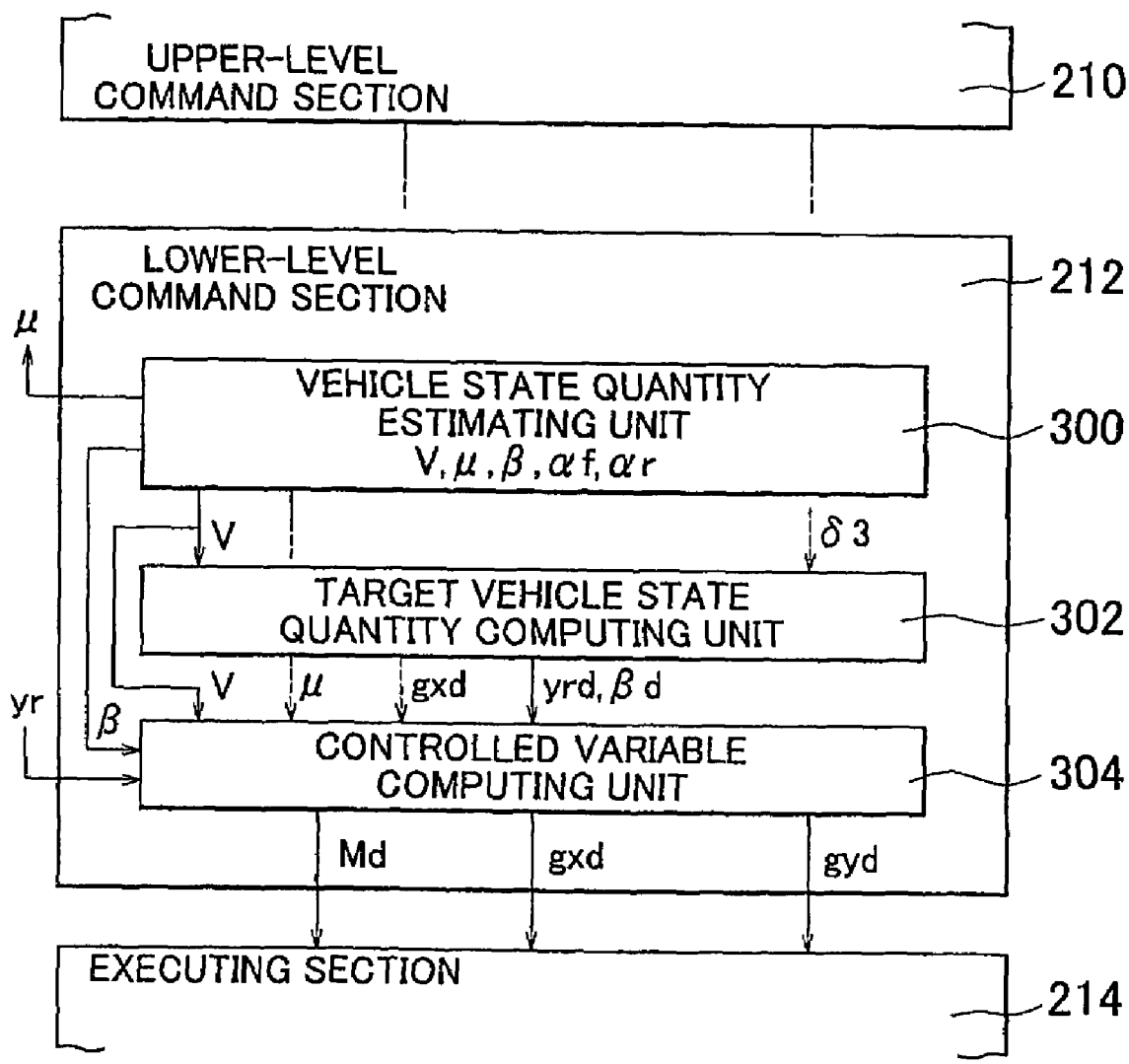
FIG. 16 is a block diagram showing in detail a lower-level command section 212 shown in FIG. 4.

FIG. 16 is a block diagram showing the software configuration of the lower-level command section 212, which is organized in terms of the functions.

The lower-level command section 212 is constructed to include the following units.

(1) Vehicle State Quantity Estimating Unit 300

This unit 300 is adapted to estimate vehicle state quantities according to known principles, based on signals from the driving information acquisition system 120, vehicle information acquisition system 122 and the environmental information acquisition system 124.

The vehicle state quantity estimating unit 300 estimates the vehicle speed V, road μ of the road on which the vehicle is running, vehicle body slip angle β, front-wheel slip angle αf, rear-wheel slip angle αr and other vehicle state quantities, based on the wheel speed of each wheel 10, lateral acceleration of the vehicle, yaw rate, and other parameters. The upper-level command section 210 is able to refer to necessary one or ones of the vehicle state quantities thus estimated when needed.

In the vehicle condition estimating unit 300, the vehicle speed V is estimated, for example, based on the fact that the highest one of the wheel speeds of the four wheels 10 is most likely to coincide with the true vehicle speed, as well known in the art.

In the vehicle condition estimating unit 300, the road μ is estimated, for example, based on the actual longitudinal acceleration and actual lateral acceleration of the vehicle measured when a yaw rate as a deviation of the actual yaw rate from the target yaw rate exceeds a set value.

It is generally considered that the coefficient of friction between a tire and the road probably reaches its peak value at a point of time when the tire cornering property shifts from a linear region to a non-linear region, and that the peak value reflects the road μ.

If the target yaw rate is computed on the basis of a linear bicycle model, the situation where the yaw rate deviation exceeds the set value means that the tire cornering property shifts from the linear region to the non-linear region.

On the basis of the findings as described above, the vehicle state quantity estimating unit 300 of the embodiment estimates the road μ based on the actual longitudinal acceleration and actual lateral acceleration measured when the yaw rate deviation exceeds the set value. More specifically, the road μ is computed as the square root of the sum of the square of the actual longitudinal acceleration and the square of the actual lateral acceleration when the yaw rate deviation exceeds the set value.

In the vehicle state quantity estimating unit 300, the vehicle body slip angle β is estimated based on the lateral acceleration, vehicle speed, yaw rate and other parameters, using a vehicle model representing plane motions including yawing and sideslip, as described in Japanese Patent No. 2962025. The vehicle model is one example of vehicle models describing dynamic behavior of the vehicle.

(2) Target Vehicle State Quantity Computing Unit 302

Figure 17:
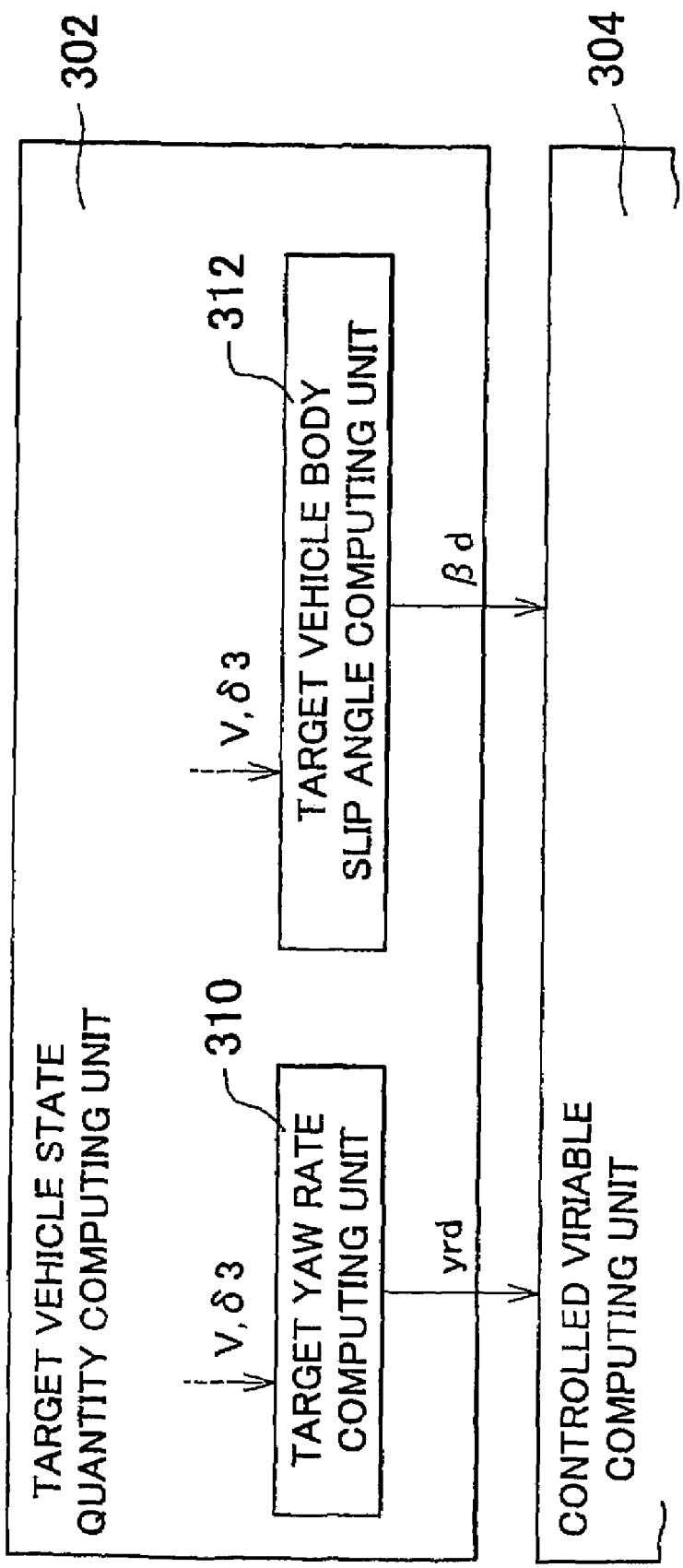
FIG. 17 is a block diagram showing in detail a target vehicle state quantity computing unit 302 shown in FIG. 16.

This unit 302 is adapted to compute a target yaw rate yrd and a target vehicle body slip angle βd of the vehicle as target vehicle state quantities, based on the driving information, actual vehicle state quantities, and others. To this end, the target vehicle state quantity computing unit 302 includes a target yaw rate computing unit 310 and a target vehicle body slip angle computing unit 312, as shown in FIG. 17.

For example, the target yaw rate computing unit 310 computes the target yaw rate yrd based on the estimated vehicle speed V and the target steering angle δ3, according to the following expression.

$$yrd = V \cdot \delta 3 / ((1 + Kh \cdot V^2) \cdot L)$$

On the other hand, the target vehicle body slip angle computing unit 312 computes the target vehicle body slip angle βd, for example, based on the estimated vehicle speed V and the target steering angle δ3, according to the following expression.

$$\beta d = (1 - ((m \cdot Lf \cdot V^2)/(2 \cdot L \cdot Lr \cdot Kr))) \cdot Lr \cdot \beta 3 / ((1 + Kh \cdot V^2) \cdot L)$$

where, m: vehicle weight (known)

Lf: distance from the front-wheel axle to the center of gravity of the vehicle (known)

Lr: distance from the rear-wheel axle to the center of gravity of the vehicle (known)

Kr: cornering stiffness of rear wheels (known)

(3) Controlled Variable Computing Unit 304

This unit 304 is adapted to compute controlled variables of appropriate ones of the plurality of actuators 70 through 82 that need to be controlled for realizing target vehicle state quantities computed by the target vehicle state quantity computing unit 302, such that the stability of the vehicle behavior is not reduced.

Figure 18:
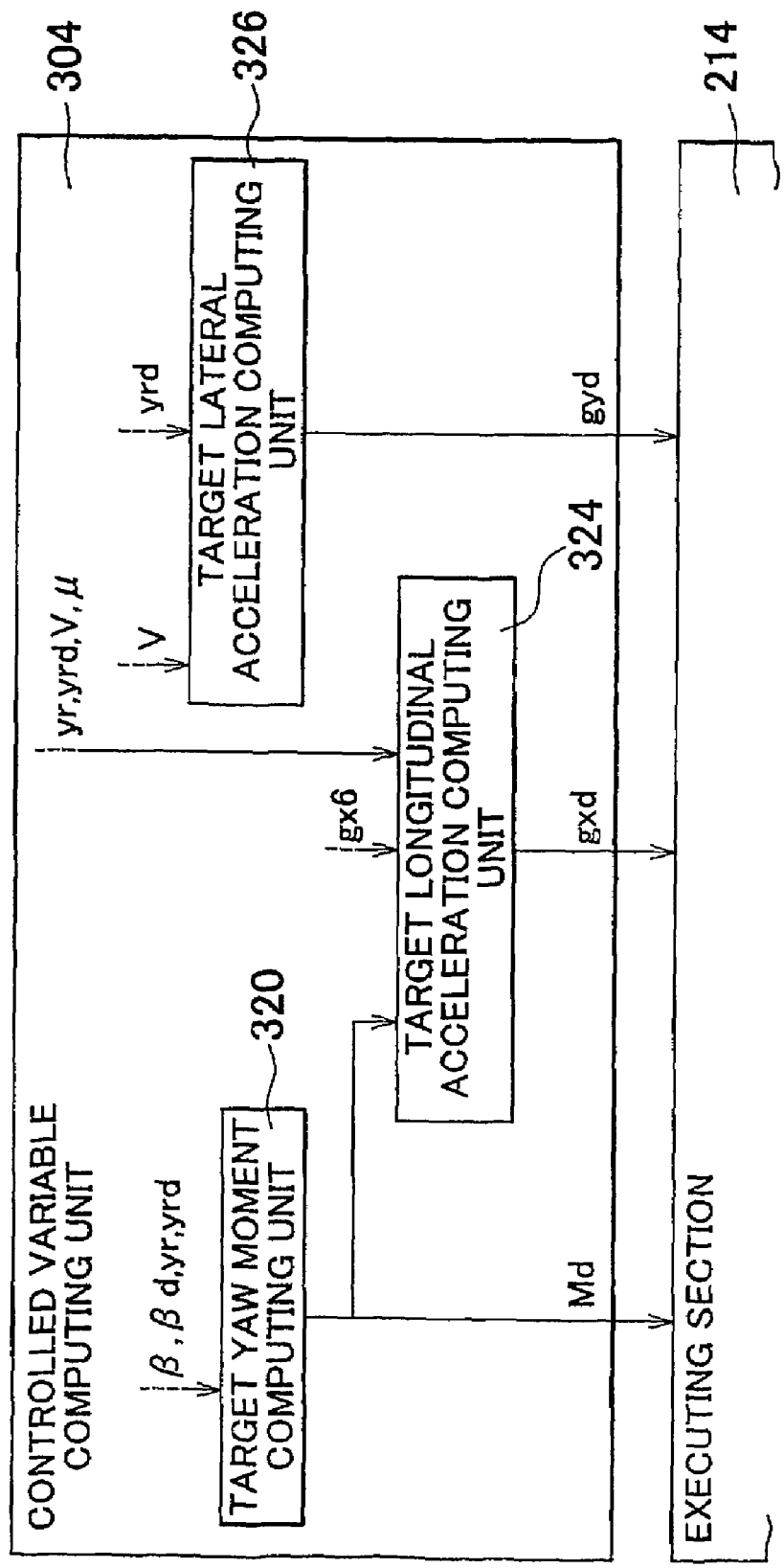
FIG. 18 is a block diagram showing in detail a controlled variable computing unit 304 shown in FIG. 16.

The controlled variable computing unit 304 computes the target yawing moment Md applied to the vehicle body and the final target longitudinal acceleration gxd and target lateral acceleration gyd, as controlled variables, based on the actual state quantities of the vehicle, target state quantities and so forth. To this end, the controlled variable computing unit 304 includes a target yawing moment computing unit 320, a target longitudinal acceleration computing unit 324 and a target lateral acceleration computing unit 326, as shown in FIG. 18.

(a) Target Yawing Moment Computing Unit 320

The target yawing moment computing unit 320 computes the target yawing moment Md (which is a relative value, not an absolute value) that is additionally applied to the vehicle body, based on, for example, the actual vehicle body slip angle $\beta$, target vehicle body slip angle $\beta d$, actual yaw rate yr, and the target yaw rate yrd, according to the following expression.

$$Md = a \cdot (\beta - \beta d) + b \cdot (yr - yrd)$$

where, a: a fixed value or a variable that changes depending upon the vehicle speed V and the road $\mu$, the sign of a is positive b: a fixed value or a variable that changes depending upon the vehicle speed V and the road $\mu$, the sign of b is negative (b) Target Longitudinal Acceleration Computing Unit 324

The target longitudinal acceleration computing unit 324 corrects the target longitudinal acceleration gx6 supplied from the upper-level command section 210, so that the accelerating tendency of the vehicle is reduced or suppressed (namely, the acceleration is reduced, or the accelerating mode is switched to the decelerating mode, or the deceleration is increased) when the vehicle behavior is unstable. The computing unit 324 then computes the final target longitudinal acceleration gxd by correcting the target longitudinal acceleration gx6 as needed.

The target longitudinal acceleration computing unit 324 determines a correction amount gPlus used for correcting the target longitudinal acceleration gx6. In the present embodiment, the target longitudinal acceleration gx6 is corrected by adding the correction amount gPlus to gx6. The correction amount gPlus takes a negative value when the target longitudinal acceleration gx6 is to be reduced so as to decelerate the vehicle, and takes a positive value when the target longitudinal acceleration gx6 is to be increased so as to accelerate the vehicle.

Figure 19:
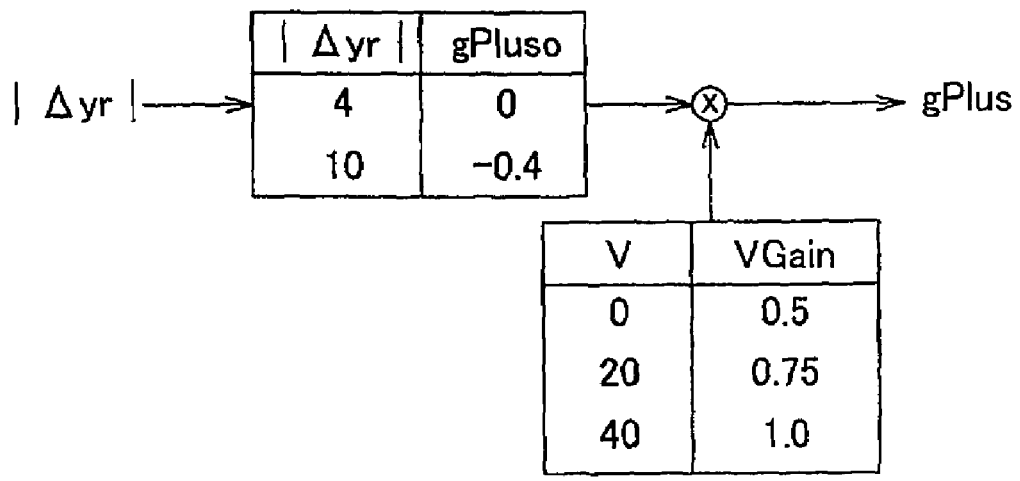
FIG. 19 is a block diagram explaining the content of a control executed by a target longitudinal acceleration computing unit 324 shown in FIG. 18.

More specifically, in the present embodiment, a provisional value gPlus0 of the correction amount gPlus is determined depending upon an absolute value of a yaw rate deviation $\Delta yr$ of the actual yaw rate yr from the target yaw rate yrd as shown in FIG. 19. For example, the provisional value gPlus0 may be defined as a negative value whose absolute value increases as the absolute value of the yaw rate deviation $\Delta yr$ (degree/sec.) increases.

The target longitudinal acceleration computing unit 324 also determines the gain VGain by which the provisional value gPlus0 is multiplied for correction. For example, the gain VGain may be defined as a value that increases up to 1 (the maximum value) as the vehicle speed V increases.

The target longitudinal acceleration computing unit 324 computes the final correction amount gPlus by multiplying the provisional value gPlus0 determined as described above, by the gain VGain determined as described above.

Figure 20:
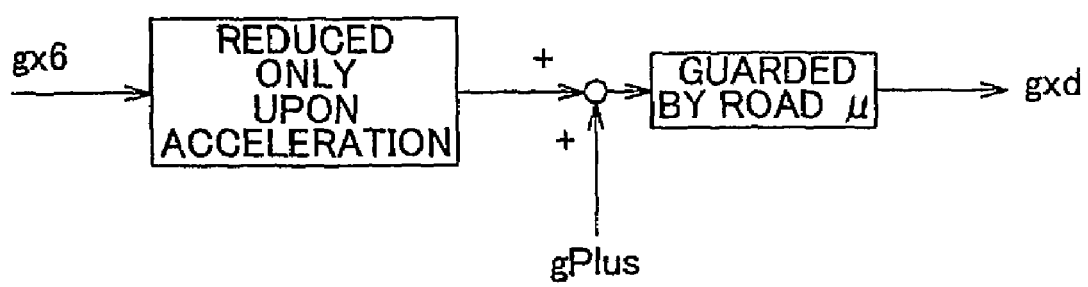
FIG. 20 is a block diagram explaining the content of another control executed by the target longitudinal acceleration computing unit 324 shown in FIG. 18.

The target longitudinal acceleration computing unit 324 computes the final target longitudinal acceleration gxd by adding the obtained correction amount gPlus to the target longitudinal acceleration gx6. In the present embodiment, however, the target longitudinal acceleration gx6 is reduced at a variable reduction rate gk (%) as long as the vehicle is accelerating, as shown in FIG. 20. Furthermore, the target longitudinal acceleration gxd is limited or guarded so as not to exceed a longitudinal acceleration corresponding to the road $\mu$. This limiting control is equivalent to traction control for suppressing an increase of the spinning tendency of the driving wheels during driving of the vehicle.

In the present embodiment, the above-indicated reduction rate gk (%) is calculated based on the target yawing moment Md and the yaw rate deviation $\Delta yr$. More specifically, the larger one of a provisional reduction rate gk (%) determined in view of the target yawing moment Md without taking account of the yaw rate deviation $\Delta yr$ and a provisional reduction rate gk (%) determined in view of the yaw rate deviation $\Delta yr$ without taking account of the target yawing moment Md is determined as the final reduction rate gk (%).

The target longitudinal acceleration gxd may need to return to the target longitudinal acceleration gx6 after the target longitudinal acceleration gx6 is reduced to provide the target longitudinal acceleration gxd and the vehicle is decelerated so as to achieve the target longitudinal acceleration gxd. In such a case, a rapid change may occur in the behavior of the vehicle if the target longitudinal acceleration gxd is immediately made equal to the target longitudinal acceleration gx6 again.

In the present embodiment, therefore, the rate of change (i.e., slope) of the target longitudinal acceleration gxd returning to the target longitudinal acceleration gx6 is limited. Namely, when the reduction rate gk (%) is updated to be equal to zero after being set to a value other than zero, the rate gk (%) is gradually or slowly updated or changed to zero over a certain period of time (for example, 1 second).

More specifically described with reference to FIG. 21, in the present embodiment, the reduction rate gk (%) is determined so as to increase in accordance with the target yawing moment Md, and a gain Gain is determined in relation to the road $\mu$ and the vehicle speed V. The reduction rate gk determined as described above is multiplied by the gain Gain thus determined, whereby a provisional reduction rate gk corresponding to the target yawing moment Md is computed.

Figure 21:
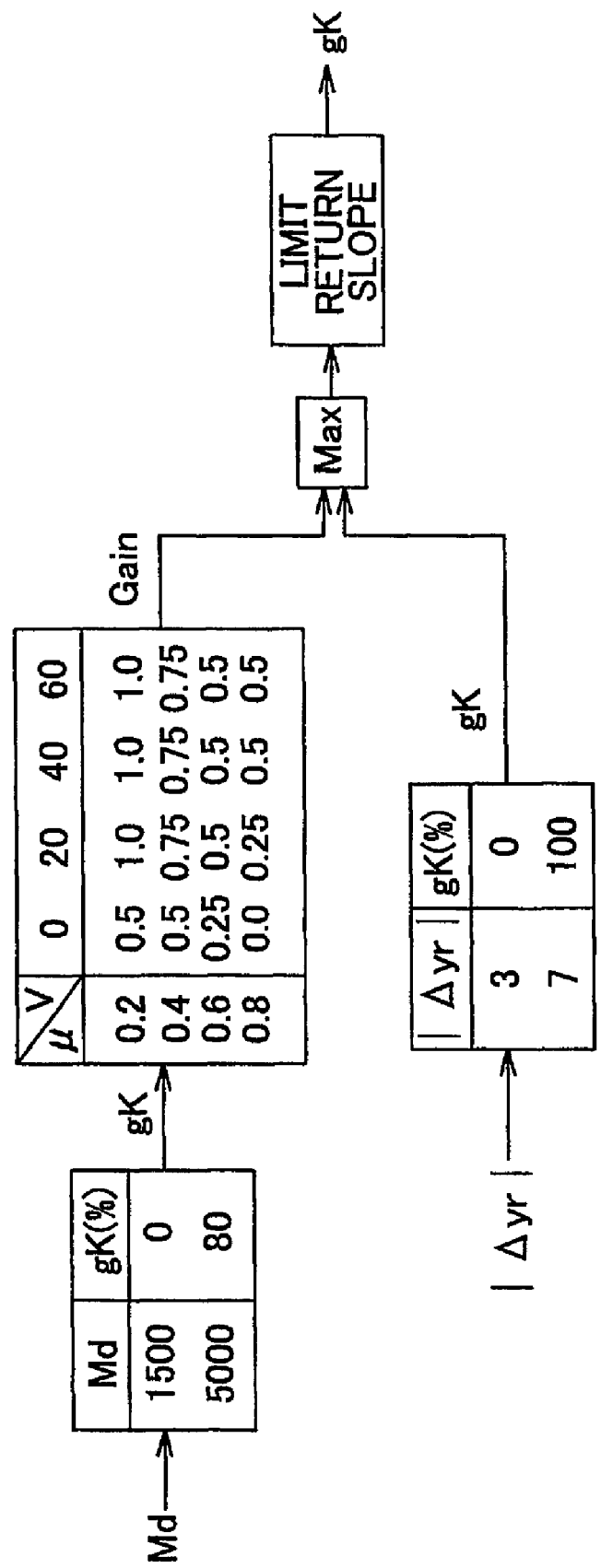
FIG. 21 is a block diagram explaining the content of a further control executed by the target longitudinal acceleration computing unit 324 shown in FIG. 18.

In addition, in the present embodiment, the reduction rate gk is determined so as to increase in accordance with the yaw rate deviation $\Delta yr$, as shown in FIG. 21, whereby a provisional reduction rate gk corresponding to the yaw rate deviation $\Delta yr$ is computed.

In the embodiment, the larger one of the two provisional reduction rates gk computed as described above is selected, as shown in FIG. 21. Subsequently, the reduction rate gk is subjected to the above-described limiting control for slowly returning gxd to gx6, whereby the final reduction rate gk is computed.

(b) Target Lateral Acceleration Computing Unit 326

The target lateral acceleration computing unit 326 computes a target lateral acceleration gyd based on the target yaw rate yrd and the vehicle speed V.

For example, the target lateral acceleration computing unit 326 computes the target lateral acceleration gyd according to the following expression.

$$gyd = yrd \cdot V$$

Figure 22:
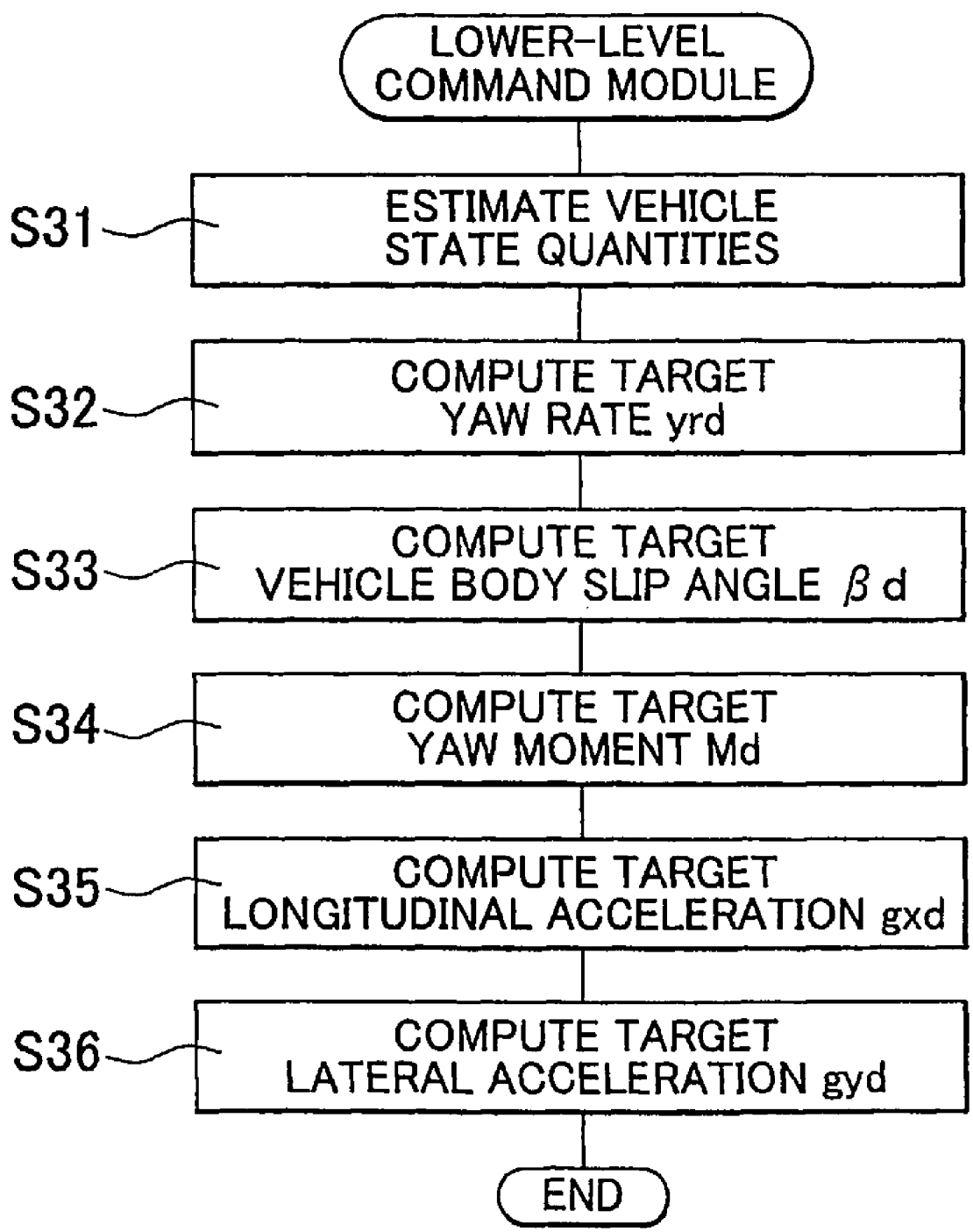
FIG. 22 is a flowchart schematically showing the content of a lower-level command module shown in FIG. 3.

The functions of the lower-level command section 212 have been explained above. FIG. 22 is a flowchart schematically showing the content of the lower-level command module of FIG. 3.

In the lower-level command module, step S31 is initially executed to estimate the above-described vehicle state quantities. This step S31 constitutes the vehicle state quantity estimating unit 300.

In the next step S32, the target yaw rate yrd as described above is computed. This step S32 constitutes the target yaw rate computing unit 310. In step S33, the target vehicle body slip angle βd is computed. This step S33 constitutes the target vehicle body slip angle computing unit 312.

Subsequently, the target yawing moment Md as described above is computed in step S34. This step S34 constitutes the target yawing moment computing unit 320. In the following step S35, the target longitudinal acceleration gxd as described above is computed. This step S35 constitutes the target longitudinal acceleration computing unit 324. Then, the target lateral acceleration gyd as described above is computed in step S36. This step S36 constitutes the target lateral acceleration computing unit 326.

In this manner, one cycle of the lower-level command module is executed.

FIG. 23 is a block diagram showing the software configuration of the executing section 214 as shown in FIG. 4, which is organized in terms of the functions.

The executing portion 214 is constructed to include the following units.

A. Upper-level Distribution Unit 340

An upper-level distribution unit 340 is provided with respect to all of the plurality of actuators 70 through 82, and is adapted to distribute controlled variables by which all of the actuators 70 through 82 should be controlled to the actuators 70 through 82 in an integrated manner, so as to achieve the target vehicle state quantities Md, gxd, gyd supplied from the lower-level command section 212.

In the upper-level distribution unit 340, the controlled variables for all of the actuators 70 through 82 (hereinafter referred to as "whole controlled variable") are distributed as three types of distributed quantities.

(1) Distributed Quantity Associated with the Longitudinal Force

This quantity of the whole controlled variable is distributed to an element or elements for controlling the longitudinal force of each wheel 10, namely, to a combination of the power train including the engine 14 and the transmission 24 and the brake assembly 56.

(2) Distributed Quantity Associated with the Vertical Force

This quantity of the whole controlled variable is distributed to an element for controlling the vertical force of each wheel 10, namely, to the suspension 62.

(3) Distributed Quantity Associated with the Lateral Force

This quantity of the whole controlled variable is distributed to an element for controlling the lateral force of each wheel 10, namely, to a steering system including the front steering device 50 and the rear steering device 52.

B. Lower-level Distribution Unit 342

The lower-level distribution unit 342 is provided with respect to a part of the plurality of actuators 70 through 82, and is adapted to distribute the controlled variables supplied from the upper-level distribution unit 340 to that part of the actuators.

In the present embodiment, the lower-level distribution unit 342 is provided with respect to a combination of the power train and the brake assembly 56. The lower-level distribution unit 342 determines a distributed quantity associated with the power train, by which the distributed quantity associated with the longitudinal force, which is supplied from the upper-level distribution unit 340, is distributed to the power train, and a distributed quantity associated with the brake, by which the distributed quantity associated with the longitudinal force is distributed to the brake assembly 56.

C. Control Unit 344

The control unit 344 is adapted to control the plurality of actuators 70 through 82 so as to achieve the controlled variables supplied from the upper-level distribution unit 340 or the lower-level distribution unit 342.

The upper-level distribution unit 340, lower-level distribution unit 342 and the control unit 344 as explained above realize the respective particular functions, by causing the computer 90 to execute a plurality of modules that are independent of each other on the software configuration. To this end, the ROM 94 stores an upper-level distribution module, a lower-level distribution module, and a control module independently of each other, as shown in FIG. 3.

While the software configuration of the upper-level distribution unit 340, the lower-level distribution unit 342 and the control unit 344 have been schematically explained above, these units 340, 342, 344 will be explained in greater detail.

(1) Upper-level Distribution Unit 340

Figure 24:
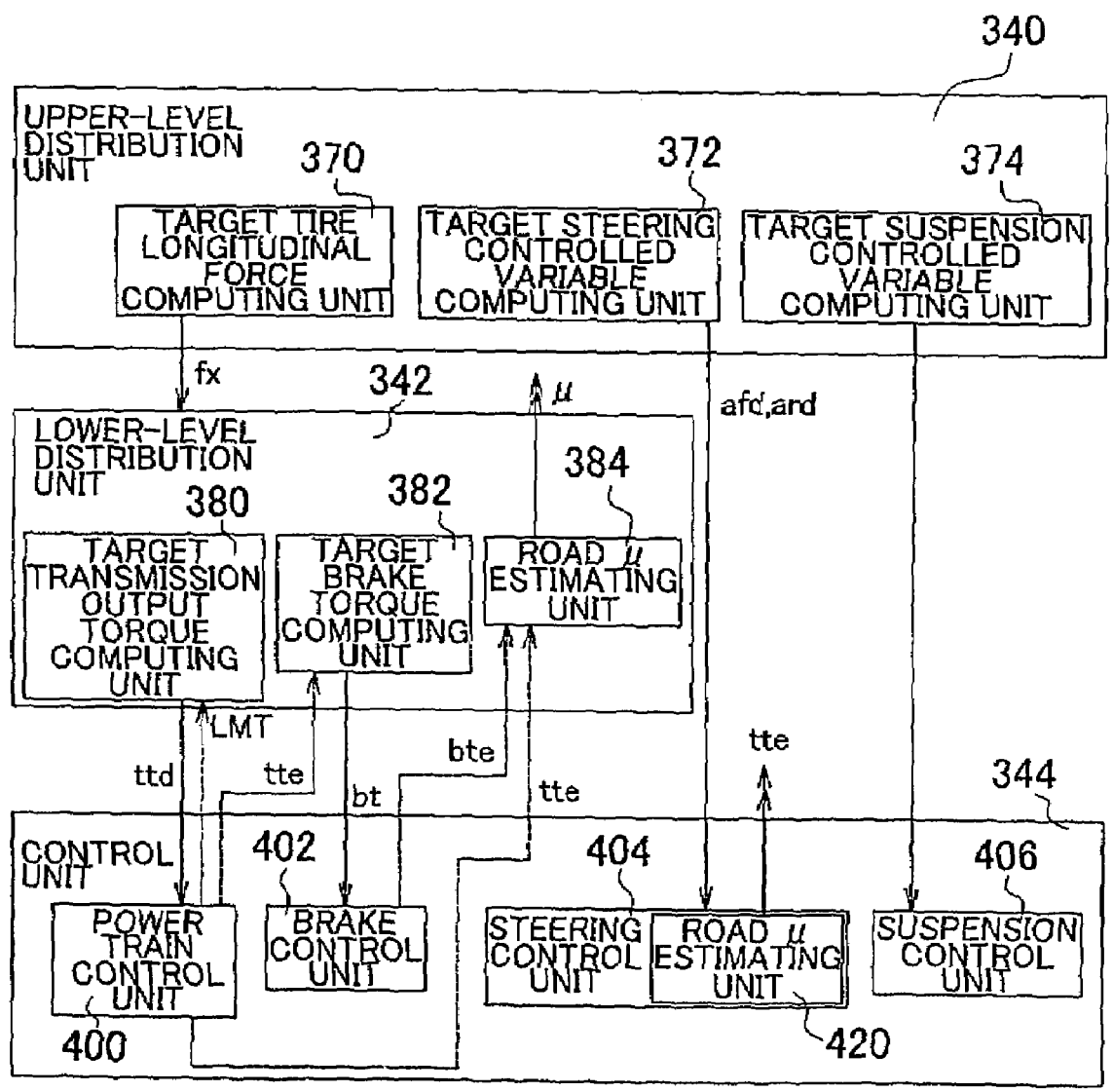
FIG. 24 is a block diagram showing in detail an upper-level distribution unit 340, a lower-level distribution unit 342 and a control unit 344 shown in FIG. 23.

As shown in FIG. 24, the upper-level distribution unit 340 includes a target tire longitudinal force computing unit 370, a target steering controlled variable computing unit 372, and a target suspension controlled variable computing unit 374.

In the target tire longitudinal force computing unit 370, a target individual longitudinal force fx is computed as a target tire longitudinal force (i.e., the above-described distributed quantity associated with the longitudinal force).

Figure 25:
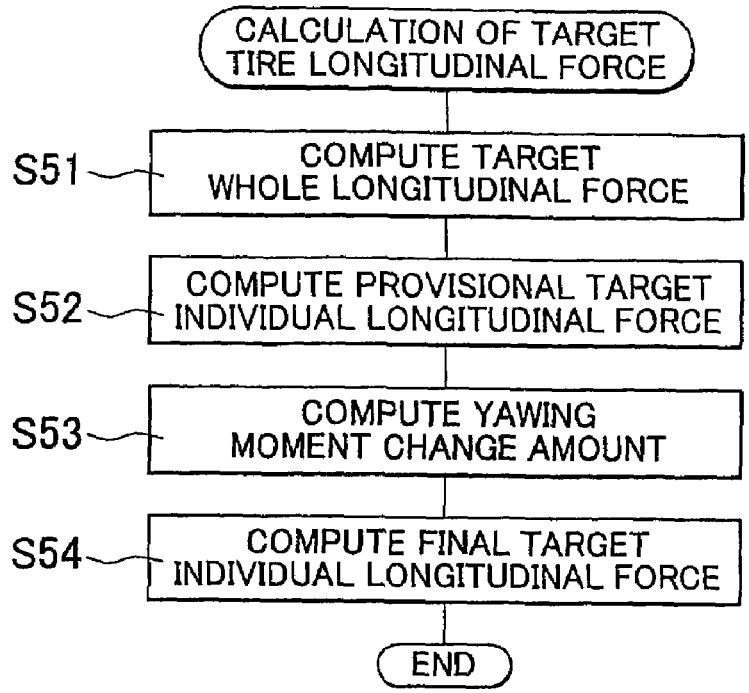
FIG. 25 is a flowchart schematically showing a control flow executed by a target tire longitudinal force computing unit 370 shown in FIG. 24.

FIG. 25 is a flowchart schematically showing the content executed by the target tire longitudinal force computing unit 370.

Initially, step S51 is executed to compute a target overall longitudinal force Fx to be realized by all of the four wheels 10. This force Fx is calculated according to, for example, the following expression.

$$Fx = gxd \cdot m$$

where "m" represents the mass of the vehicle.

Step S52 is then executed to compute a provisional target individual longitudinal force that should be established on each wheel 10 so that the target whole longitudinal force Fx thus computed is distributed to the respective wheels 10.

The provisional target individual longitudinal force may be computed so that the target whole longitudinal force Fx is distributed to each wheel 10 by an amount proportional to the size of a friction circle of the wheel 10, on the assumption that the target whole longitudinal force Fx is equally or uniformly assigned to the four wheels 10 so that each wheel 10 bears substantially the same burden.

The sizes of the friction circles of the front-left wheel, front-right wheel, rear-left wheel and the rear-right wheel may be represented by $\mu fl \cdot fzfl$, $\mu fr \cdot fzfr$, $\mu rl \cdot fzrl$ and $\mu rr \cdot fzrr$, where the vertical forces of the front-left wheel, front-right wheel, rear-left wheel and the rear-right wheel are represented by fzfl, fzfr, fzrl and fzrr.

In this case, the provisional target individual longitudinal forces fxfl0, fxfr0, fxrl0 and fxrr0 of the front-left wheel, front-right wheel, rear-left wheel and the rear-right wheel are respectively obtained according to the following expressions.

$$fxfl0 = Fx \cdot (\mu fl \cdot fzfl)/(m \cdot B)$$

$$fxfr0 = Fx \cdot (\mu fr \cdot fzfr)/(m \cdot B)$$

$$fxrl0 = Fx \cdot (\mu rl \cdot fzrl)/(m \cdot B)$$

$$fxrr0 = Fx \cdot (\mu rr \cdot fzrr)/(m \cdot B)$$

where,
m: mass of the vehicle
g: gravitational acceleration
B: $\mu fl \cdot fzfl + \mu fr \cdot fzfr + \mu rl \cdot fzrl + \mu rr \cdot fzrr$ The terms required for computing the provisional target individual longitudinal forces fxfl0, fxfr0, fxrl0, and fxrr0 as explained above, namely, the vertical forces fzfl, fzfr, fzrl, fzrr of the front-left wheel, front-right wheel, rear-left wheel and the rear-right wheel may be computed according to, for example, the following expressions.

$$fzfl = fzf0 + m \cdot (-gx \cdot H/L/2 - gy \cdot H \cdot froll/T)$$

$$fzfr = fzf0 + m \cdot (-gx \cdot H/L/2 + gy \cdot H \cdot froll/T)$$

$$fzrl = fzr0 + m \cdot (gx \cdot H/L/2 - gy \cdot H \cdot (1-froll)/T)$$

$$fzrr = fzr0 + m \cdot (gx \cdot H/L/2 + gy \cdot H \cdot (1-froll)/T)$$

where,
m: mass of vehicle (known)
H: height of gravitational center
L: wheel base of the vehicle (=Lf+Lr)
froll: front roll stiffness taking a value in a range of 0 to 1 (which is acquired from the target suspension control amount computing unit 374 as described later)
T: tread of the vehicle (known)
fzf0: static distribution of the vehicle load to each front wheel (=m·Lr/L/2)
fzr0: static distribution of the vehicle load to each rear wheel (=m·Lf/L/2)
Lf: distance from the front-wheel axle to the center of gravity of the vehicle
Lr: distance from the rear-wheel axle to the center of gravity of the vehicle In the meantime, the lateral forces fyfl, fyfr, fyrl and fyrr of the front-left wheel, front-right wheel, rear-left wheel and rear-right wheel may be computed according to the following expressions, based on the lateral acceleration gy, yaw angular acceleration dyr (which can be obtained by differentiating the yaw rate with respect to time), vertical force fzfl, fzfr, fzrl, fzrr of each wheel 10, and so forth.

$$fyfl = (m \cdot gy \cdot Lr + I \cdot dyr) \cdot fzfl/(L \cdot (fzfl+fzfr))$$

$$fyfr = (m \cdot gy \cdot Lr + I \cdot dyr) \cdot fzfr/(L \cdot (fzfl+fzfr))$$

$$fyrl = (m \cdot gy \cdot Lf - I \cdot dyr) \cdot fzrl/(L \cdot (fzrl+fzrr))$$

$$fyrr = (m \cdot gy \cdot Lf - I \cdot dyr) \cdot fzrr/(L \cdot (fzrl+fzrr))$$

where "I" represents the yawing moment of inertia of the vehicle (known).

Subsequently, step S53 of FIG. 25 is executed to compute a yawing moment that is supposed to be additionally applied to the vehicle when the provisional target individual longitudinal forces fx0 calculated as described above appear on the vehicle. The yawing moment thus obtained will be hereinafter referred to as "yawing moment change amount".

A method of computing the yawing moment change amount will be now described, with respect to the case where the provisional target individual longitudinal force fx0 to be realized on the vehicle is braking force. Here, no description will be provided with respect to the case where the provisional target individual longitudinal force is driving force, since it is similar to the case where it is braking force.

Yawing moment change amounts Mfl, Mfr, Mrl, Mrr that arise from the braking forces applied to the front-left wheel, front-right wheel, rear-left wheel and the rear-right wheel, respectively, are calculated, for the case where the resultant force of the braking force and the lateral force of each wheel 10 does not reach the friction circle whose radius changes depending upon the vertical force of the wheel 10, and the case where the resulting force reaches the friction circle.

The computing method will be described with respect to the state in which the resultant force reaches the friction circle, by way of example.

The yawing moment change amount Mfl, Mfr, Mrl, Mrr due to the braking force of each wheel 10 is equal to a sum of: (a) a yawing moment change amount Mxfl, Mxfr, Mxrl, Mxrr due to the direct moment caused by the braking force, (b) a yawing moment change amount Myfl, Myfr, Myrl, Myrr due to a decrease of the lateral force of each wheel 10, and (c) a yawing moment change amount Mzfl, Mzfr, Mzrl, Mzrr due to a change in the lateral force of each wheel 10 resulting from a change in the radius of the friction circle.

Here, the yawing moment change amount Mzfl, Mzfr, Mzrl, Mzrr reflects a phenomenon that if a load shifts in the vehicle, the radius of the friction circle of each wheel 10 changes, which in turn causes a change in the lateral force of each wheel 10, resulting in a change in the yawing moment change amount.

More specifically, the yawing moment change amounts Mxfl, Mxfr, Mxrl, Mxrr are calculated, for example, according to the following expressions.

The direct moment due to the braking force is expressed as follows:

$$Mxfl = T \cdot fxfl/2$$

$$Mxfr = -T \cdot fxfr/2$$

$$Mxrl = T \cdot fxrl/2$$

$$Mxrr = -T \cdot fxrr/2$$

The yawing moment change amounts Myfl, Myfr, Myrl, Myrr due to a reduction of the lateral force caused by the braking force of each wheel 10 are calculated, for example, according to the following expressions.

$$Myrl = -Lf(\mu \cdot Afl - \sqrt{(\mu^2 \cdot Afl^2 - fxfl^2)})$$

$$Myrr = -Lf(\mu \cdot Afr - \sqrt{(\mu^2 \cdot Afr^2 - fxfr^2)})$$

$$Myfl = Lr(\mu \cdot Arl - \sqrt{(\mu^2 \cdot Arl^2 - fxrl^2)})$$

$$Myfr = Lr(\mu \cdot Arr - \sqrt{(\mu^2 \cdot Arr^3 - fxrr^2)})$$

where,

Afl: fzfl+H·fxfl/(2·L)
Afr: fzfr+H·fxfr/(2·L)
Arl: fzrl+H·fxrl/(2·L)
Arr: fzrr+H·fxrr/(2·L)

The yawing moment change amounts Mzfl, Mzfr, Mzrl, Mzrr due to a change in the radius of the friction circle caused by a longitudinal load shift upon application of the braking force are calculated, for example, according to the following expressions.

$$Mzfl=Lf·\mu·H·fxfl/(2·L)$$

$$Mzfr=Lf·\mu·H·fxfr/(2·L)$$

$$Mzrl=Lr·\mu·H·fxrl/(2·L)$$

$$Mzrr=Lr·\mu·H·fxrr/(2·L)$$

The yawing moment change amounts Mfl, Mfr, Mrl, Mrr as total values are represented by the following expressions.

$$Mfl=Mxfl+Myfl+Mzfl$$

$$Mfr=Mxfr+Myfr+Mzfr$$

$$Mrl=Mxrl+Myrl+Mzrl$$

$$Mrr=Mxrr+Myrr+Mzrr$$

Subsequently, step S54 of FIG. 25 is executed to calculate the final target individual longitudinal force fx for each wheel 10, by correcting the provisional target individual longitudinal force fx0 as needed, based on the comparison in magnitude between the yawing moment change amounts as obtained above and the target yawing moment Md.

In the present embodiment, when the absolute value of the target yawing moment Md does not exceed a set value (for example, 300 Nm), the target yawing moment Md is basically realized by rotational angle control of each wheel 10 (for example, by controlling wheel steering parameters, such as a toe angle and a camber angle). If the absolute value of the target yawing moment Md exceeds the set value, a portion of the yawing moment Md that does not exceed the set value is realized by rotational angle control of each wheel 10, and a portion of the yawing moment Md in excess of the set value is realized by controlling the longitudinal force of each wheel 10 (for example, by controlling the braking force produced by the brake assembly 56, braking force generated through an engine brake, and the driving force produced by the power train).

To be more accurate, the provisional target individual longitudinal force fx0 is corrected in step S54 based on the comparison in magnitude between the yawing moment change amounts calculated as described above, and the portion of the target yaw moment Md that should be realized by the control of the longitudinal force of each wheel 10. For the sake of convenience of explanation, a portion of the target yawing moment Md that should occur due to a difference in the longitudinal force between the right and left wheels 10 will be simply referred to as target yawing moment Md. It is to be understood that the target yawing moment Md is defined as being positive when it is applied in such a direction that assists a turn of the vehicle.

More specifically, in step S54, when the yawing moment change amounts as calculated above coincide with the target yawing moment Md, the provisional target individual longitudinal force fx0 of each wheel 10 is determined as it is as the final target individual longitudinal force fx.

If the yawing moment change amounts calculated are short of the target yaw moment Md, the braking force for one of the right and left rear wheels on the inside of the turn is increased by Δfx while the braking force for one of the right and left front wheels on the outside of the turn is reduced by Δfx, so as to achieve the target yawing moment Md. To this end, Δfx is calculated.

In this case, the final target individual longitudinal force fx is calculated by reducing the provisional target individual longitudinal force fx0 (which represents a driving force if it is a positive value and represents a braking force if it is a negative value) of the inside rear wheel by Δfx, and increasing the provisional target individual longitudinal force fx0 of the outside front wheel by Δfx. With regard to the other wheels, the provisional target individual longitudinal force fx0 of each wheel is set as it is as the final target individual longitudinal force fx.

If the yawing moment change amounts calculated exceed the target yawing moment Md, the braking force for one of the right and left front wheels on the outside of the turn is increased by Δfx while the braking force for one of the right and left rear wheels on the inside of the turn is reduced by Δfx, so as to achieve the target yawing moment Md. To this end, Δfx is calculated.

In this case, the final target individual longitudinal force fx is calculated by reducing the provisional target individual longitudinal force fx0 of the outside front wheel by Δfx, and increasing the provisional target individual longitudinal force fx0 of the inside rear wheel by Δfx. With regard to the other wheels, the provisional target individual longitudinal force fx0 of each wheel is set as it is as the final target individual longitudinal force fx.

As is apparent from the above description, according to the present embodiment, the target yawing moment Md can be established while maintaining a total value of the target individual longitudinal forces, namely, the target overall longitudinal force.

In the target steering controlled variable computing unit 372 as shown in FIG. 24, a target front-wheel slip angle αfd and target rear-wheel slip angle αrd are computed as target steering controlled variables (equivalent to the distributed quantity associated with the lateral force).

Here, each of the target front-wheel slip angle αfd and the target rear-wheel slip angle αrd represents a relative value that means an amount of change from the current slip angle of the front wheels or the rear wheels, respectively.

In the target steering controlled variable computing unit 372, the target front-wheel slip angle αfd and the target rear-wheel slip angle αrd are computed, for example, based on a difference between the actual yaw rate yr and the target yaw rate yrd, so that the yawing moment applied to the vehicle under the steering control does not exceed the above-indicated set value of the target yawing moment Md.

In the present embodiment, the target front-wheel slip angle αfd is calculated according to the following expression.

$$\alpha rd=kf·(yr-yrd)$$

where "kf" is a positive constant.

In the present embodiment, the target rear-wheel slip angle αfd is calculated according to the following expression.

$$\alpha rd=kr·(yr-yrd)$$

where "kr" is a negative constant.

In the target suspension controlled variable computing unit 374 as shown in FIG. 24, a target spring constant, a target absorber damping coefficient and a target roll stiffness with respect to each of the front and rear wheels are computed as target suspension controlled variables (equivalent to the above distributed quantity associated with the vertical force).

The target spring constant of each front wheel is calculated, for example, according to the following expression.

$$Kfb0 + Kfb1 \cdot \sqrt{(gxd^2 + gyd^2)} - Kfb2 \cdot DF$$

where,

Kfb0, Kfb1, Kfb2: constant

DF: drift parameter (a parameter whose absolute value increases as the degree of abnormality of the yawing motion of the vehicle increases, the parameter having a positive value if the type of the abnormality is drift-out, and having a negative value if the type of the abnormality is spin)

The drift parameter DF can be calculated as a product of a deviation of the actual yaw rate yr from the target yaw rate yrd and the sign of the actual yaw rate yr.

The target absorber damping coefficient of each front wheel is calculated, for example, according to the following expression.

$$Kfc0 + Kfc1 \cdot \sqrt{(gxd^2 + gyd^2)} - Kfc2 \cdot DF$$

where,

Kfc0, Kfc1, Kfc2: constant

The target roll stiffness froll of each front wheel is calculated, for example, according to the following expression.

$$Kfr0 + Kfr1 \cdot \sqrt{(gxd^2 + gyd^2)} - Kfr2 \cdot DF$$

where,

Kfr0, Kfr1, Kfr2: constant

As described above, the target roll stiffness froll thus calculated is supplied to the target tire longitudinal force computing unit 370, and is used for calculating the vertical force fz of each wheel 10.

The target spring constant of each rear wheel is calculated, for example, according to the following expression.

$$Krb0 + Krb1 \cdot \sqrt{(gxd^2 + gyd^2)} - Krb2 \cdot DF$$

where,

Krb0, Krb1, Krb2: constant

The target absorber damping coefficient of each rear wheel is calculated, for example, according to the following expression.

$$Krc0 + Krc1 \cdot \sqrt{(gxd^2 + gyd^2)} - Krc2 \cdot DF$$

where,

Kfc0, Kfc1, Kfc2: constant

The target roll stiffness froll of each rear wheel is calculated, for example, according to the following expression.

$$Krr0 + Krr1 \cdot \sqrt{(gxd^2 + gyd^2)} - Krr2 \cdot DF$$

where,

Krr0, Krr1, Krr2: constant

Figure 26:
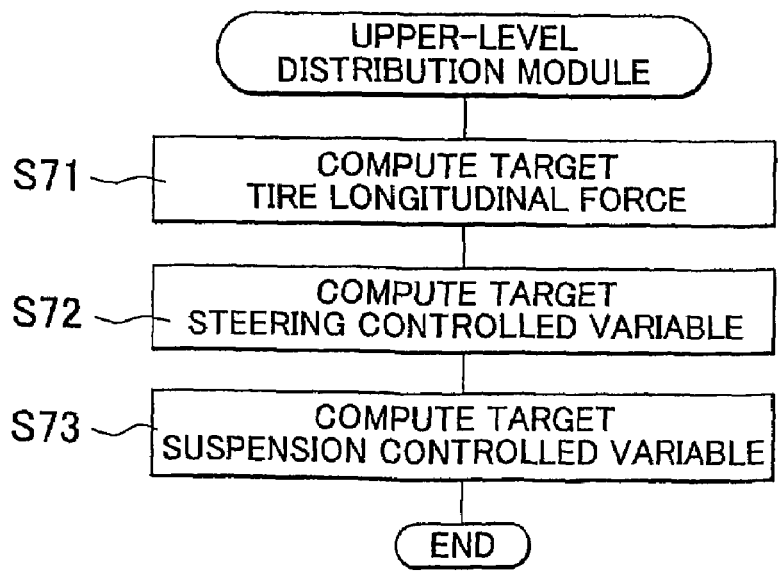
FIG. 26 is a flowchart schematically showing the content of an upper-level distribution module shown in FIG. 3.

While the functions of the upper-level distribution unit 340 have been explained above, the content of the module for the upper-level distribution unit as shown in FIG. 3 is schematically illustrated in the flowchart of FIG. 26.

In the upper-level distribution module, step S71 is initially executed to compute the target tire longitudinal force as described above. This step S71 constitutes the target tire longitudinal force computing unit 370.

In the next step S72, the above-described target steering controlled variables are computed. This step S73 constitutes the target steering controlled variable computing unit 374. In the following step S72, the above-described target suspension controlled variables are calculated. This step S73 constitutes the target suspension controlled variable computing unit 372.

In this manner, one cycle of the upper-level distribution module is executed.

(2) Lower-level Distribution Unit 342

The lower-level distribution unit 342 is adapted to distribute controlled variables to the engine 14, the transmission 24 and the brake assemblies 56, so as to realize the final target individual longitudinal force fx of each wheel 10 determined by the upper-level distribution unit 340.

As shown in FIG. 24, the lower-level distribution unit 342 includes a target transmission output torque computing unit 380, a target brake torque computing unit 382, and a road μ estimating unit 384.

a. Target Transmission Output Torque Computing Unit 380

In the present embodiment, the right and left front wheels are driven wheels, and the right and left rear wheels are driving wheels. When the final individual longitudinal forces (hereinafter simply referred to as "target longitudinal force") fx are vehicle accelerating forces (i.e., forces for accelerating the vehicle), a target transmission output torque as a command to be transmitted to a subordinate power train control unit 400 is determined with respect to only the right and left rear wheels.

Furthermore, the target transmission output torque is determined taking account of the facts that the output torque of the transmission 24 is equally distributed to the right and left rear wheels via the differential gear unit 28 and that there is a limit to a range in which the output torque of the transmission 24 can be controlled.

More specifically, a provisional target transmission output torque ttd0, which does not account for the controllable range of the output torque, is initially computed according to the following expression.

$$ttd0 = \max(fxrl, fxrr) \cdot 2 \cdot r/\gamma$$

where, max (fxrl, fxrr): the larger one of the target longitudinal force fxrl of the rear-left wheel and the target longitudinal force fxrr of the rear-right wheel r: tire radius of each wheel 10

γ: gear ratio of the differential gear unit 28

Next, the final target transmission output torque ttd that accounts for the controllable range of the output torque is determined. More specifically, if the provisional target transmission output torque ttd0 exceeds the upper limit value LMTup of the controllable range, the final transmission output torque ttd is set to the upper limit value. If the provisional target transmission output torque ttd0 is smaller than the lower limit value LMTlo, the final transmission output torque ttd is set to the lower limit value. If the provisional target transmission output torque ttd0 is within the controllable range, the final transmission torque ttd is set to the provisional target transmission output torque ttd0. In addition, the upper limit value LMTup and the lower limit value LMTlo of the controllable range of the output torque are supplied from the power train control unit 400 (shown in FIG. 24) as described later.

b. Target Brake Torque Computing Unit 382

When the target longitudinal forces fxfl, fxfr of the right and left front wheels are vehicle decelerating forces (i.e., forces for decelerating the vehicle), the target brake torque computing unit 382 outputs the target longitudinal forces fxfl, fxfr as command signals to a brake control unit 402 (shown in FIG. 24) subordinate to the target brake torque computing unit 382.

More specifically, target brake torques btfl, btfr to be applied to the front-left wheel and front-right wheel, respectively, are calculated according to the following expressions.

$$tbfl=fxfl \cdot r$$

$$tbfr=fxfr \cdot r$$

where, r: tire radius of each wheel 10

With regard to the right and left rear wheels, on the other hand, the target brake torques as command signals to be transmitted to the subordinate brake control unit 402 are determined taking account of the case where the output torque tt of the transmission 24 as well as the brake torque exists.

More specifically, target brake torques btrl, btrr to be applied to the rear-left wheel and rear-right wheel, respectively, are calculated according to the following expressions.

$$tbrl=fxrl \cdot r+tte/\gamma/2$$

$$tbrr=fxrr \cdot r+tte/\gamma/2$$

where, tte: estimated value of the output torque of the transmission 24

The estimated output torque tte is also supplied from the power train control unit 400.

c. Road μ Estimating Unit 384

The road μ estimating unit 384 is adapted to estimate the road μ with high accuracy, based on information supplied from the power train control unit 400 and the brake control unit 402 (shown in FIG. 24) located subordinate to the lower-level distribution unit 342.

In the road μ estimating unit 384, a slip of each wheel 10 is sequentially detected based on an absolute value of the wheel slip velocity as a difference between the vehicle speed V and the wheel speed of each wheel 10. More specifically, it is determined, for each wheel, whether the wheel slip velocity was less than a set value (for example, 3 km/h) in the last control cycle, but it is equal to or larger than the set value in the current control cycle. If this is true, it is determined in the current cycle that a wheel slip has just started.

If it is determined in the current cycle that a wheel slip has started, the road μ is estimated by dividing an estimated wheel force by an estimated vertical force with respect to each wheel 10 for which it is determined that a slip has started. The estimated wheel force is a resultant force of an estimated longitudinal force and an estimated lateral force. The estimated lateral force and the estimated vertical force are calculated by using the above-described expressions.

The estimated longitudinal force is computed based on the estimated output torque tte of the transmission 24 which is supplied from the power train control unit 400 to the lower-level distribution unit 342, and the estimated brake torques btfle, btfre, btrle, btrre of the front-left wheel, front-right wheel, rear-left wheel and the rear-right wheel, respectively, which are supplied from the brake control unit 402 to the lower-level distribution unit 342.

More specifically, the estimated longitudinal forces fxfle, fxfre, fxrle and fxrre of the front-left wheel, front-right wheel, rear-left wheel and the rear-right wheel, respectively, are calculated by using the following expressions.

$$fxfle=btfle/r$$

$$fxfre=btfre/r$$

$$fxrle=btrle/r+tte/\gamma/2$$

$$fxrre=btrre/r+tte/\gamma/2$$

Then, the estimated wheel force for each wheel 10 is calculated by obtaining a square root of a sum of the square of the estimated longitudinal force and the square of the estimated lateral force.

Thus, the road μ is estimated with high accuracy in the manner as described above. If the highly accurate road μ is supplied to an element located at an upper level than the lower-level distribution unit 342, for example, to the upper-level distribution unit 340, the supplied road μ may be used to assist correction of an arithmetic model (e.g., vehicle model, vehicle wheel-steering system model, vehicle wheel-suspension system model), or an arithmetic logic, used by the upper-level element.

Figure 27:
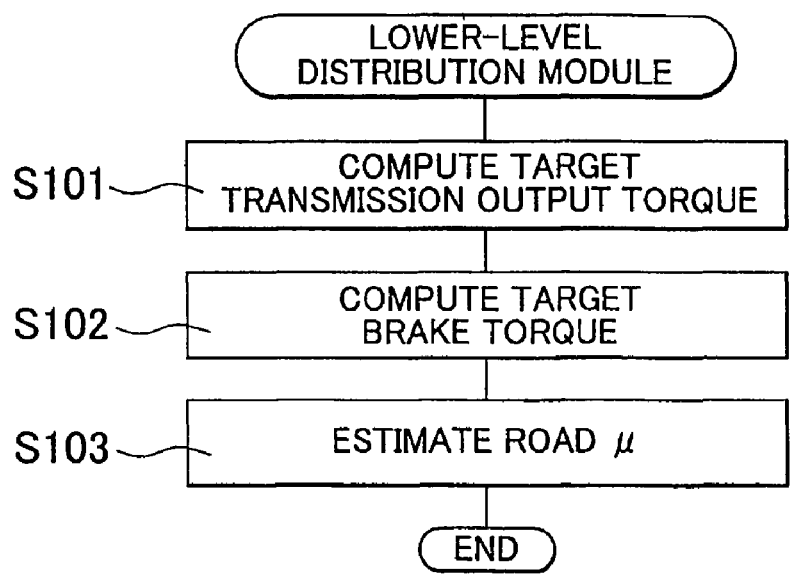
FIG. 27 is a flowchart schematically showing the content of a lower-level distribution unit module shown in FIG. 3.

The functions of the lower-level distribution unit 342 have been described above. FIG. 27 is a flowchart schematically showing the content of the module for the lower-level distribution unit as shown in FIG. 3.

In the lower-level distribution module, step S101 is initially executed to compute the target transmission output torque as described above. This step S101 constitutes the target transmission output torque computing unit 380.

Next, the above-described target brake torque is computed in step S102. This step S102 constitutes the target brake torque computing unit 382.

Subsequently, the road μ for each wheel 10 is estimated in step S103 in the manner as described above. This step S103 constitutes the road μ estimating unit 384.

In the manner as described above, one cycle of the lower-level distribution module is executed.

(3) Control Unit 344

The control unit 344 is constructed to include the following units, as shown in FIG. 23.

a. Power Train Control Unit 400

The power train control unit 400 is adapted to control the actuator 70 for controlling the engine (hereinafter referred to as "engine actuator 70") and the actuator 72 for controlling the transmission (hereinafter referred to as "transmission actuator 72"), based on the distributed quantity associated with the power train supplied from the lower-level distribution unit 342.

Figure 28:
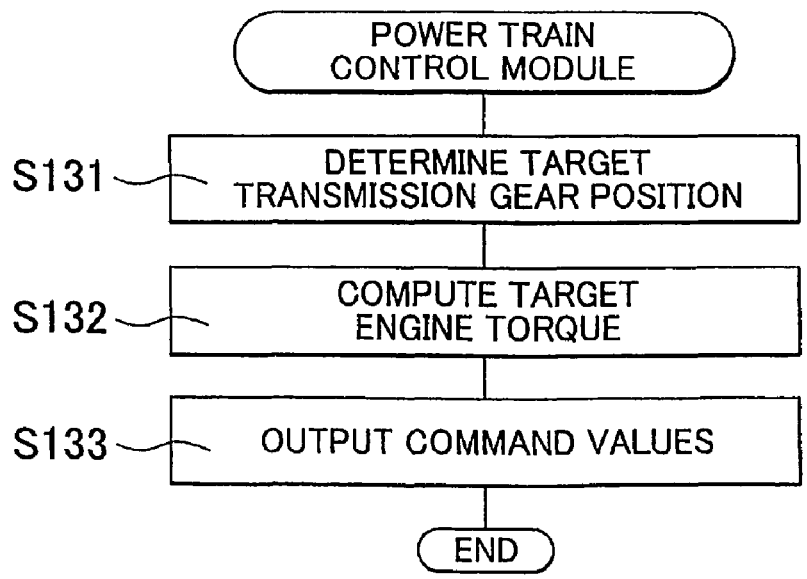
FIG. 28 is a flowchart schematically showing the content of a power train control module shown in FIG. 3.

The functions of the power train control unit 400 will be described with reference to the flowchart of FIG. 28 showing the content of the power train control module (shown in FIG. 3).

In the power train control module, step S131 is first executed to determine a target transmission gear position. More specifically, when the road μ is higher than a set value (e.g., 0.6), the target gear position to be established by the transmission 24 is determined according to general gear change rules, based on the vehicle speed V and the acceleration stroke. When the road μ is equal to or lower than the set value, the target gear position is set to a gear position which is higher by one than a target gear position determined according to general gear change rules.

When the transmission 28 needs to be shifted down to establish the target gear position thus determined, it is also determined in step S131 whether downshifting can be avoided by correcting the target transmission output torque downward within a permissible range (for example, by reducing the target output torque within the range of 10%). Thus, frequent downshifting is avoided, assuring improved comfort of the vehicle. It is to be noted that the power train control unit 400 is authorized to correct a command value from the lower-level distribution unit 342 located at an upper level than the control unit 400, within a permissible range.

In the next step S132, a target engine torque is computed. More specifically, the target engine torque is computed by dividing the target transmission output torque by the gear ratio of the transmission 28, and further dividing the result of the division by an estimated torque ratio of the torque converter 22. The estimated torque ratio is estimated based on the speed ratio obtained by dividing the speed of rotation of the output shaft of the torque converter 22 by the speed of revolution of the engine 14. One example of the relationship between the speed ratio and the estimated torque ratio is indicated in the table of FIG. 29.

Subsequently, in step S133, command values for realizing the target transmission gear position and the target engine torque thus determined are transmitted to the transmission actuator 72 and the engine actuator 70, respectively.

In the manner as described above, one cycle of the power train control module is executed.

As described above and shown in FIG. 24, the power train control unit 400 is designed to supply the upper limit value LMPup and lower limit value LMTlo of the controllable range to the target transmission output torque computing unit 380, and supply the estimated output torque tte to the target brake torque computing unit 382 and also to the road μ estimating unit 384.

b. Brake Control Unit 402

The brake control unit 402 causes the computer 90 to execute the brake control module as shown in FIG. 3 so as to output command values for achieving the target brake torques btfl, btfr, btrl, btrr to the brake actuators 80 associated with the respective wheels 10.

If the brake assembly 56 is of the type in which a friction member is pressed under pressure against a rotary body that rotates with each wheel 10, the target brake pressure bpfl, bpfr, bprl, bprr of each wheel 10 may be calculated according to the following expressions.

$bpfl=btfl \cdot kbf$ $bpfr=btfr \cdot kbf$ $bprl=btrl \cdot kbr$ $bprr=btrr \cdot kbr$ where kbf: brake conversion factor (known) set for the brakes 56 for the right and left front wheels kbr; brake conversion factor (known) set for the brakes 56 for the right and left rear wheels c: Steering Control Unit 404

The steering control unit 404 is adapted to control the actuator 74 for the steering reaction force applying device, actuator 76 for the front steering device, and the actuator 78 for the rear steering device, based on a distributed quantity associated with steering supplied from the upper-level distribution unit 340.

Figure 30:
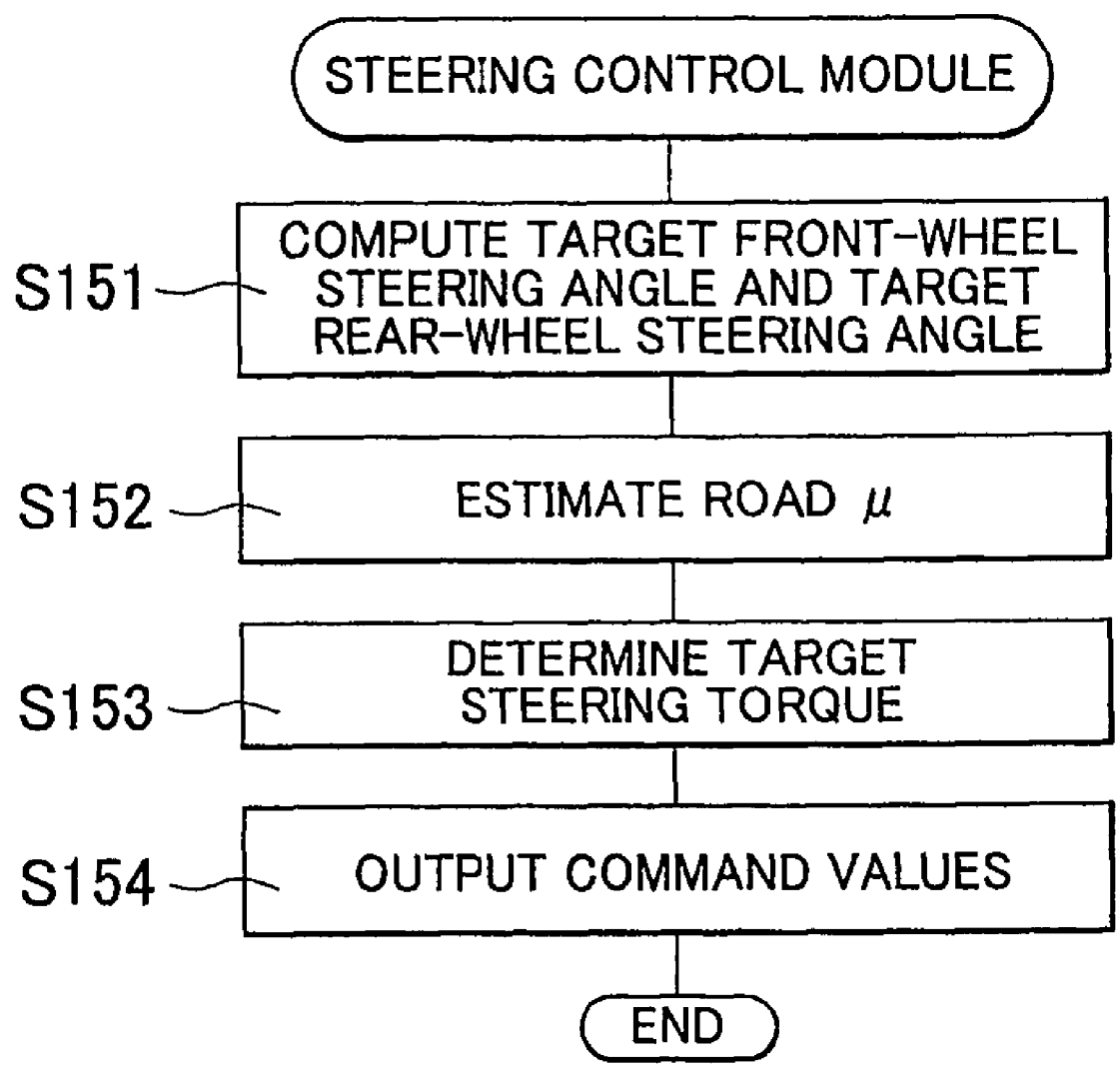
FIG. 30 is a flowchart schematically showing the content of a steering control module shown in FIG. 3.

The functions of the steering control unit 404 will be described with reference to the flowchart of FIG. 30 showing the steering control module as shown in FIG. 3.

In the steering control module, step S151 is initially executed to calculate a target front-wheel steering angle δfd and a target rear-wheel steering angle δrd, based on the target front-wheel slip angle αfd and the target rear-wheel slip angle αrd supplied from the upper-level distribution unit 340.

In the present embodiment, the target front-wheel steering angle δfd and the target rear-wheel steering angle δrd are calculated according to the following expressions.

$\delta fd = \beta + Lf \cdot yr/V \cdot \alpha fd$ $\delta rd = \beta + Lr \cdot yr/V \cdot \alpha rd$ Next, the road μ is estimated with high accuracy in step S152. This step S152 constitutes the road μ estimating unit 420 as shown in FIG. 24. In the present embodiment, the road μ associated with the right and left front wheels is estimated based on the self aligning torque of each wheel 10, using a vehicle-steering system model that can describe the dynamic behavior of the wheels.

More specifically, as described in Japanese laid-open Patent Publication No. 6-221968, the road μ is estimated based on the relationship between the cornering force and the self aligning torque, by utilizing a phenomenon that the rate of increase (or slope) of the self aligning torque with respect to the cornering force of each wheel 10 differs depending upon the road μ.

Here, the cornering force may be estimated, for example, based on the lateral acceleration gy and the yaw angular acceleration dyr, as described in the above-identified publication. The self aligning torque may be estimated, for example, by measuring the axial force acting between the right and left front wheels in the front steering device 50, as described in the above-identified publication.

Subsequently, step S153 is executed to determine a target steering torque that should appear in the steering wheel 44 by the steering reaction force applying device 48. For example, the target steering torque is determined according to predetermined rules, based on vehicle state quantities, such as the steering wheel angle θ, front-wheel steering angle δf, the rate of change of the angle δf, and the road μ.

In the following step S154, command values for realizing the target front-wheel steering angle δfd, target rear-wheel steering angle δrd and the target steering torque are transmitted to the front steering device 50, the rear steering device 52 and the steering reaction force applying device 48, respectively.

Thus, one cycle of the steering control module is executed.

d. Suspension Control Unit 406

The suspension control unit 406 causes the computer 90 to execute the suspension control module as shown in FIG. 3, so that command values for realizing various controlled variables supplied from the upper-level distribution unit 340 are transmitted to the suspension actuators 82 in association with the respective wheels 10.

While no command is transmitted from the upper-level distribution unit 340, the suspension control unit 406 autonomously outputs command values for controlling the suspensions 62 to the suspension actuators 82.

Among the actuators 70 through 82, the engine actuator 70, transmission actuator 72 and the brake actuator 80 will be described in greater detail.

The engine actuator 70 includes a control unit and a drive unit (e.g., motors). The control unit is adapted to determine target control values for achieving the target engine torque supplied from the power train control unit 400, according to predetermined rules. The target control values may include the throttle opening, fuel injection quantity, ignition timing, valve timing, valve lift amount, and so forth of the engine 14.

The control unit outputs signals corresponding to the target control values thus determined, to the above-described drive unit, and the drive unit is driven in accordance with the signals, to achieve the target engine torque.

The transmission actuator 72 also includes a control unit and a drive unit (e.g., solenoids). The control unit is adapted to output a signal for establishing the target gear position supplied from the power train control unit 400 to the drive unit, so that the drive unit drives the transmission in response to the signal, thereby to establish the target gear position.

The brake actuator 80 also includes a control unit and a drive unit (e.g., solenoids and motors). The control unit is adapted to output a signal for achieving the target brake pressure supplied from the brake control unit 402 to the drive unit, so that the drive unit drives the brake assembly of each wheel 10 in response to the signal, thereby to achieve the target brake pressure.

In the present embodiment, the target longitudinal acceleration gx6 supplied from the upper-level command section 210 to the lower-level command section 212 is a single value rather than a range. However, the target longitudinal acceleration gx6 may be in the form of a range covering a plurality of values.

In this case, the lower-level command section 212 may set a plurality of discrete values within a range of the target longitudinal acceleration gx6, compute the final target longitudinal accelerations gxd by the method as described above, with respect to the respective discrete values, and select one from the plurality of final target longitudinal accelerations gxd thus computed.

Conditions set for selecting one from the target longitudinal accelerations gxd may include a condition that the target longitudinal acceleration gxd to be selected is within the range of the original target longitudinal acceleration gx6, and a condition that the amount of consumption of energy by the actuators is minimized.

When the target longitudinal acceleration gx6 is in the form of a range covering a plurality of values, the range of the acceleration gx6 may be changed depending upon the preference of the driver, for example.

Furthermore, the target longitudinal acceleration gx6 may be in the form of a range if the target longitudinal acceleration gx6 is positive, which means that the vehicle needs to be accelerated, and the target longitudinal acceleration gx6 may be a single value rather than a range if the target longitudinal acceleration gx6 is negative, which means that the vehicle needs to be decelerated.

With the above arrangement, when the vehicle needs to be decelerated, the magnitude of the target longitudinal acceleration gx6 is more likely to be exactly or truthfully realized by the lower-level command section 212 and the executing section 214, whereby the safety of the vehicle can be easily improved.

In the present embodiment, the software configuration of the integrated vehicle motion control system is systematically arranged in the form of a hierarchy having a plurality of hierarchical levels, and the module executed by the computer 90 at each hierarchical level uses the minimum model that reflects what characteristics the module immediately subordinate to the level have and what influences the modules of the adjacent levels give to each other, for use in calculations by the computer 90. Furthermore, each hierarchical level supplies command values obtained through such calculations, to the immediately lower level.

In the present embodiment, information is transmitted not only in the positive direction from the upper level to the lower level (as indicated by solid lines with arrows in FIG. 23), but also in the reverse direction from the lower level to the upper level (as indicated by broken lines with arrows in FIG. 23).

The information transmission in both directions is carried out in order to cause the upper level to check or consider the degree by which a command value generated from the upper level to the lower level is realized by the lower level, and thereby give the upper level an opportunity to learn, for improved accuracy with which the upper level determines the command value.

For example, while the upper-level distribution unit 340 or the lower-level distribution unit 342 determines a command value, using an estimated value of the road μ, and supplies the determined command value to the control unit 344, the actual value of the road μ may be lower than the estimated value. In this case, the command value from the upper-level distribution unit 340 or the low-level distribution unit 342 may not be accomplished by the control unit 344 with sufficiently high accuracy, because of a shortage of the accuracy in estimating the road μ.

In the above case, the control unit 344 returns information indicative of the degree of the actual accomplishment of the command value, to the upper-level distribution unit 340 or the lower-level distribution unit 342. Then, the upper-level distribution unit 340 or the lower-level distribution unit 342 corrects an arithmetic model (e.g., wheel model or tire model) used for determining the command value, based on the degree of the actual accomplishment of the previously generated command value.

In the present embodiment, the input side and output side of the motion control system are not connected to each other by a path other than an electric path. In the case where the electric path is at fault, for example, the basic functions of the motion control system may not be maintained.

In view of the above situation, a backup system for the occasion of emergency is prepared in this embodiment. With the backup system thus provided, the driving information acquisition system 120 and the actuators 70 through 82 are directly connected to each other in case of emergency, so that the actuators 70 through 82 are operated according to the driving information.

Figure 31:
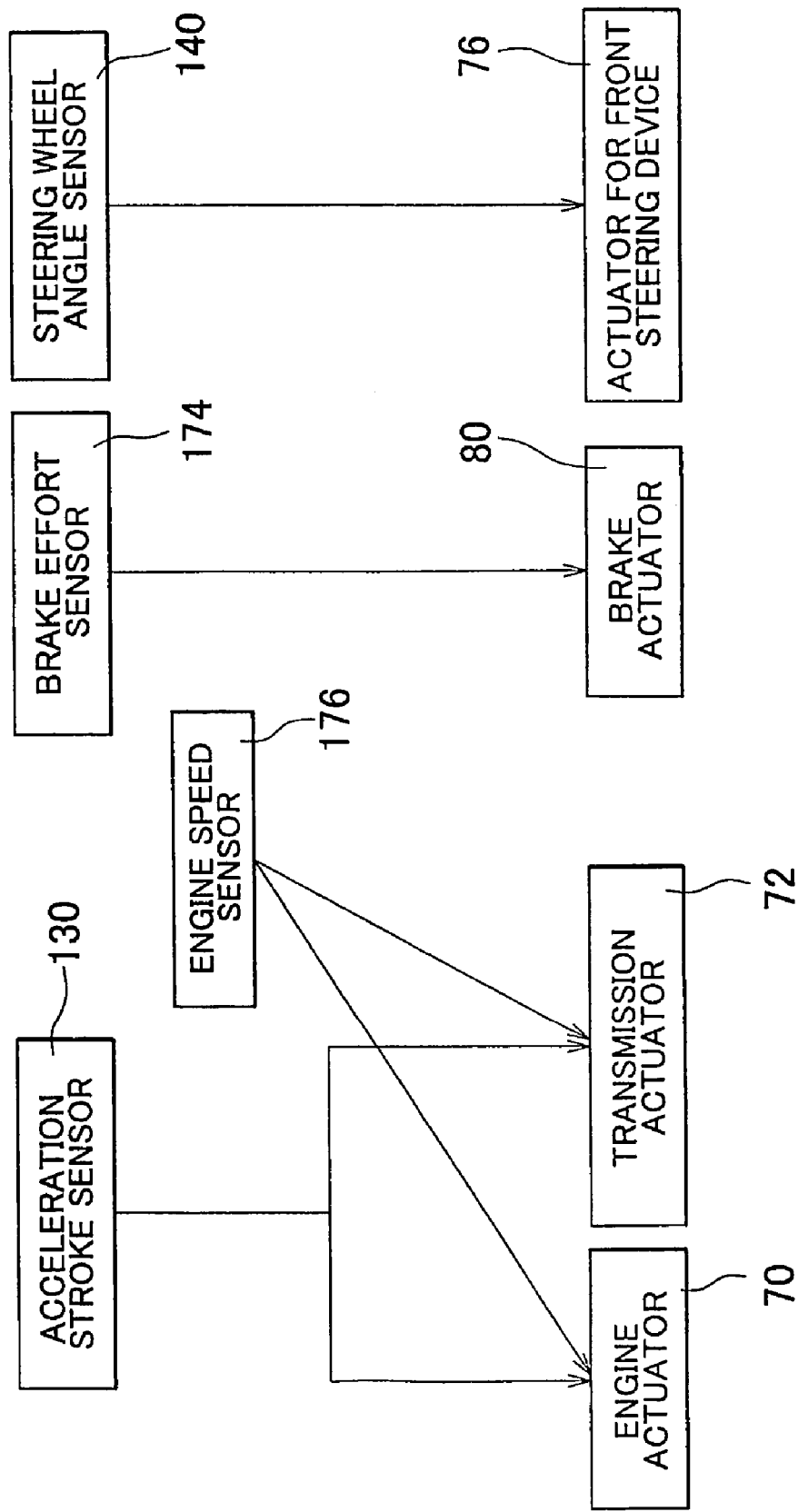
FIG. 31 is a block diagram schematically showing a backup system of the integrated vehicle motion control system shown in FIG. 1.

FIG. 31 illustrates one example of the backup system. In case of emergency, the backup system operates to supply signals from the acceleration stroke sensor 130 to the engine actuator 70 and the transmission actuator 72, and supplies signals from the engine speed sensor 176 to the engine actuator 70 and the transmission actuator 72. Also, in case of emergency, a signal from the braking effort sensor 134 is supplied to the brake actuators 80, and a signal from the steering wheel angle sensor 140 is supplied to the actuator 76 for the front steering device, as shown in FIG. 31.

In the backup system of FIG. 31, in case of emergency, a target engine torque is determined according to a predetermined relationship(s), depending upon a detected value of the acceleration stroke sensor 130 and a detected value of the engine speed sensor 176, and the engine actuator 70 is controlled so as to achieve the determined target engine torque.

Furthermore, in case of emergency, a target gear position is determined according to a predetermined relationship(s), depending upon a detected value of the acceleration stroke sensor 130 and a detected value of the engine speed sensor 176, and the transmission actuator 72 is controlled so as to establish the determined target gear position.

Moreover, in case of emergency, a target braking force (for example, a target brake pressure in the case where the brake 56 is of a pressure type, or a target motor power signal in the case where the brake 56 is of an electrically driven type) is determined according to a predetermined relationship(s), depending upon a detected value of the braking effort sensor 134, and the brake actuator 80 (for example, solenoid valve, electric motor, or the like) for each wheel is controlled so as to realize the target braking force.

Also, in case of emergency, a target front-wheel steering angle is determined according to a predetermined relationship(s), depending upon a detected value of the steering wheel angle sensor 140, and the actuator 76 for the front steering device is controlled so as to realize the determined target front-wheel steering angle. The target front-wheel steering angle may be determined by, for example, dividing the detected value of the steering angle sensor 140 by a fixed or variable steering gear ratio.

While the invention has been described in detail with reference to the exemplary embodiment thereof, it is to be understood that the invention is not limited to details of the exemplary embodiment or construction, but may be otherwise embodied with various changes, modifications or improvements, without departing from the scope of the invention.

The invention claimed is:

1. An integrated vehicle motion control system which controls a plurality of actuators in an integrated manner by using a computer, comprising a command section being at a first level as one of a plurality of levels which are arranged in the form of hierarchy in a direction from the driver toward the plurality of actuators, the command section being adapted to determine a target vehicle state quantity based on driving related information relating to driving of a vehicle by a driver and an executing section being at a second level which is one of the plurality of the hierarchical levels, and is lower than the first level, the executing section being adapted to receive the target vehicle state quantity as a command from the command section, and execute the received command by means of at least one of the plurality of actuators wherein the command section includes an upper-level command section and a lower-level command section each of which is adapted to generate commands for controlling the plurality of actuators in an integrated manner, the upper-level command section determining a first target vehicle state quantity based on the driving related information, without taking account of dynamic behavior of the vehicle, and supplying the lower-level command section with the determined first target vehicle state quantity, the lower-level command section determining a second target vehicle state quantity in view of the dynamic behavior of the vehicle, based on the first target vehicle state quantity received from the upper-level command section, and supplying the executing section with the determined second target vehicle state quantity; and the upper-level command section, the lower-level command section and the executing section perform particular functions assigned to the respective sections, by causing the computer to execute a plurality of modules that are independent of each other on the software configuration.

2. The integrated vehicle motion control system according to claim 1, wherein the driving related information includes driving information relating to driving operations performed by the driver, and at least one of vehicle information relating to state quantities of the vehicle and environmental information relating to an environment around the vehicle, which influences motion of the vehicle.

3. The integrated vehicle motion control system according to claim 1, wherein:

the vehicle includes a driving information acquisition system adapted to acquire driving information relating to driving operations performed by the driver, and at least one of a vehicle information acquisition system adapted to acquire vehicle information relating to state quantities of the vehicle and an environmental information acquisition system adapted to acquire environmental information relating to an environment around the vehicle, which influences motion of the vehicle; and the upper-level command section determines the first target vehicle state quantity, based on the acquired driving information, and at least one of the acquired vehicle information and the acquired environmental information.

4. The integrated vehicle motion control system according to claim 3, wherein the upper-level command section determines a plurality of candidate values associated with the first target vehicle state quantity to be determined, based on the acquired driving information and at least one of the acquired vehicle information and the acquired environmental information, and determines the first target vehicle state quantity based on the determined plurality of candidate values, according to a predetermined set of rules.

5. The integrated vehicle motion control system according to claim 4, wherein:

the first target vehicle state quantity is associated with a longitudinal acceleration of the vehicle; and the plurality of candidate values include a first target longitudinal acceleration determined based on the acquired driving information, and a second target longitudinal acceleration determined based on at least one of the acquired vehicle information and the acquired environmental information.

6. The integrated vehicle motion control system according to claim 4, wherein:

the first target vehicle state quantity is associated with a steering angle of the vehicle; and the plurality of candidate values include a first target steering angle determined based on the acquired driving information, and a second target steering angle determined based on at least one of the acquired vehicle information and the acquired environmental information.

7. The integrated vehicle motion control system according to claim 1, wherein the first target vehicle state quantity comprises a target vehicle state quantity associated with a longitudinal acceleration of the vehicle and a target vehicle state quantity associated with a steering angle of the vehicle.

8. The integrated vehicle motion control system according to claim 1, wherein:

the upper-level command section determines, as the first target vehicle state quantity, a target vehicle state quantity that gives a priority to optimization of a vehicle position-speed relationship between a position of the vehicle and a speed thereof on a track on which the vehicle runs, over stabilization of behavior of the vehicle; and the lower-level command section determines, as the second target vehicle state quantity, a target vehicle condition that gives a priority to stabilization of behavior of the vehicle, over optimization of the vehicle position-speed relationship, based on the determined first target vehicle state quantity.

9. The integrated vehicle motion control system according to claim 1, wherein:

the upper-level command section determines the first target vehicle state quantity as a target vehicle state quantity that is variable within a permissible range; and the lower-level command section determines the second target vehicle state quantity as a target vehicle state quantity selected from the permissible range of the first target vehicle state quantity.

10. The integrated vehicle motion control system according to claim 9, wherein:

the first target vehicle state quantity comprises a target vehicle state quantity associated with a longitudinal acceleration of the vehicle and a target vehicle state quantity associated with a steering angle of the vehicle; and the upper-level command section determines the target vehicle state quantity associated with the longitudinal acceleration of the vehicle as a target vehicle state quantity that is variable within a permissible range, and determines the target vehicle state quantity associated with the steering angle of the vehicle as a target vehicle state quantity that does not have a permissible range.

11. The integrated vehicle motion control system according to claim 9, wherein the upper-level command section varies a width of the permissible range, based on at least one of an intention of the driver and an environment around the vehicle, which influences motion of the vehicle.

12. The integrated vehicle motion control system according to claim 1, wherein:

the upper-level command section determines the first target vehicle state quantity based on input information, by using a simple vehicle model that simply describes motion of the vehicle with no regard to dynamic behavior of the vehicle; and the lower-level command section determines the second target vehicle state quantity based on input information, by using a more precise vehicle model that describes motion of the vehicle more precisely than the simple vehicle model so as to reflect the dynamic behavior of the vehicle.

13. The integrated vehicle motion control system according to claim 12, wherein the executing section determines controlled variables by which the plurality of actuators are to be controlled so as to realize the second target vehicle state quantity, based on input information, by using a vehicle model that describes motion of a wheel of the vehicle in relation to at least a longitudinal force and a lateral force, out of the longitudinal force, lateral force and a vertical force that act on the wheel.

14. The integrated vehicle motion control system according to claim 1, wherein each of at least one of the upper-level command section, lower-level command section and the executing section determines information to be transmitted to a section located at a lower level than said each section, based on information received from a section located at a higher level than said each section, by using a model that describes at least one of the motion of the vehicle and the motion of a wheel of the vehicle, and corrects the model based on an error in the information transmitted to the section located at a lower level than said each section.

15. The integrated vehicle motion control system according to claim 1, wherein:

the executing section includes a plurality of units that are arranged in the form of a hierarchy having a plurality of hierarchical levels in a direction from the lower-level command section toward the plurality of actuators;

the plurality of units include a distribution unit being at a first level as one of the hierarchical levels, the distribution unit being adapted to distribute controlled variables by which the plurality of actuators are to be controlled so as to realize the second target vehicle state quantity supplied from the lower-level command section, to the plurality of actuators, and a control unit being at a second level lower than the first level, the control unit being adapted to control the plurality of actuators so as to realize the controlled variables supplied from the distribution unit;

the distribution unit includes an upper-level distribution unit provided with respect to all of the plurality of actuators, for distributing controlled variables by which the plurality of actuators are to be controlled so as to realize the second target vehicle state quantity supplied from the lower-level command section, to all of the plurality of actuators in an integrated manner, a lower-level distribution unit provided with respect to a part of the plurality of actuators, for distributing the controlled variables supplied from the upper-level distribution unit, to the part of the plurality of actuators;

the control unit includes a plurality of individual control units, a first group of which is provided at a hierarchical level subordinate to the lower-level distribution unit with regard to the part of the plurality of actuators, and a second group of which is provided at a hierarchical level subordinate to the upper-level distribution unit with regard to the remaining actuators; and the upper-level distribution unit, the lower-level distribution unit and the control unit perform particular functions assigned to the respective units, by causing the computer to execute a plurality of modules that are independent of each other on the software configuration.

16. The integrated vehicle motion control system according to claim 15, wherein:

the plurality of actuators are classified into a plurality of groups depending upon a type of a physical quantity that acts on each element of the vehicle by each of the actuators; and the lower-level distribution unit is provided with respect to at least one of the plurality of groups each of which contains two or more actuators.

17. The integrated vehicle motion control system according to claim 15, wherein:

the plurality of actuators include a plurality of wheel-related actuators that control at least longitudinal force and lateral force, out of longitudinal force, lateral force and vertical force of a wheel of the vehicle; and the upper-level distribution unit distributes the controlled variables to the plurality of wheel-related actuators such that the controlled variables include at least a longitudinal force component associated with the longitudinal force and a lateral force component associated with the lateral force, out of the longitudinal force component, the lateral force component, and a vertical force component associated with the vertical force.

* * * * *